(12) United States Patent
Iwashiro et al.

(10) Patent No.: US 7,936,804 B2
(45) Date of Patent: May 3, 2011

(54) SOLID STATE LASER AND WAVELENGTH CONVERSION LASER

(75) Inventors: Kuniaki Iwashiro, Tokyo (JP); Hiroyuki Suzuki, Tokyo (JP); Tetsuo Kojima, Tokyo (JP); Tomotaka Katsura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 92 days.

(21) Appl. No.: 12/513,176

(22) PCT Filed: Dec. 6, 2007

(86) PCT No.: PCT/JP2007/073554
§ 371 (c)(1),
(2), (4) Date: May 1, 2009

(87) PCT Pub. No.: WO2008/072536
PCT Pub. Date: Jun. 19, 2008

(65) Prior Publication Data
US 2010/0074296 A1    Mar. 25, 2010

(30) Foreign Application Priority Data
Dec. 11, 2006  (JP) .................................. 2006-333185

(51) Int. Cl.
*H01S 3/08*    (2006.01)
(52) U.S. Cl. ......................................... 372/101; 372/99
(58) Field of Classification Search .................... 372/66, 372/94, 97, 98, 99, 101
See application file for complete search history.

(56) References Cited

FOREIGN PATENT DOCUMENTS

| JP | 8-250797 A | 9/1996 |
|---|---|---|
| JP | 10-294511 A | 11/1998 |
| JP | 2917413 B2 | 4/1999 |
| JP | 2000-174369 A | 6/2000 |
| JP | 2000-216465 A | 8/2000 |
| JP | 2003-08121 A | 1/2003 |

OTHER PUBLICATIONS

Charles X. Wang, et al.; "High Power Q-switched $TEM_{00}$ Mode Diode-Pumped Solid State Lasers with > 30W Output Power at 355nm"; Solid-State Lasers XV: Technology and Devices; 2006; vol. 6100; pp. 610019-1 to 610019-14.

Maik Frede, et al; "High power fundamental mode Nd:YAG laser with efficient birefringence compensation"; Frank Siefert, Benno Willke, Karsten Danzmann; Jul. 24, 2004; vol. 12, No. 15; pp. 3581 to 3589.

*Primary Examiner* — Armando Rodrgiuez
(74) *Attorney, Agent, or Firm* — Sughrue Mion, PLLC

(57) ABSTRACT

Two convex lenses (61, 62), each of which has a focal length "f", and a 90 degree polarization rotator (5) are interposed between solid-state laser elements (21, 22) of a symmetrical resonator having the two solid-state laser elements (21, 22); a space between the two lenses (61, 62) is made shorter than 2f; and distances between the respective lenses (61, 62) and centers of their adjacent solid-state laser elements (21, 22) are set substantially to "f", to thus achieve a solid-state laser capable of stably performing high power transverse single mode oscillation desirably having power of 100 W or more. There is acquired a wavelength conversion laser that is further provided with a Q switch (3) and a polarization element (4) and that causes an output fundamental wave laser beam to enter nonlinear elements (91, 92) so as to undergo wavelength conversion, thereby producing a high power harmonic laser beam having a high frequency of; desirably, about 100 kHz.

27 Claims, 31 Drawing Sheets

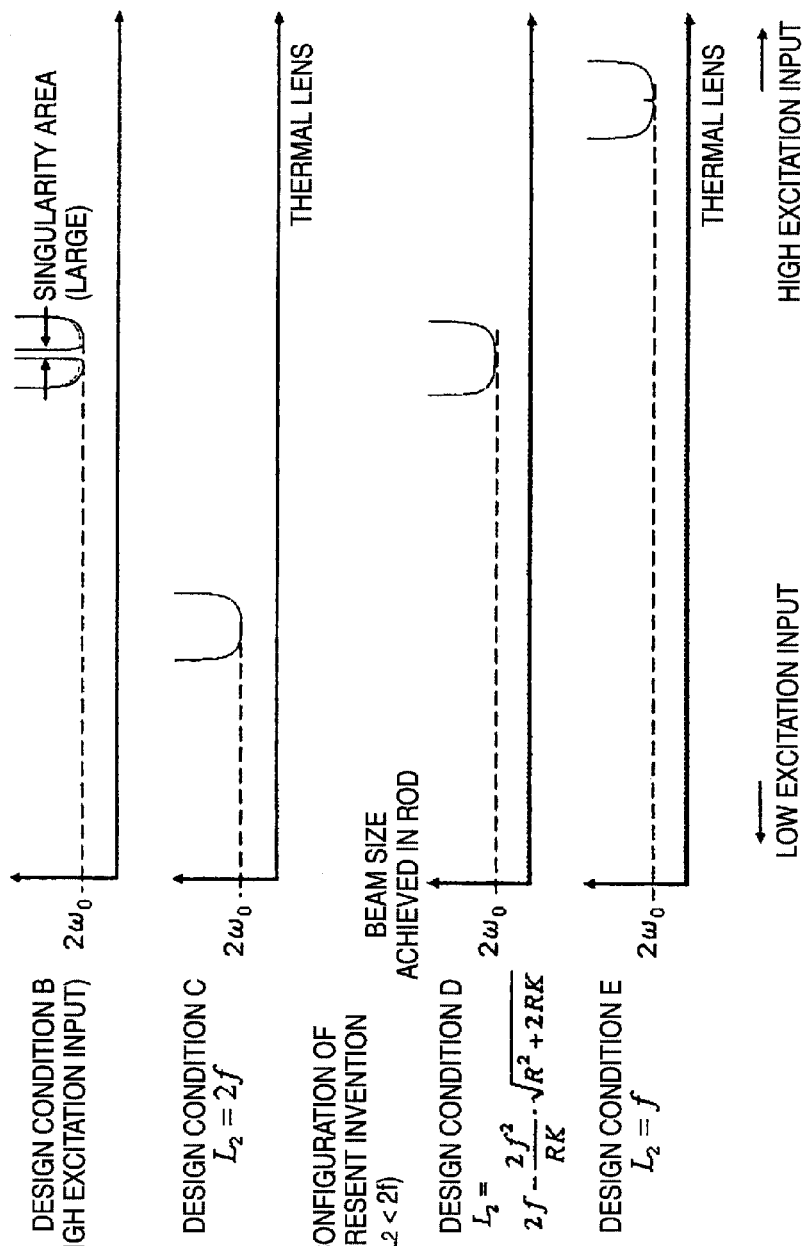

Figure 1:
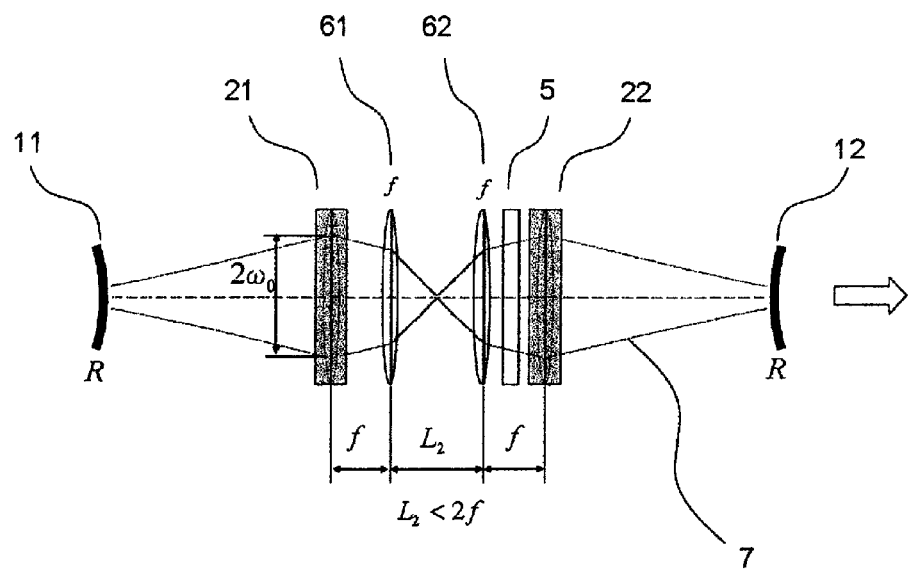

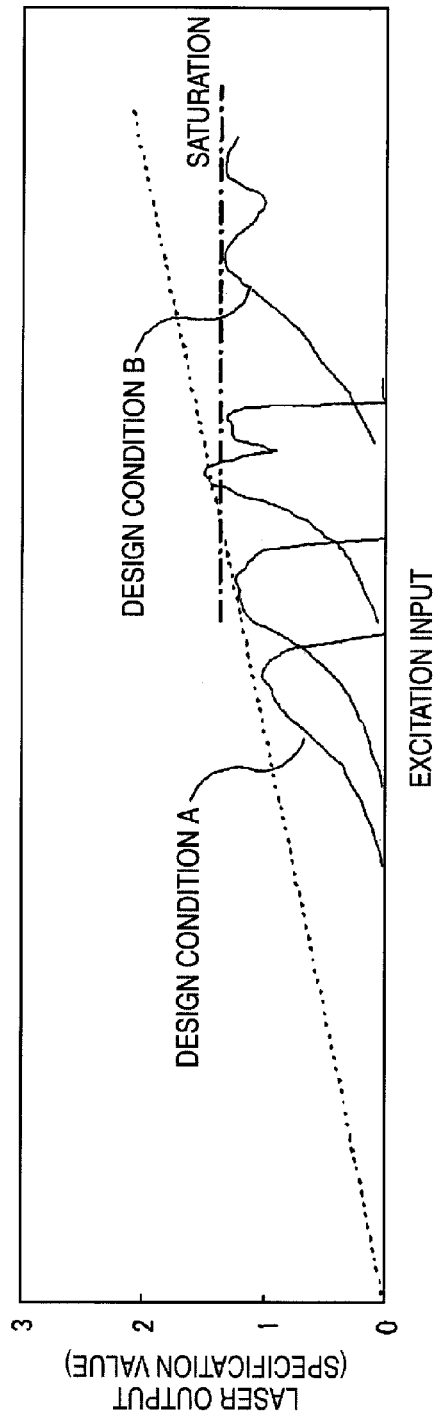
FIG. 4 (a) RELATED-ART CONFIGURATION
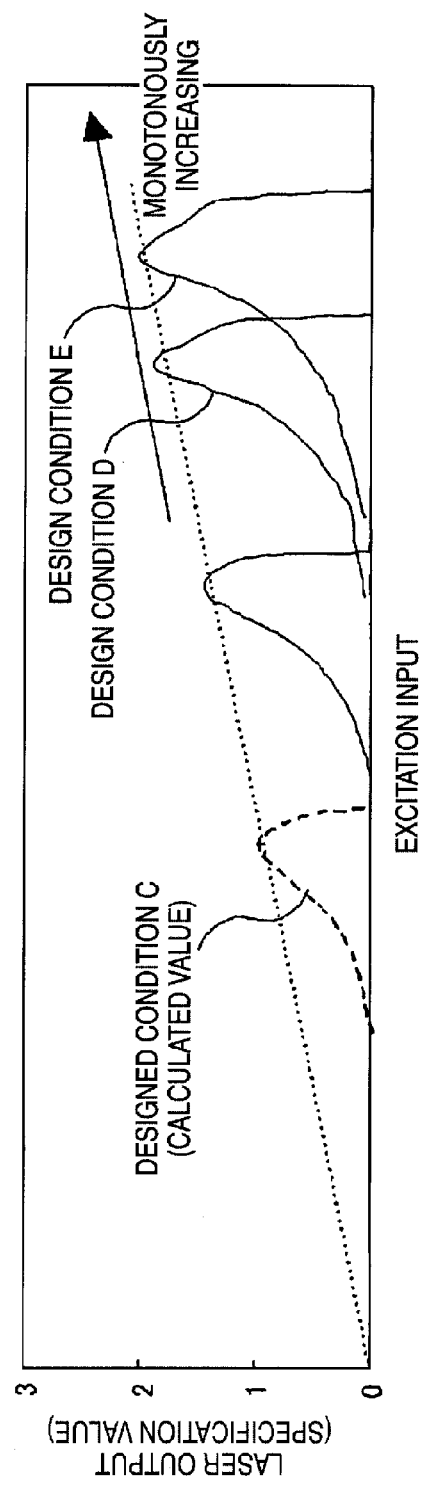
FIG. 4 (b) CONFIGURATION OF PRESENT INVENTION

FIG. 5 (a) RELATED-ART CONFIGURATION (L2 = 2f)
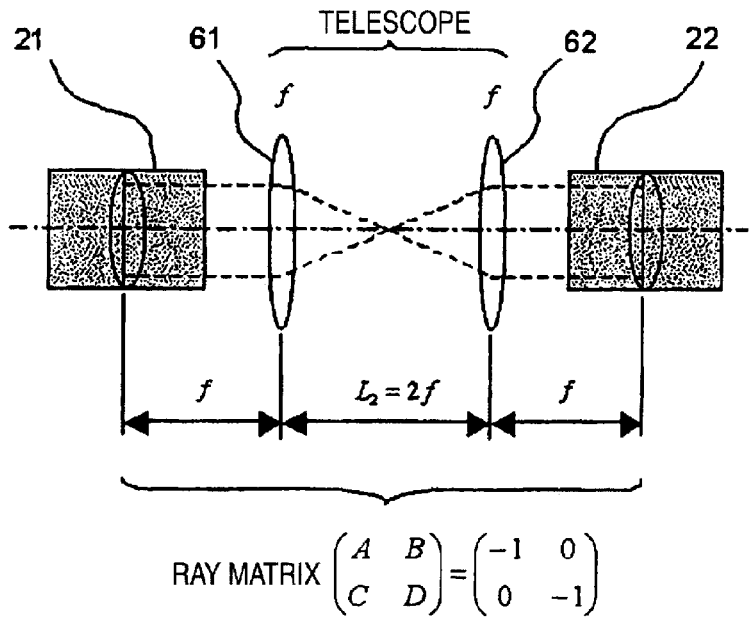
FIG. 5 (b) CONFIGURATION OF PRESENT INVENTION (L2 < 2f)
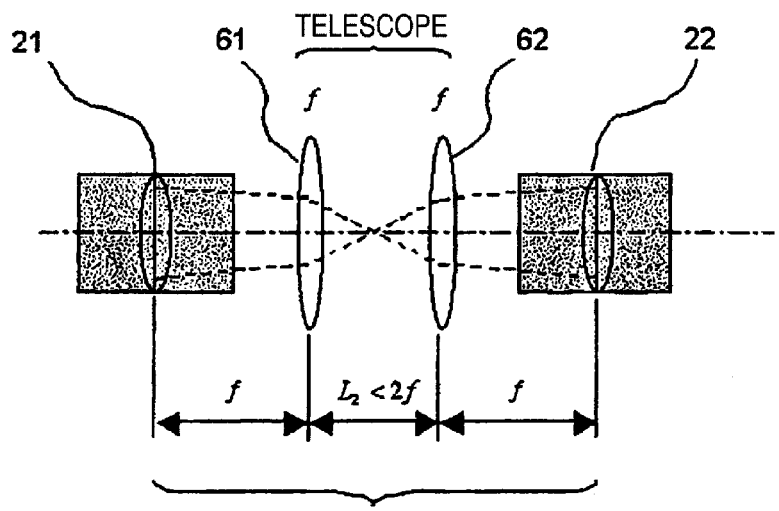

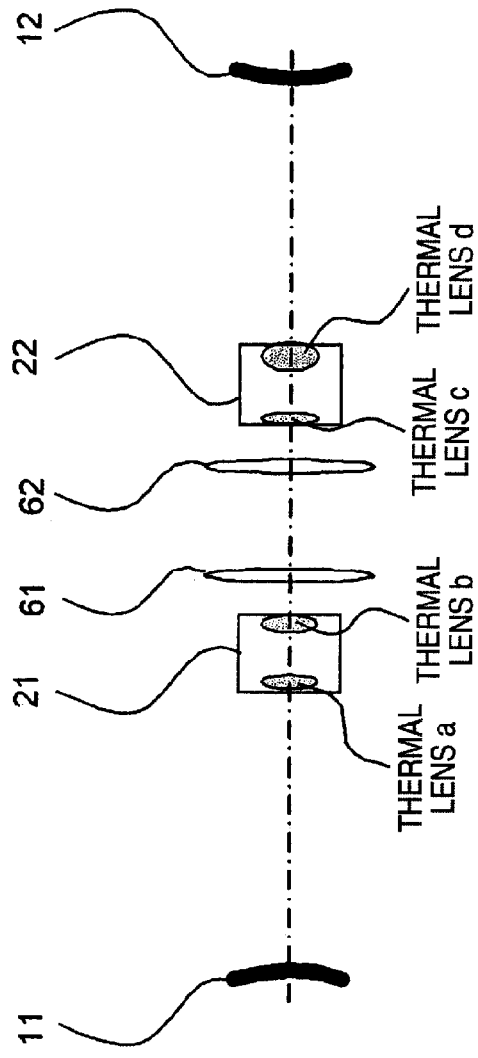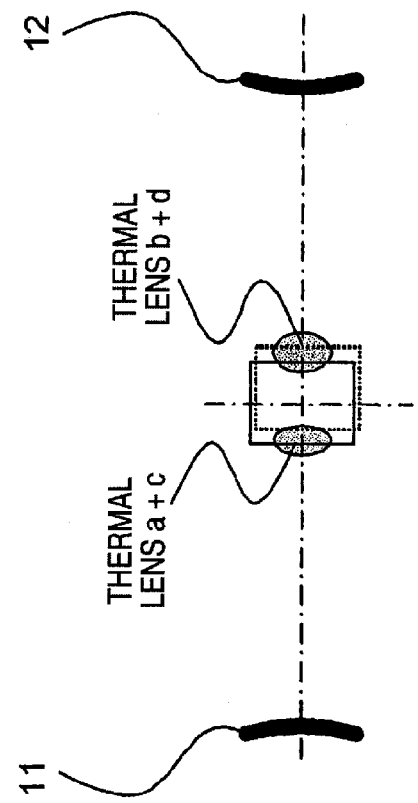
FIG. 15 (a)
FIG. 15 (b)

FIG. 20 (a-1)
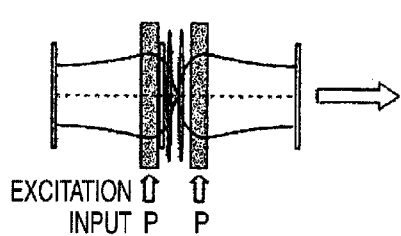
EXCITATION INPUT P P
FIG. 20 (a-2)
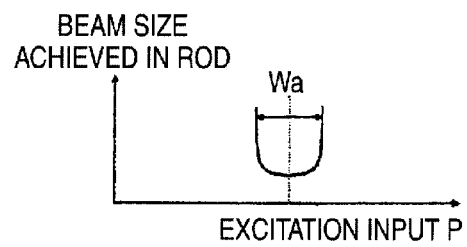
BEAM SIZE ACHIEVED IN ROD
Wa
EXCITATION INPUT P
FIG. 20 (b-1)
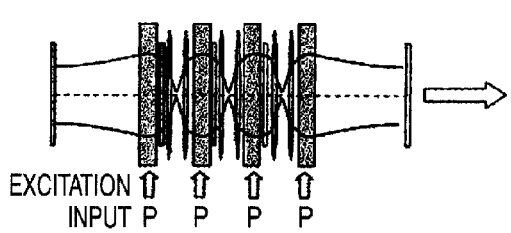
EXCITATION INPUT P P P P
FIG. 20 (b-2)
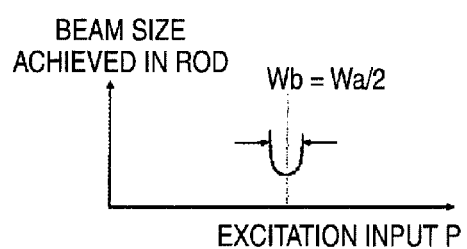
BEAM SIZE ACHIEVED IN ROD
$W_b = W_a/2$
EXCITATION INPUT P
FIG. 20 (c-1)
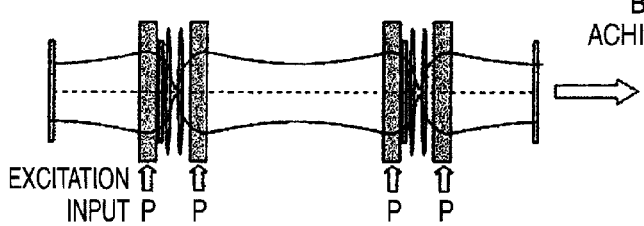
EXCITATION INPUT P P P P
FIG. 20 (c-2)
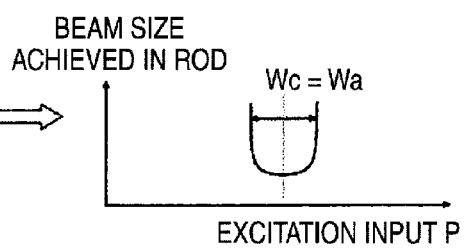
BEAM SIZE ACHIEVED IN ROD
$W_c = W_a$
EXCITATION INPUT P

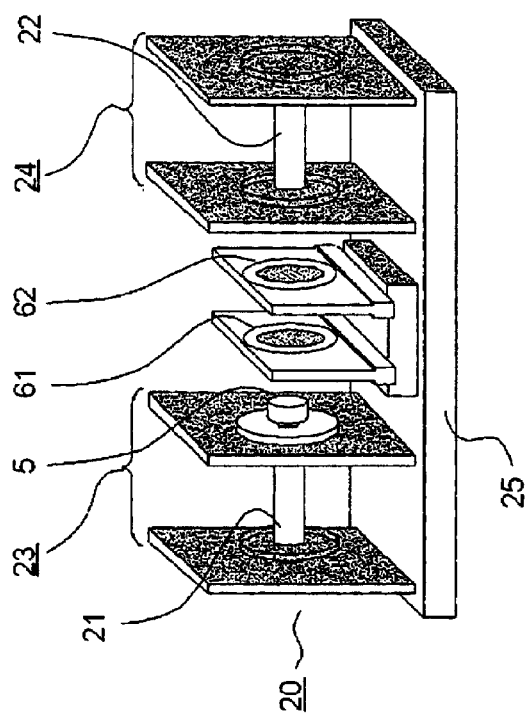
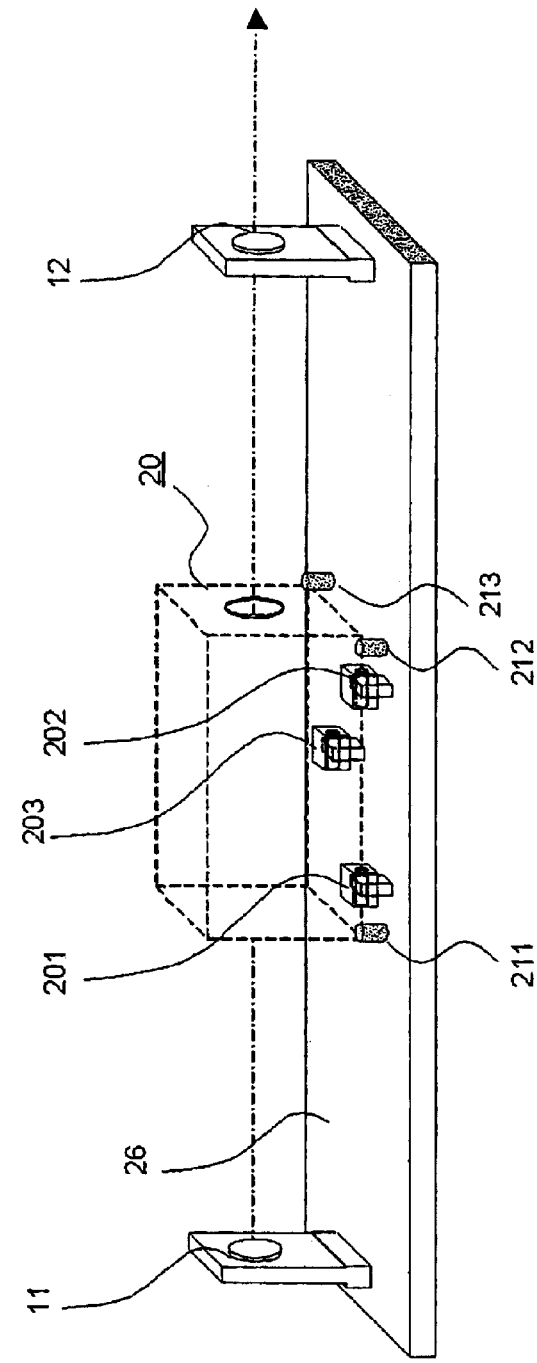
FIG. 24 (a)
FIG. 24 (b)

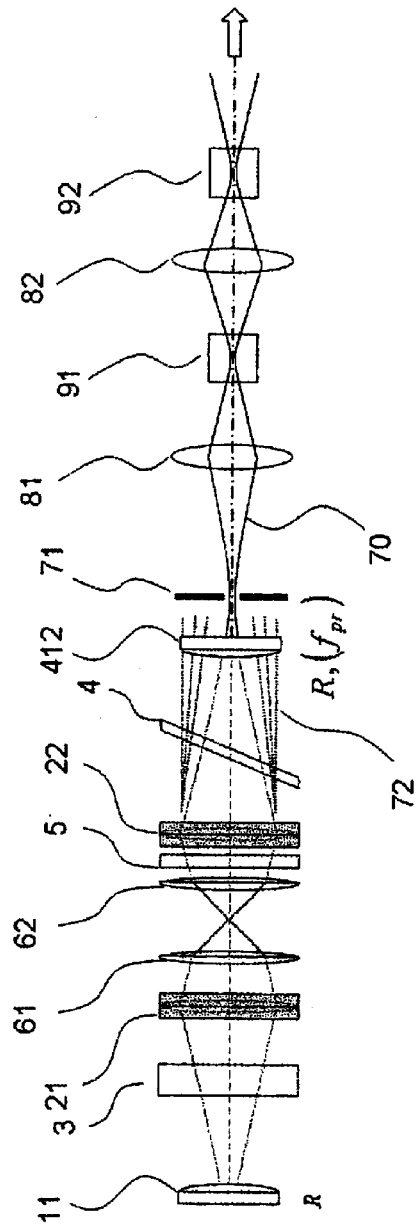
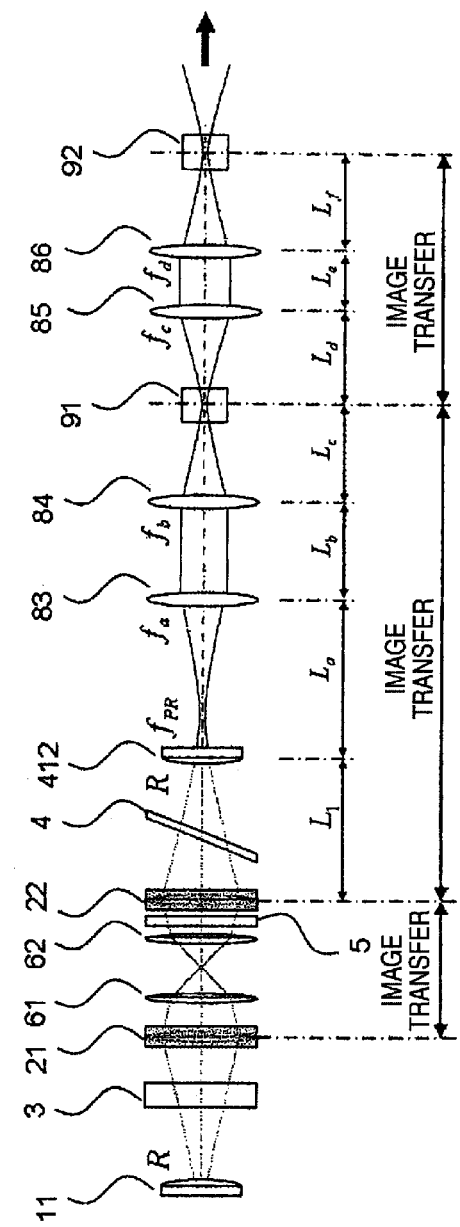
FIG. 30
FIG. 31

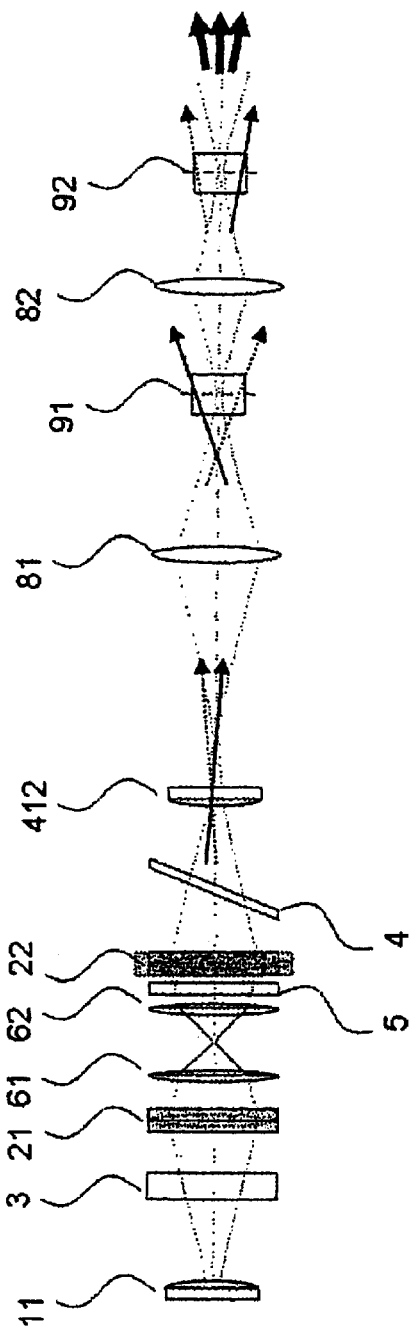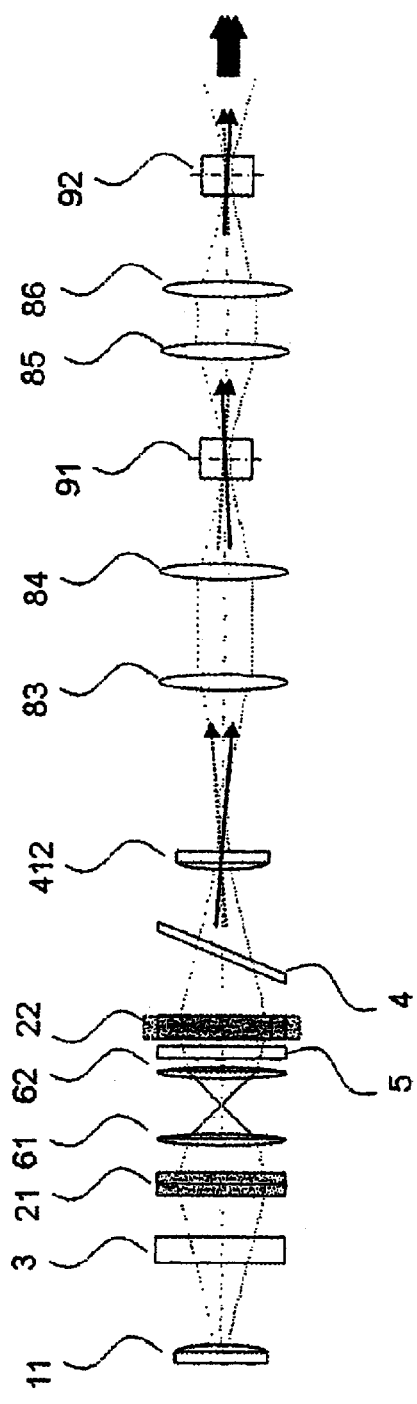
FIG. 32 (a)
FIG. 32 (b)

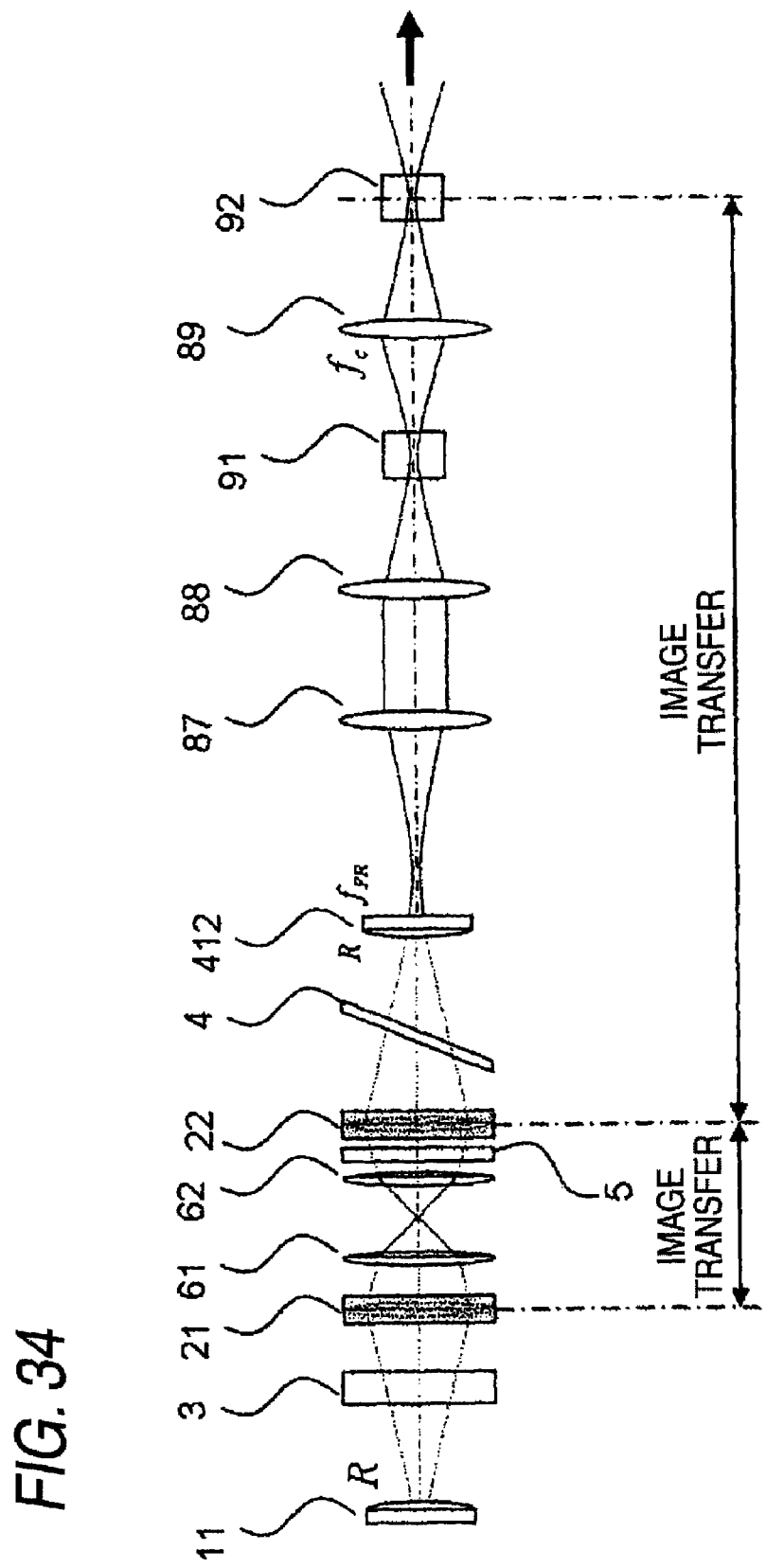

SOLID STATE LASER AND WAVELENGTH CONVERSION LASER

TECHNICAL FIELD

The present invention relates to a solid-state laser that oscillates a high power laser beam by means of a solid-state laser element and a wavelength conversion laser that subjects a laser beam generated by the solid-state laser to wavelength conversion by means of a nonlinear crystal and that outputs the thus-converted laser beam.

BACKGROUND ART

Major applications for a solid-state laser include precision machining of a metal material and a silicon wafer, microboring of a printed board material, and the like. In precision machining, such as that mentioned above, a single mode solid-state laser that performs Q-switched high-peak pulse oscillation and a wavelength conversion laser using such a solid-state laser as the fundamental wave laser light source are generally used in order to realize high quality machining by minimizing thermal influence on a material to be machined. Common wavelength conversion lasers include a green laser for which a fundamental laser beam having an infrared wavelength is converted so as to assume a one-half of the wavelength and a ultraviolet laser (hereinafter called an "UV laser") for which the fundamental laser beam is converted so as to assume a one-third or one-fourth of the wavelength.

A high peak pulse laser is suitable for machining metal and a silicon material among the applications for the solid-state laser, and a high energy solid state laser or wavelength-conversion laser having a short pulse width (a short pulse) has been sought. Since an UV laser having a highly-repetitive frequency is superior in terms of an efficiency in machining a resin material and enables high-speed machining, an UV laser that produces a high average output at the highest possible repetitive frequency has been sought in a range of use for boring a printed board made of a resin material. In order to obtain a high frequency UV laser that produces a high average output, a high frequency pulse solid-state laser that produces a high average output is required as a fundamental laser that serves as the source for the UV laser. Improvements in a technique pertaining to achievement of a shorter pulse and higher energy and improvements in a technique pertaining to achievement of a higher frequency and a higher output have been sought in the field of a transverse single mode solid-state laser. If there is a solid state laser technique satisfying both requests, the technique can be said to be most idealistic.

An Nd:YAG laser using a rod-shaped laser element (hereinafter abbreviated as a "YAG rod") taking as a material a $Y_3Al_5O_{12}$ crystal doped with Nd atoms (popularly called a YAG crystal) and an Nd:YVO$_4$ laser using a YVO$_4$ crystal doped with Nd atoms are common as a solid state layer that performs high power oscillation. Since the Nd:YVO$_4$ layer yields a very high laser gain, the laser is highly efficient and can perform stable pulse oscillation even at a highly-repetitive frequency of the order of 100 kHz. However, difficulty is encountered in growing a large crystal, and hence there is a limit on an increase in power. On the other hand, creation of a large YAG rod is possible in the case of the Nd:YAG laser, and high power, high energy pulse laser oscillation is possible. However, the Nd:YAG laser does not yield as high laser gains as does the Nd:YVO$_4$ crystal, and hence pulse oscillation achieved at a highly-repetitive frequency tends to become unstable. In general, the Nd:YAG laser is made commercially practical at an intermediate repetitive frequency range of 50 kHz or less.

Of current commercially-available UV lasers, UV lasers adopting an Nd:YAG laser as the fundamental laser are predominant in terms of a high energy type, and UV lasers adopting an Nd:YVO$_4$ laser as the fundamental laser are predominant in terms of a highly-repetitive frequency type. However, difficulty is encountered in achieving a further increase in the power of the Nd:YVO$_4$ laser because of restrictions in a crystal size, and the like. If there is available a product technology that enables an Nd:YAG laser, which is easy to generate higher power, to perform stable pulse oscillation even at a highly-repetitive frequency of the order of 100 kHz, a higher-power UV laser can be obtained even in the field of the highly-repetitive frequency.

In order to aim at causing the Nd:YAG laser to perform high power oscillation at a highly-repetitive frequency, an increase in excitation density achieved in the YAG rod is effective. To this end, a resonator technique and an excitation technique, which enable performance of stable laser oscillation in compliance to an intensive thermal lens arising in the YAG rod, are required. The same also applies to production of a high energy, high power Nd:YAG laser. Specifically, even in an attempt to increase the energy and power of the Nd:YAG laser and an attempt to achieve higher repetition and output, a technique for the manner of enabling stable laser oscillation through use of an intensive thermal lens is the key.

A technique for high power transverse single mode oscillation in an Nd:YAG laser will now be described.

The YAG rod has a thermal lens that changes in accordance with an excitation input. Hence, when a resonator is designed, a design value that enables stable oscillation must be determined in consideration of a thermal lens in the YAG rod. Since the thermal lens of the YAG rod changes according to excitation density, the thermal lens of the YAG rod also exhibits a characteristic of a gradual increase according as the excitation input is changed from a low input to a high input. However, there is a limit on the intensity of the thermal lens held one resonator for enabling continued stable oscillation, and laser oscillation can be performed within only the range of a specific thermal lens. The range of the thermal lens has an upper limit and a lower limit, and values of the upper and lower limits and the size of the range of thermal lens changes according to the design value of the resonator. Specifically, the resonator designed for requirements of a less-intensive thermal lens cannot perform laser oscillation by means of an intensive thermal lens (=a high excitation input). Further, a resonator designed for an intensive thermal lens cannot perform laser oscillation through use of a less-intensive thermal lens (=a low excitation input). The range of thermal lens where laser oscillation can be performed is hereinafter called an oscillation range for a resonator.

The size of the oscillation range changes according to the design value of the resonator, and is determined primarily by a ratio of a cross-sectional area of an excited area in a YAG rod taken along a direction perpendicular to an optical axis to a cross-sectional area of a TEM00 beam generated within the YAG rod theoretically computed from the design value of the resonator. For instance, in the case of an Nd:YAG laser of lateral pumping type, the entirety of a YAG rod is excited, and hence the size of the oscillation range is determined by a ratio of the cross-sectional area of the TEM00 beam to a circular cross section of the YAG rod. Therefore, in the case of lateral multimode oscillation in which oscillation is induced at the diameter of a TEM00 beam that is sufficiently smaller than the diameter of the YAG rod, a wide oscillation range is assured. However, in the case of transverse single mode oscillation in which oscillation is induced at the diameter of a TEM00 beam close to the diameter of the YAG rod, only a narrow oscillation range can be assured. It is also possible to prevent oscillation of a multimode component by inserting an aperture that is sufficiently smaller than the diameter of the YAG rod into the resonator, thereby inducing transverse single mode oscillation at a beam diameter that is sufficiently narrower than the diameter of the YAG rod. In such a case, a wide oscillation region can be assured; however, laser oscillation is forcefully performed at an extremely low efficiency, so that high-power oscillation cannot be carried out. The same also applies to the case of end pumping in which the center of an end face of a YAG rod is intensively excited. In a case where there is designed a resonator which induces transverse single mode oscillation at the diameter of a TEM00 beam equivalent to an excitation range, the width of the oscillation region becomes narrow accordingly.

In the event, when a highly-efficient, high-power transverse single mode oscillator is designed, a narrow oscillation region is inevitably, forcefully adopted without regard to the excitation method, whereupon there is obtained a laser that causes oscillation in only a specific, narrow range of excitation input and that exhibits an input-output characteristic having a sharp geometry. In the case of lateral multimode oscillation exhibiting a low light convergence characteristic, a wide oscillation region can be assured, and there is obtained a high power laser that exhibits a broad input-output characteristic of inducing oscillation from a low excitation input level to a high excitation input level. However, in the case of high power transverse single mode oscillation, a laser can also be said to exhibit a narrow, sharp input-output characteristic in exchange for a high light convergence characteristic.

Incidentally, when the width of the oscillation region is extremely narrow, a characteristic susceptible to fluctuations and variations in thermal lens of the YAG rod is exhibited, which hinders performance of stable laser oscillation and makes it impossible to expect high power oscillation. Although there is a limit on the width of an oscillation region required to induce high power oscillation, the width of the oscillation region usually becomes smaller than the limit value when an attempt is made to induce transverse single mode oscillation at high efficiency. Even when a resonator that induces oscillation at a high excitation input is designed, an output saturation phenomenon arises, so that intended high power oscillation cannot be induced. A symmetrical resonator configuration, in which right and left resonator mirrors are imparted with the same curvature and arranged in the layout of a symmetrical optical system, is effective for avoiding the limit. In the case of an asymmetrical resonator configuration, two narrow oscillation regions are separately present in a low-excitation input side and a high-excitation input side, respectively. Therefore, the respective oscillation regions are narrow, and an output saturation phenomenon arises. However, in the case of the symmetrical resonator configuration, the two oscillation regions are not separated and create as one oscillation region having a twice size. Therefore, sufficient stability is achieved in defiance of fluctuations and variations in thermal lens, and high power transverse single mode oscillation compliant with an increase in excitation input can be induced.

Conditions of a thermal lens under which a resonator performs laser oscillation is principally designed on the basis of design values, such as a curvature of a resonator mirror and a mirror layout. When occurrence of oscillation under conditions of an intensive thermal lens (a high excitation input) is desired, it is common to realize a symmetrical resonator configuration by use of resonator mirrors having high curvatures (i.e., short curvature radii). However, when oscillation is induced under conditions of an extremely-intensive thermal lens, the size of a beam achieved in the resonator mirror may become extremely small, and a light-resistance limit on a coating of the mirror may be exceeded, to thus inflict damage on the mirror. In order to avoid such a limit, there is also available a configuration in which a thermal lens compensation optical system (made up of a concave lens, and the like) which cancels a thermal lens of a YAG rod is built into a resonator, to thus enable laser oscillation even under conditions of a further intensive thermal lens.

In the meantime, the YAG rod encounters a problem of double thermal lenses; namely, occurrence of two different types of thermal lenses according to the direction of polarization. The problem is attributable to occurrence of birefringence in an excited YAG rod as a result of generation of stress associated with the distribution of temperature, and corresponds to a phenomenon of inducing different thermal lenses for two types of light beams having planes of polarization in a radial direction and a circumferential direction of the cross section of the YAG rod. As a consequence, since two types of polarization modes induce oscillation in states of different thermal lenses within the resonator, competition arise between the modes. In particular, in the case of transverse single mode oscillation, there arises a problem of deterioration of oscillation efficiency and occurrence of an extremely-unstable oscillating state.

A birefringence compensation technique is effective for solving the problem, wherein a 90 degree polarization rotator, such as a quartz rotator, is interposed between two equivalently-excited YAG rods, thereby averaging the total of thermal lenses sensed during the course of two polarized modes of beams making a round trip within the respective resonators. Highly-efficient transverse single mode oscillation becomes possible as a result of oscillation being stably induced in the state of the thermal lenses having the same polarized mode.

FIG. 1 of Patent Document 1 illustrates an example related-art resonator using the birefringence compensation technique. Moreover, in this example, there is provided a resonator configuration in which the foregoing thermal lens compensation means built from the concave lens is disposed outside both rods, to thus enable high power oscillation by means of further intensive thermal lenses.

A method known as means for performing more perfect birefringence compensation is a combination of the birefringence compensation technique with a technique for establishing an image transfer link between the YAG rods by means of a telescope. In addition to describing the birefringence compensation technique using the 90 degree polarization rotator, FIG. 5 of Non-patent Document 1 describes a configuration in which a telescope consisting of two lenses (having a focal length "f") is positioned between the two YAG rods on the assumption that an optical distance between the center of the YAG rod and the lens is defined as "f" and that an optical distance between the two lenses is defined as 2 f. There is provided an example in which the influence of the double thermal lenses is completely eliminated by the configuration, to thus implement transverse single mode oscillation of linearly-polarized light having a maximum output of 114 W.

Figure 14:
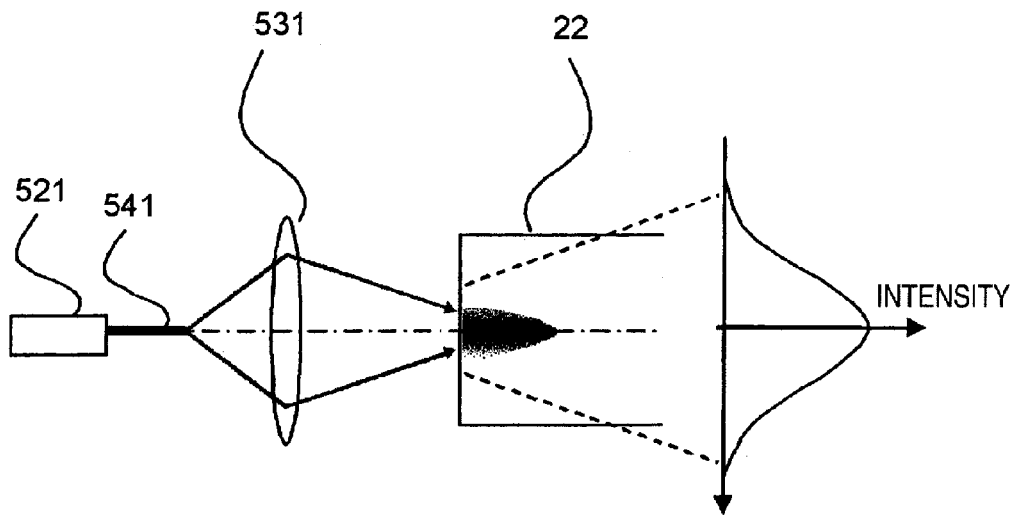
Figure 14:
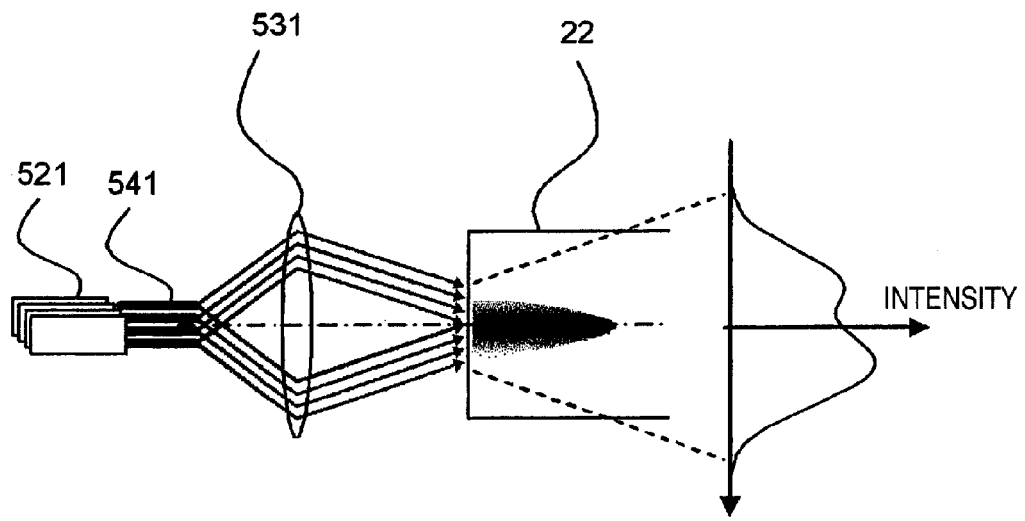

Like a configuration shown in FIG. 14 of Non-patent Document 2, there is also a method for producing a high power transverse single mode output by combination of a MOPA technique for causing a transverse single mode laser beam oscillated by the birefringence compensation technique to pass through excited YAG rods and outputting an amplified laser beam.

The wavelength conversion laser technique will now be described.

In general, in a high power wavelength conversion laser typified by a UV laser, light output from a solid-state laser oscillated by the linearly-polarized light is caused to enter nonlinear crystal as a fundamental laser beam, whereupon the laser beam is output after being converted into a harmonic laser beam having a 1/N wavelength. Common non-linear crystals include an LBO crystal ($LiB_3O_5$), a KTP crystal ($KTiOPO_4$), a CLBO crystal ($CsLiB_6O_{10}$), and the like. A laser beam converted so as to assume a half wavelength is called a duplicate harmonic; a laser beam converted so as to assume a one-third wavelength is called a triple harmonic; and a laser beam converted so as to assume a quarter wavelength is called a quadruple harmonic. A linearly-polarized laser oscillator of transverse single mode pulse-oscillated by means of a Q switch is used as a fundamental laser. As mentioned above, in addition to a request for an increase in energy and output, there is a request for an increase in frequency and output particularly for an UV laser typified by a third harmonic. To this end, a fundamental laser of transverse single mode that stably oscillates laser even at a highly-repetitive frequency is indispensable. Under present circumstances, there are many UV laser products adopting, as a fundamental wave, an $Nd:YVO_4$ laser advantageous for oscillation at a highly-repetitive frequency. For instance, a third harmonic laser having an average output of about 20 W at a repetition frequency of; for instance, 100 kHz, is also commercially available. In the meantime, a UV laser of high energy type often adopts an Nd:YAG laser advantageous for an increase in output as a fundamental laser.

FIG. 14 of Non-patent Document 2 shows a report about an example in which an output of a fundamental laser beam oscillated by a birefringence compensation technique, such as that mentioned above, is increased to 205 W by the MOPA technique that causes the fundamental laser beam to pass through an excited YAG rod, to thus produce an amplified output, and that causes the thus-amplified output to enter nonlinear crystal, whereby a third harmonic having a maximum output of 64 W is acquired at a frequency of 40 to 45 kHz.

Patent Document 1: JP-A-2003-8121 (FIG. 1)

Non-patent Document 1: M. Frede et al., "High power fundamental mode Nd:YAG laser with efficient birefringence compensation," Opt. Express 12, 3581 to 3589 (2004) (FIG. 5)

Non-patent Document 2: Charles X. Wang et al., "High Power Q-switched TEM00 Mode Diode-Pumped Solid State Lasers with >30 W Output Power at 355 nm," Proc. Of SPIE Vol. 6100, 610019, (2006) (FIG. 14)

DISCLOSURE OF THE INVENTION

Problem that the Invention is to Solve

However, the related-art techniques pertaining to the solid-state laser; particularly, the related-art techniques pertaining to the Nd:YAG laser, are all intended for inducing stable oscillation of high power laser under the conditions of the intensive thermal lens. However, there have been two problems in aiming at achieving a higher output or performing laser oscillation under the conditions of the intensive thermal lens. One problem is that an increase arise in heat load imposed on a laser element and deviation of laser resonance from an ideal state along with an increase in excitation input for achieving a higher output, which eventually produces a factor for hindering high power oscillation and leads to output saturation. Another problem is that, even in a configuration which enables, in principle, laser oscillation close to an ideal state and which does not cause any hindrance factor for the time of high power oscillation, a design value for a resonator compliant with a high output (an intensive thermal lens) cannot be determined.

Patent Document 1 is described by reference to an example. In a configuration described in connection with Patent Document 1, it is in principle possible to design a resonator under conditions of however intensive a thermal leans, by adjusting a focal length and layout of a concave lens disposed within a resonator as thermal lens compensation means. In reality, however, factors hindering high power oscillation arise as a result of laser oscillation deviating from an ideal symmetrical state at the time of high power oscillation. Since the inhibition factor has a characteristic of increasing along with an increase in excitation input, there arises a saturation phenomenon in which a laser output does not increase in excess of a certain level even when a resonator that causes oscillation at however high an excitation input is designed. Specifically, in the case of a symmetrical resonator adopting birefringence compensation, the phenomenon is a problem of a singularity area where oscillation becomes unstable occurring in the center of the oscillation region, thereby hindering performance of high power oscillation in the vicinity of the singularity area. The reason for this is a slight loss of symmetry of the resonators caused by a difference (equivalent to a difference between double lenses; namely, a difference of about 20%) between thermal lenses sensed by the laser beams in the right and left YAG rods as a result of birefringence compensation performed by the 90 degree polarization rotator. In relation to a laser input-output characteristic determined by measurement of changes in a laser output in response to an excitation input, the problem appears in the form of a phenomenon in which an indentation (which will be provisionally called a dip) in an output arises in the vicinity of an area that is the center of a characteristic where a laser output becomes maximum. In particular, as the resonator is designed so as to cause oscillation at a higher excitation input (under conditions of a more intensive thermal lens), the loss of symmetry becomes greater; the singularity area becomes wider; and the dip becomes greater, thereby hindering high power oscillation. In relation to a known example adopting the configuration described in connection with Patent Document 1, there is a paper report about implementation of transverse single mode laser oscillation having a maximum power of 208 W. However, our tests showed that a power of 120 W or thereabouts is the limit to which transverse single mode oscillation can be stably performed by the configuration. Even when the design was aimed at achieving high power oscillation by further increasing an excitation input, the laser output was saturated at about 120 W, so that high power transverse single mode oscillation could not be achieved.

The other problem is described by taking Non-patent Publication 1 as an example. In Non-patent Publication 1, an image transfer connection is established between the right and left YAG rods by the telescope inserted therebetween, thereby preventing loss of symmetry of laser resonance. As a result, a dip does not arise, and a factor for hindering high power oscillation does not occur. However, in the image transfer configuration, the telescope limits the focal length of each of the two convex lenses to "f" and the distance between the lenses to 2 f. Therefore, in reality, there arises a problem of an inability to design a resonator compliant with a high excitation input. In the configuration, the right and left resonator mirrors are embodied by a mirror having an extremely acute curvature (a short curvature radius), whereby the resonator can be made compliant with a high excitation input. However, in such a case, the diameter of the beam on the mirror becomes extremely small. Hence, a limit on the light resistance intensity of reflection coating of the mirror is exceeded, so that the mirror is damaged. For this reason, it is impossible to cope with an increase in output to a certain extent or more, and difficulty is encountered in performing high power oscillation of 100 W or more in transverse single mode.

In relation to the configuration, there is adopted an end pumping configuration for converging and radiating excitation light from a plurality of LD light sources to both end faces of the respective YAG rods. In this case, excitation light is locally, intensively absorbed in the vicinities of both end faces of the YAG rods; hence, intensive thermal lenses locally arise. In reality, however, it is very difficult to make uniform the intensity distribution of excitation light generated by superimposing a plurality of LD light beams on each other, and all of the thermal lenses do not become uniform lenses having identical characteristics. As a consequence, there arises a case where, even when an image transfer connection is established between the YAG rods by a telescope, asymmetry of laser resonance actually remains, thereby eventually causing the hindrance factor for high power oscillation that is the foregoing problem. The end pumping configuration exhibiting high excitation density is originally advantageous to implement stable transverse single mode oscillation at a highly-repetitive frequency by the Nd:YAG laser; however, the feature acts as a block for commercialization.

Alternatively, another conceivable method is a combination of a resonator, which includes a combination of the telescope with a birefringence compensation technique, and the thermal lens compensation means described in connection with Patent Document 1. However, both a telescope and concave lenses for thermal lens compensation; namely, a total of four lenses or more, are arranged within the resonator, thereby making a configuration very complicate. Therefore, in fact, the configuration is not an adjustable resonator configuration, and the method is not a technique applicable to industrial products.

Like the fundamental oscillator section shown in FIG. 14 of Non-patent Document 2, there is a method for amplifying a transverse single mode laser beam oscillated by a birefringence compensation technique by an MOPA technique and outputting the thus-amplified beam. However, loss of the beam mode becomes noticeable every time amplification and outputting are performed by a plurality of amplifying units, which raises a problem of deterioration of a high light collection characteristic in a transverse single mode despite achievement of an increase in output and a problem of a complex configuration and difficulty in adjustment. Hence, the method cannot be said to be applicable to industrial products.

The present invention has been conceived in light of the foregoing descriptions and aims at obtaining a solid-state laser capable of performing stable transverse single mode oscillation having a high output; desirably, an output of 100 W or greater.

In the meantime, the wavelength conversion laser encounters a problem of difficulty in realizing a wavelength conversion laser that produces a high output at a high frequency. Specifically, when the Nd:YAG laser is used as a fundamental laser oscillator, the efficiency of wavelength conversion achieved at a high frequency is considerably deteriorated by a problem of an increase in the width of a pulse achieved at the time of high-frequency oscillation and a problem of deterioration of stable pulse oscillation. In particular, a wavelength conversion laser that produces a high power harmonic laser beam at a high frequency in excess of 80 kHz cannot have been realized yet. Even when the Nd:YVO4 laser is used, high frequency oscillation of 100 kHz or higher is possible. However, high power oscillation cannot be performed because of restrictions in the size of YVO4 crystal, and it is difficult to realize a high-power wavelength conversion laser. For instance, in the case of third harmonic laser, an example of wavelength conversion of a maximum of 36 W achieved at 100 kHz has been reported by papers and the like. However, reported wavelength conversion is a result of an increase in the intensity of light collected by nonlinear crystal and the efficiency of wavelength conversion, thereby sacrificing the life of the nonlinear crystal. A product-level technique outputs, as a limit, third harmonic of the order of 20 W at 100 kHz. Eventually, even in any of the fundamental lasers, a third harmonic laser that performs high power oscillation of 30 W or more at 100 kHz at product-level quality cannot be realized.

The present invention aims at providing a wavelength conversion laser that produces a high power harmonic laser beam at a high frequency, desirable, at about 100 kHz by use of the foregoing solid-state laser.

Means for Solving the Problem

In a solid-state laser of the present invention, two convex lenses, each of which has a focal length "f," and a 90 degree polarization rotator are interposed between two solid-state laser elements of a symmetrical resonator, and a space between the two lenses is made short. A distance between the respective lenses and centers of the adjacent solid-state laser elements is set substantially to "f."

Moreover, a wavelength conversion laser of the present invention further has a Q switch and a polarization element in addition to having the solid-state laser of the present invention, and causes an output fundamental laser beam to enter a nonlinear element, to thus perform wavelength conversion.

Advantage of the Invention

The present invention yields an advantage of an ability to design a resonator that can perform oscillation under conditions of an intensive thermal leans by making a contrivance in relation to a configuration of a telescope as well as an ability to enable high power oscillation.

BRIEF DESCRIPTIONS OF THE DRAWINGS

FIG. 1 A schematic diagram of a solid-state laser showing a first embodiment of the present invention.

Figure 2:
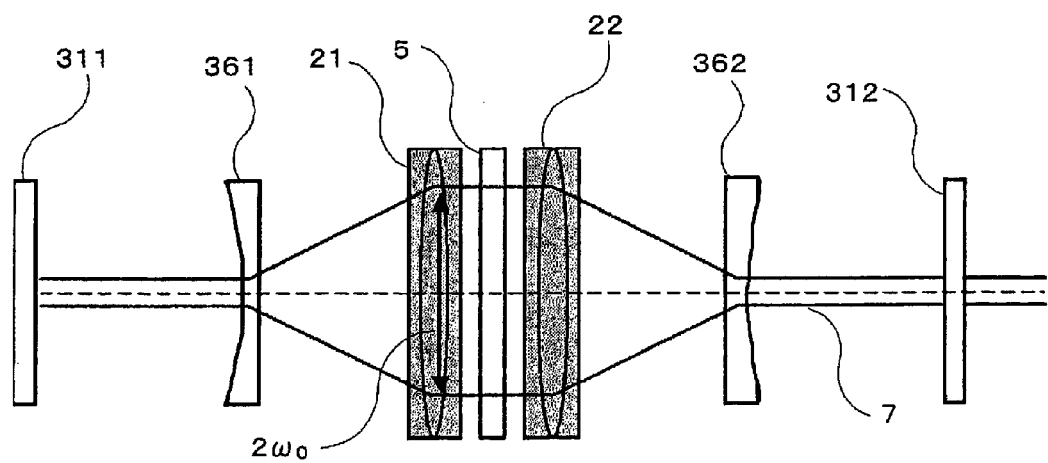

FIG. 2 A schematic diagram of a related-art solid-state laser.

FIG. 3 A view showing a comparison between the configuration of the laser of the first embodiment of the present invention and the configuration of the related-art laser in terms of results of computation of a beam size characteristic.

FIG. 4 A view showing a comparison between the configuration of the laser of the first embodiment of the present invention and the configuration of the related-art laser in terms of test results of a laser output characteristic.

FIG. 5 A view showing a telescope of the first embodiment of the present invention and a telescope of the related-art configuration.

Figure 6:
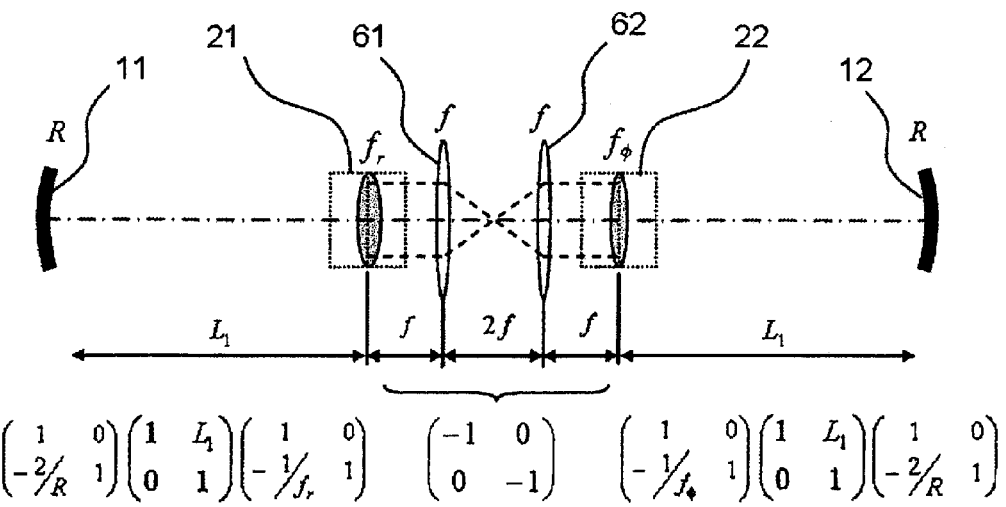
Figure 6:
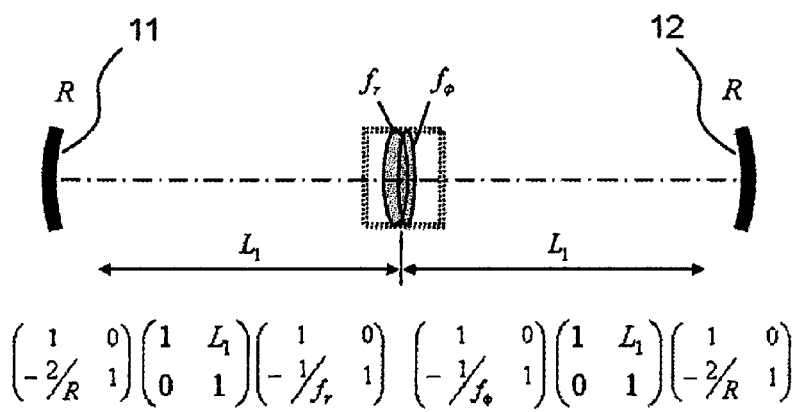

FIG. 6 A view showing an advantage yielded when the telescope of the related-art configuration built in a resonator.

Figure 7:
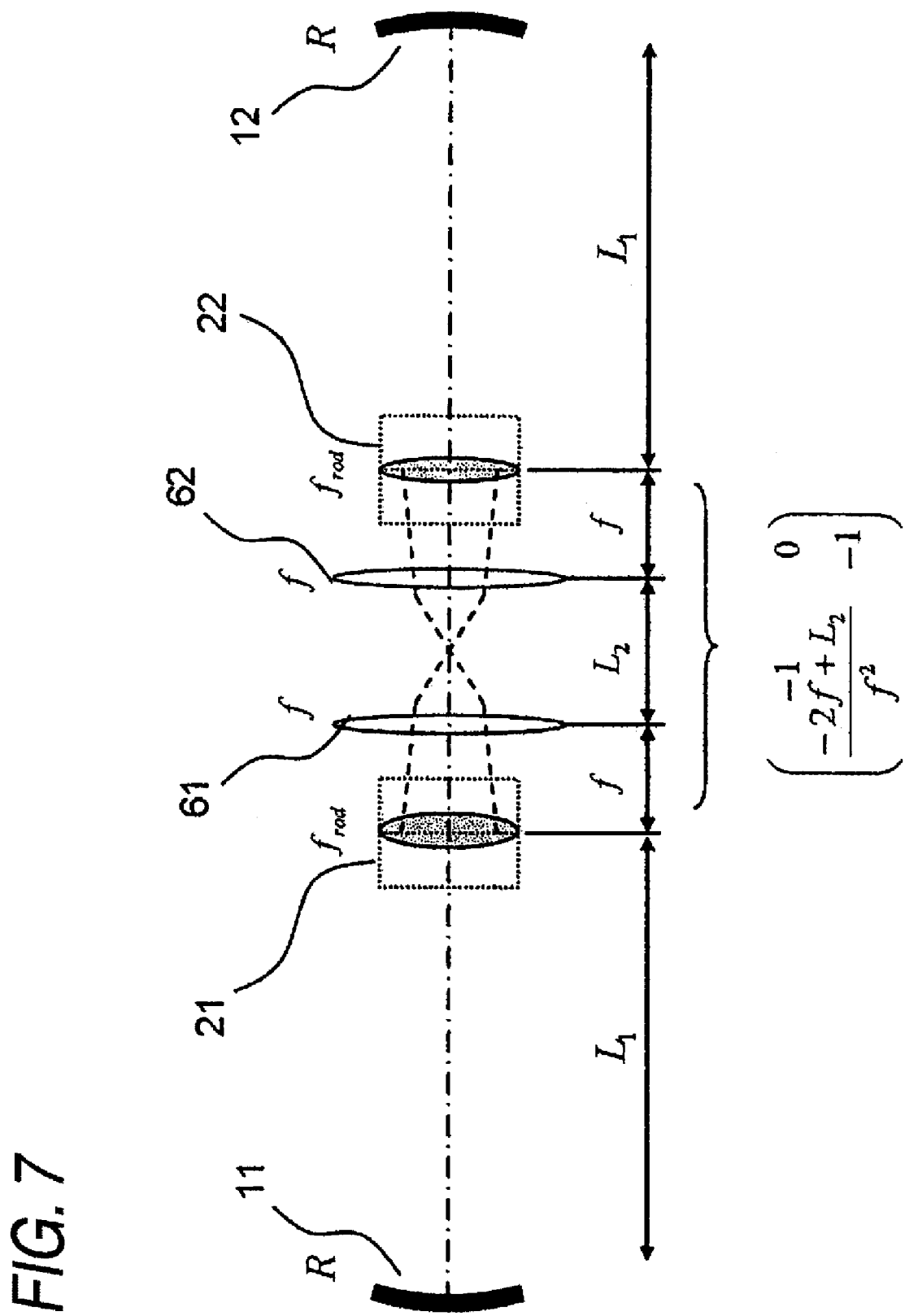

FIG. 7 A view of a resonator into which the telescope of the first embodiment of the present invention is built.

Figure 8:
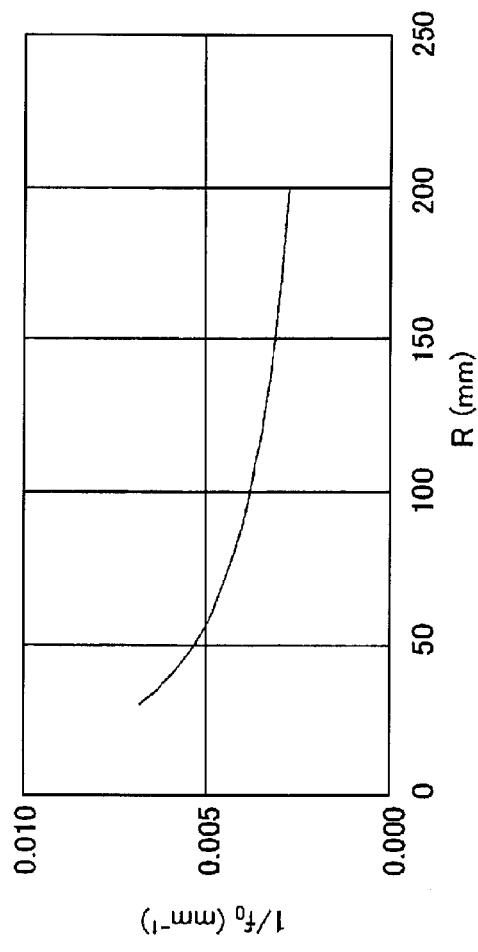

FIG. 8 A view showing computation results of intensity of a thermal lens capable of performing oscillation in the related-art configuration.

Figure 9:
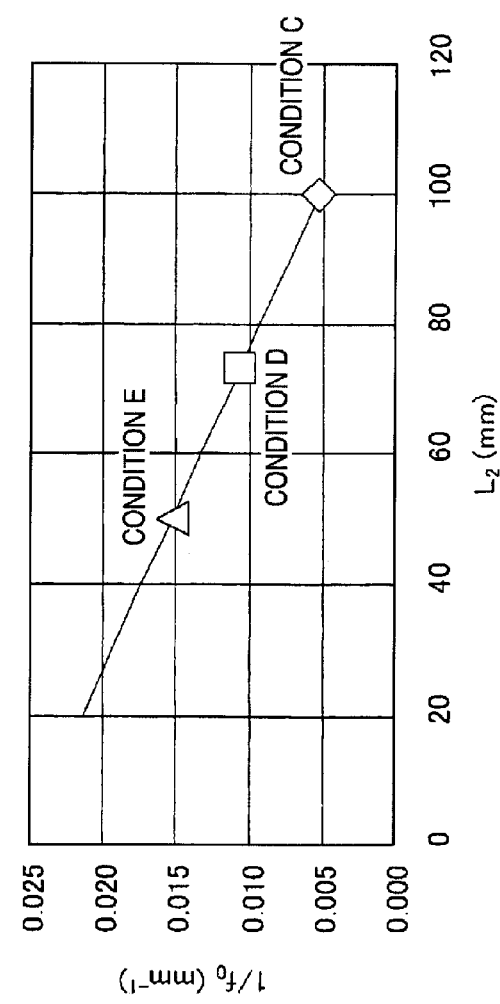

FIG. 9 A view showing results of computation of the intensity of a thermal lens that can perform oscillation in the solid-state laser of the first embodiment of the present invention.

Figure 10:
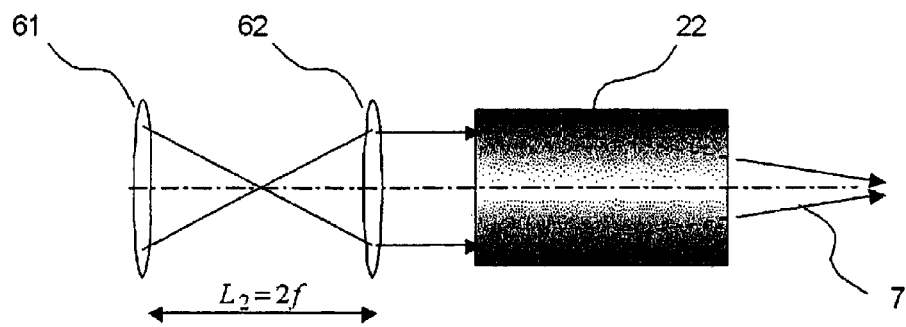
Figure 10:
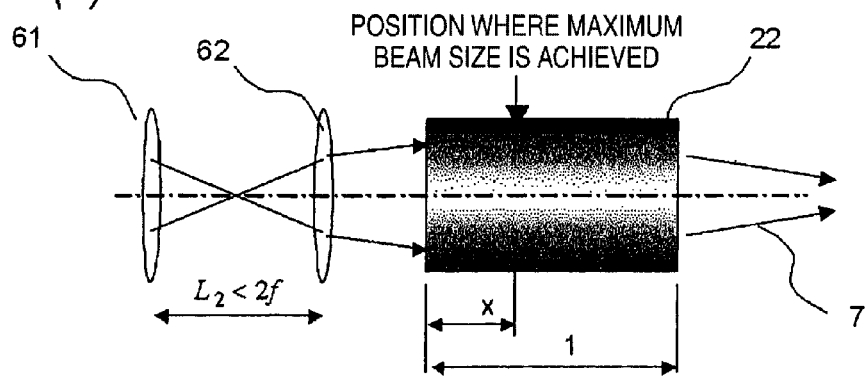
Figure 10:
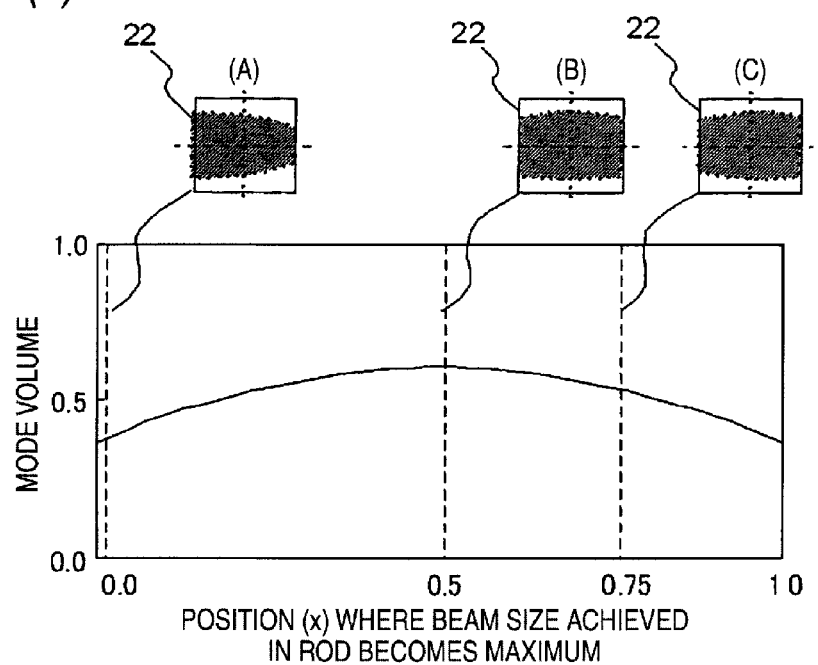

FIG. 10 A view showing conditions under which the solid-state laser of the first embodiment of the present invention exhibits the maximum mode volume.

Figure 11:
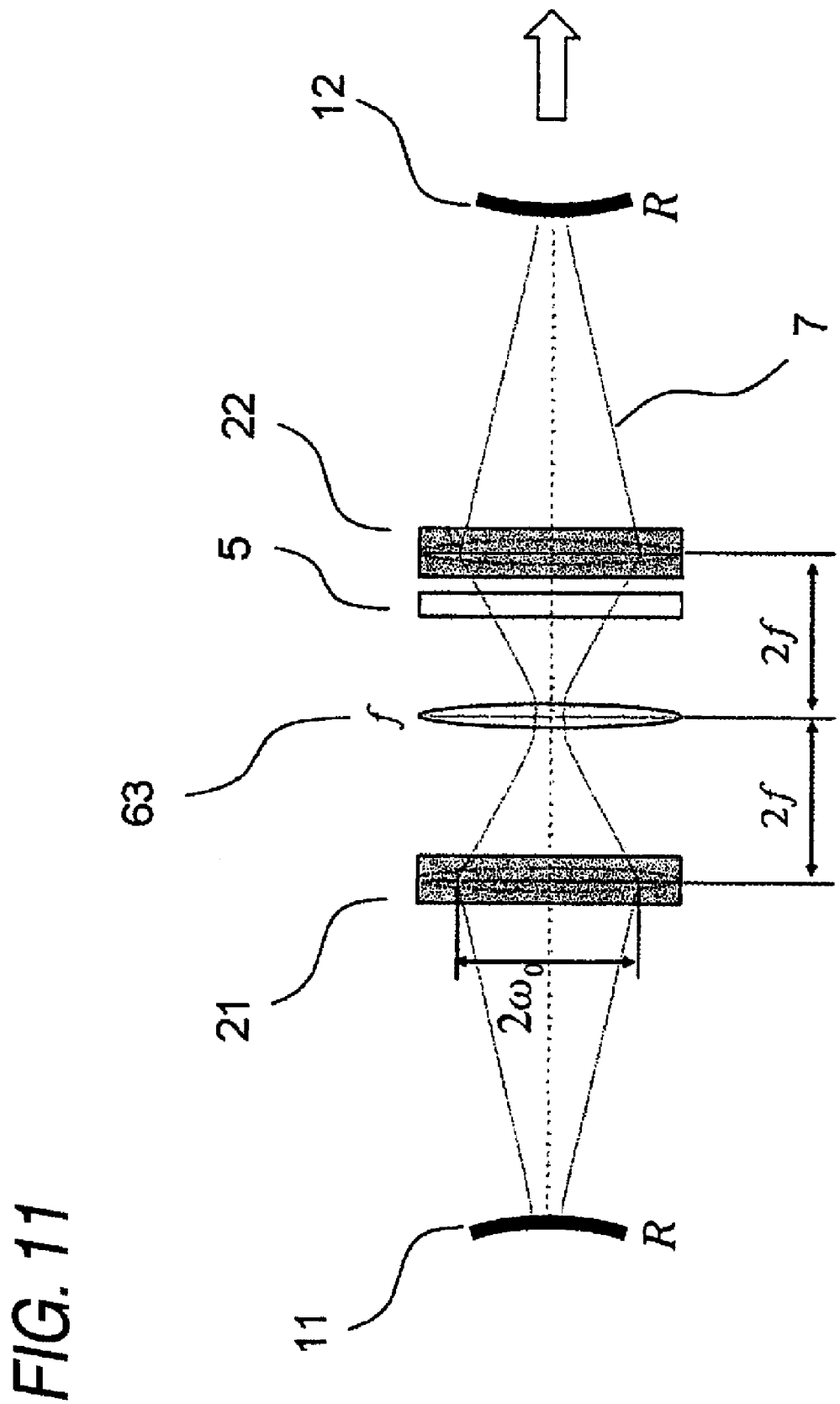

FIG. 11 A schematic diagram of a solid-state laser showing a second embodiment of the present invention.

Figure 12:
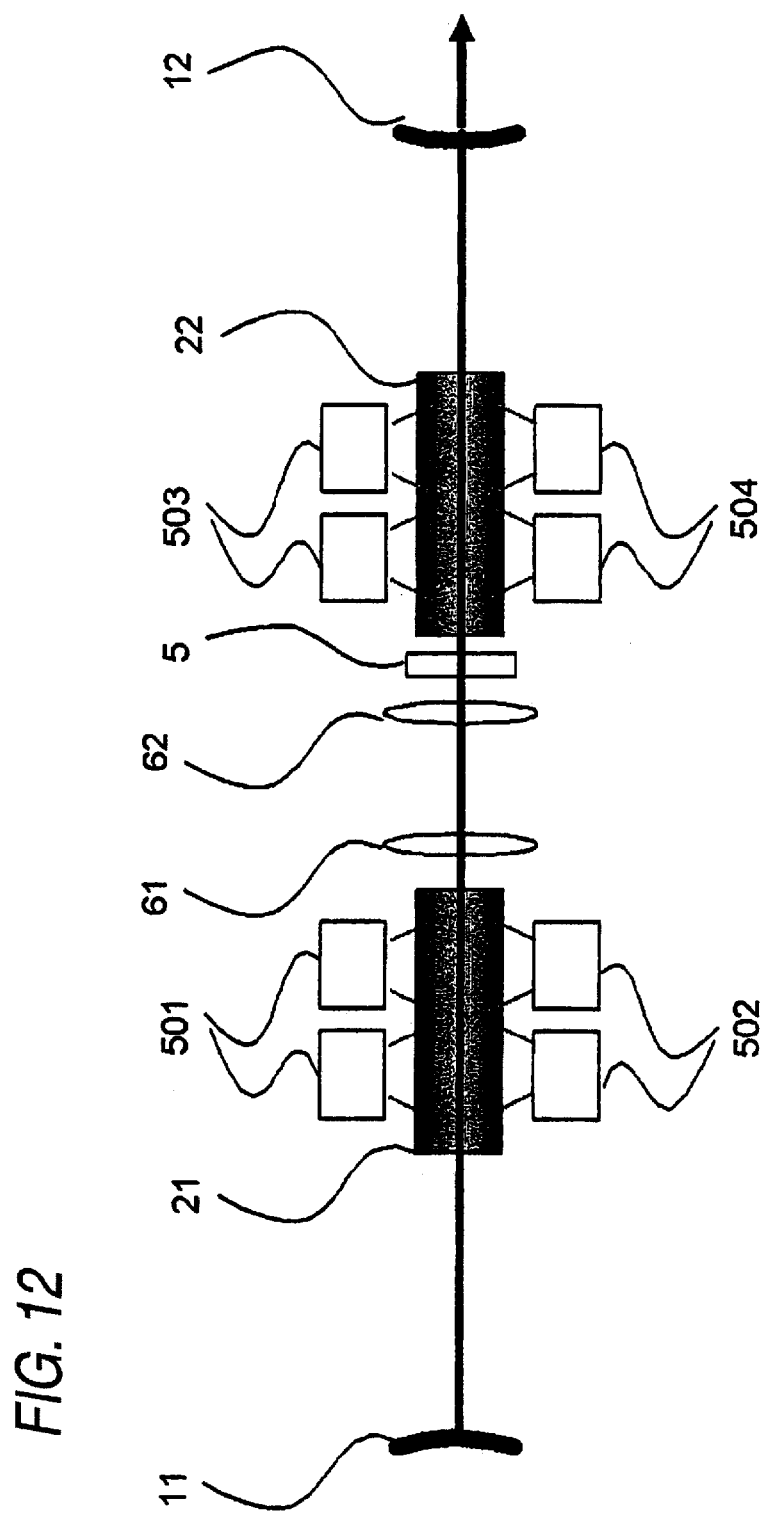

FIG. 12 A schematic diagram of a solid-state laser showing a third embodiment of the present invention.

Figure 13:
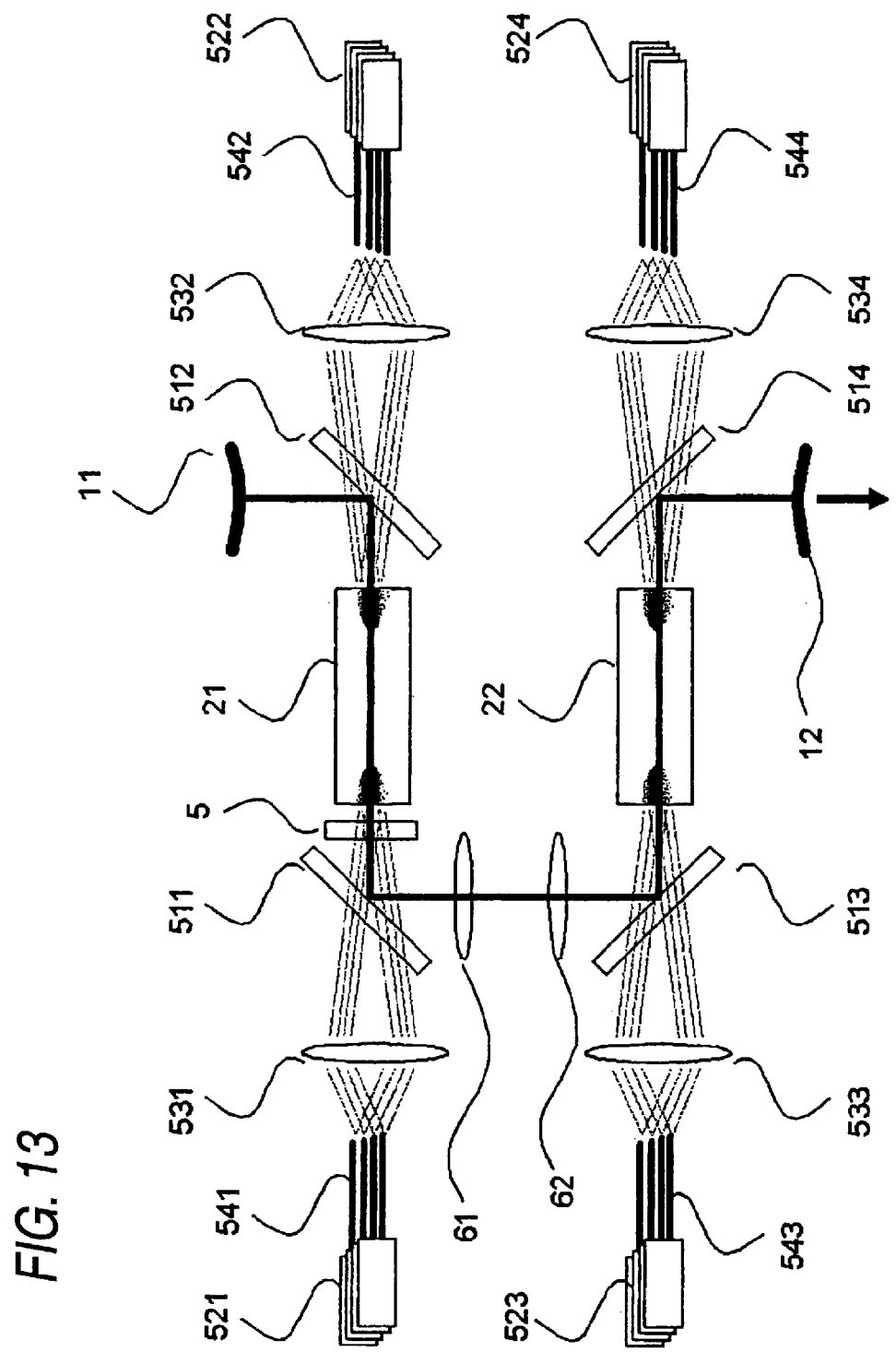

FIG. 13 A schematic diagram achieved when the solid-state laser of the third embodiment of the present invention performs end pumping.

FIG. 14 A view showing an intensity distribution of excitation light achieved when the solid-state laser performs end pumping.

FIG. 15 A view showing a thermal lens occurred in a YAG rod when the solid-state laser of the third embodiment of the present invention performs end pumping.

Figure 16:
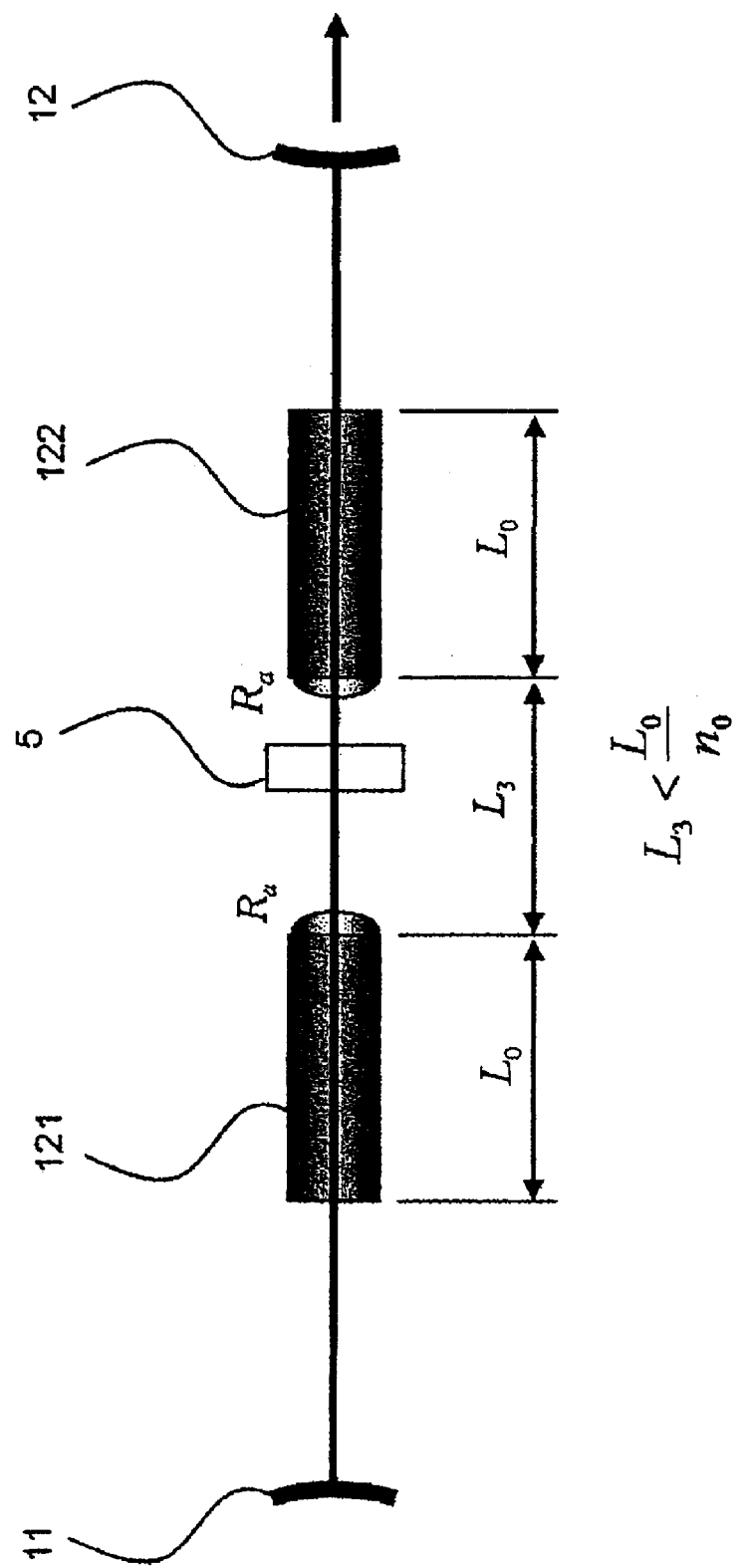

FIG. 16 A schematic diagram of a solid-state laser showing a fourth embodiment of the present invention.

Figure 17:
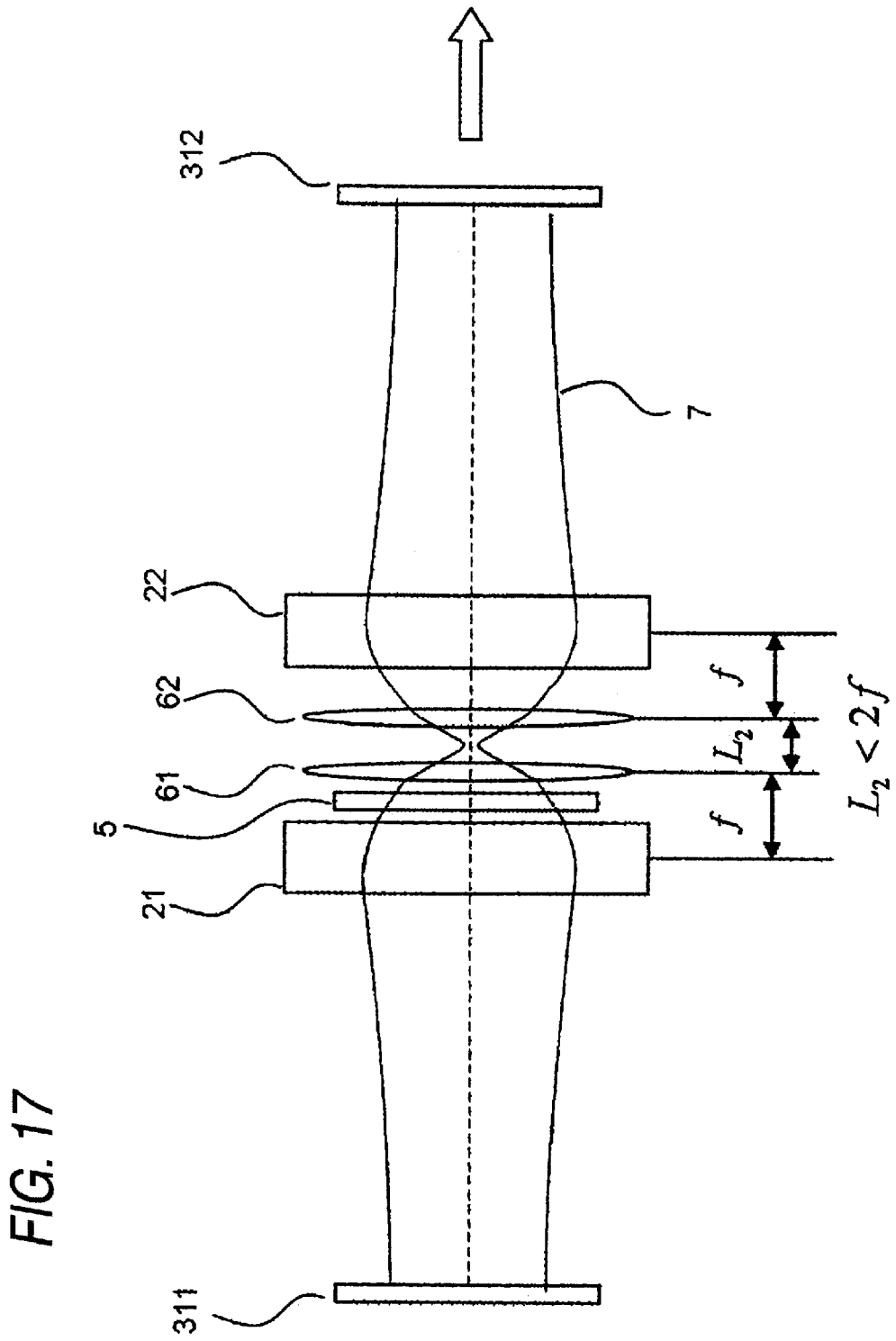

FIG. 17 A schematic diagram of a solid-state laser showing a fifth embodiment of the present invention.

Figure 18:
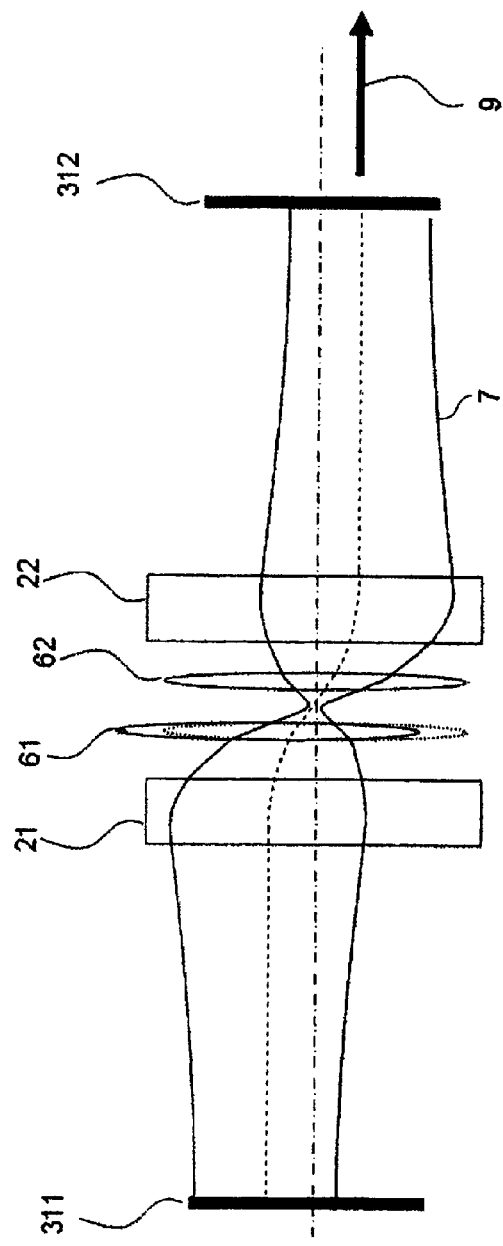
Figure 18:
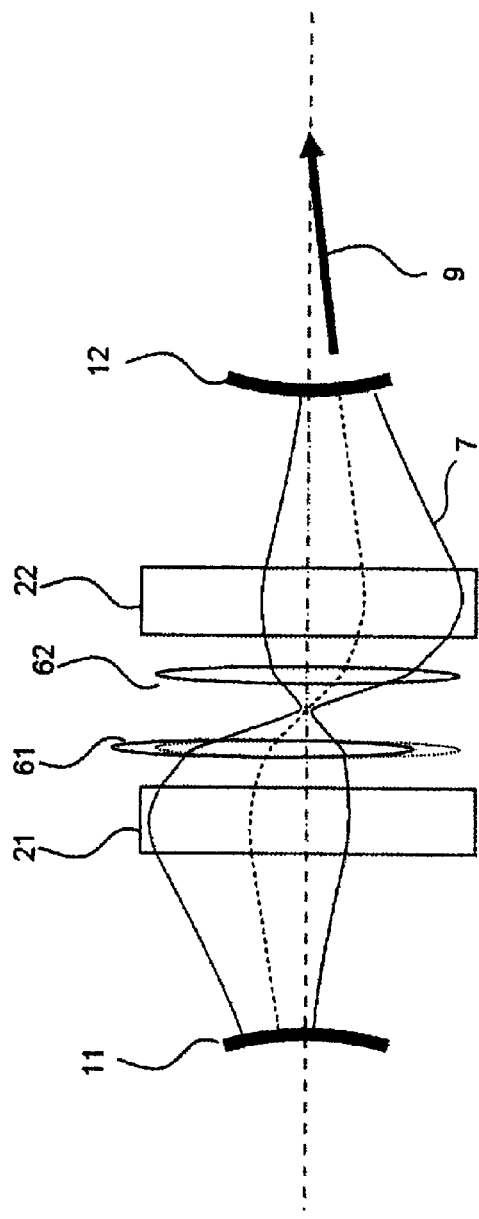

FIG. 18 A view showing an offset of an optical axis resultant from a positional variation in an optical component of the solid-state laser of the fifth embodiment of the present invention and an offset of an optical axis resultant from a positional variation in an optical component of the solid-state laser of the first embodiment.

Figure 19:
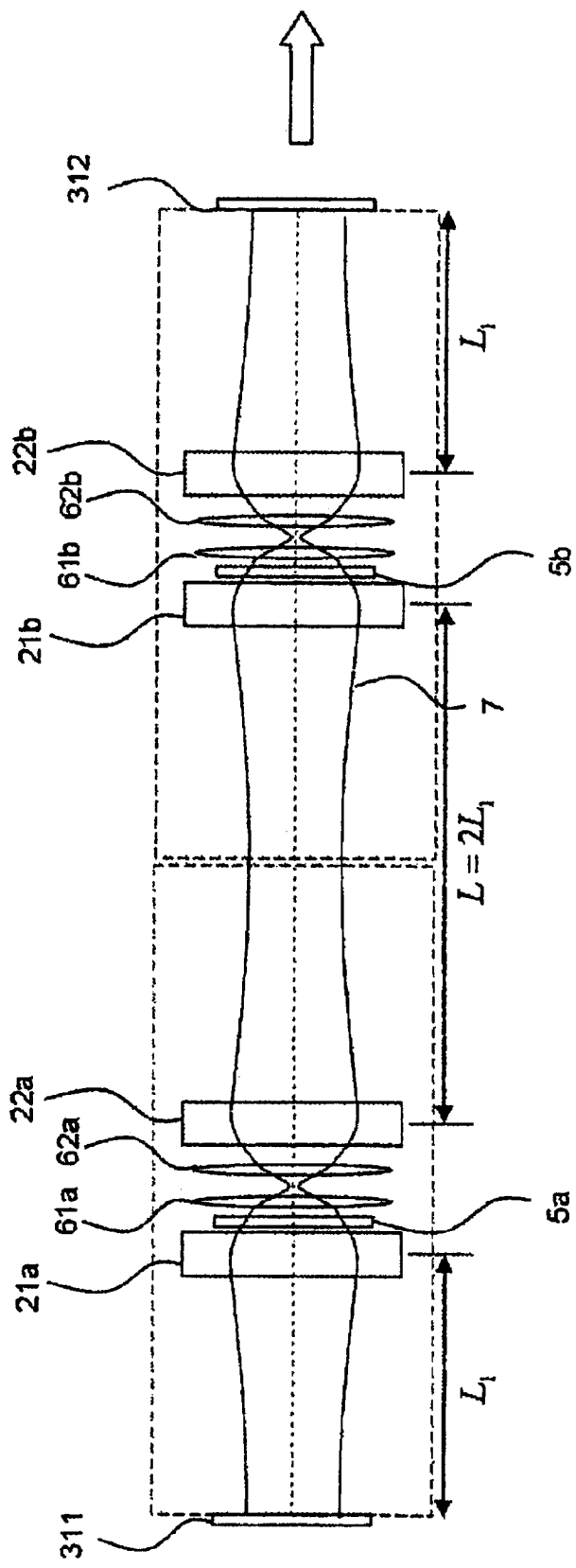

FIG. 19 A schematic diagram of a solid-state laser showing a sixth embodiment of the present invention.

FIG. 20 A view showing a comparison between the solid-state laser of the sixth embodiment of the present invention and the solid-state laser of the fifth embodiment in terms of a configuration and an oscillation region.

Figure 21:
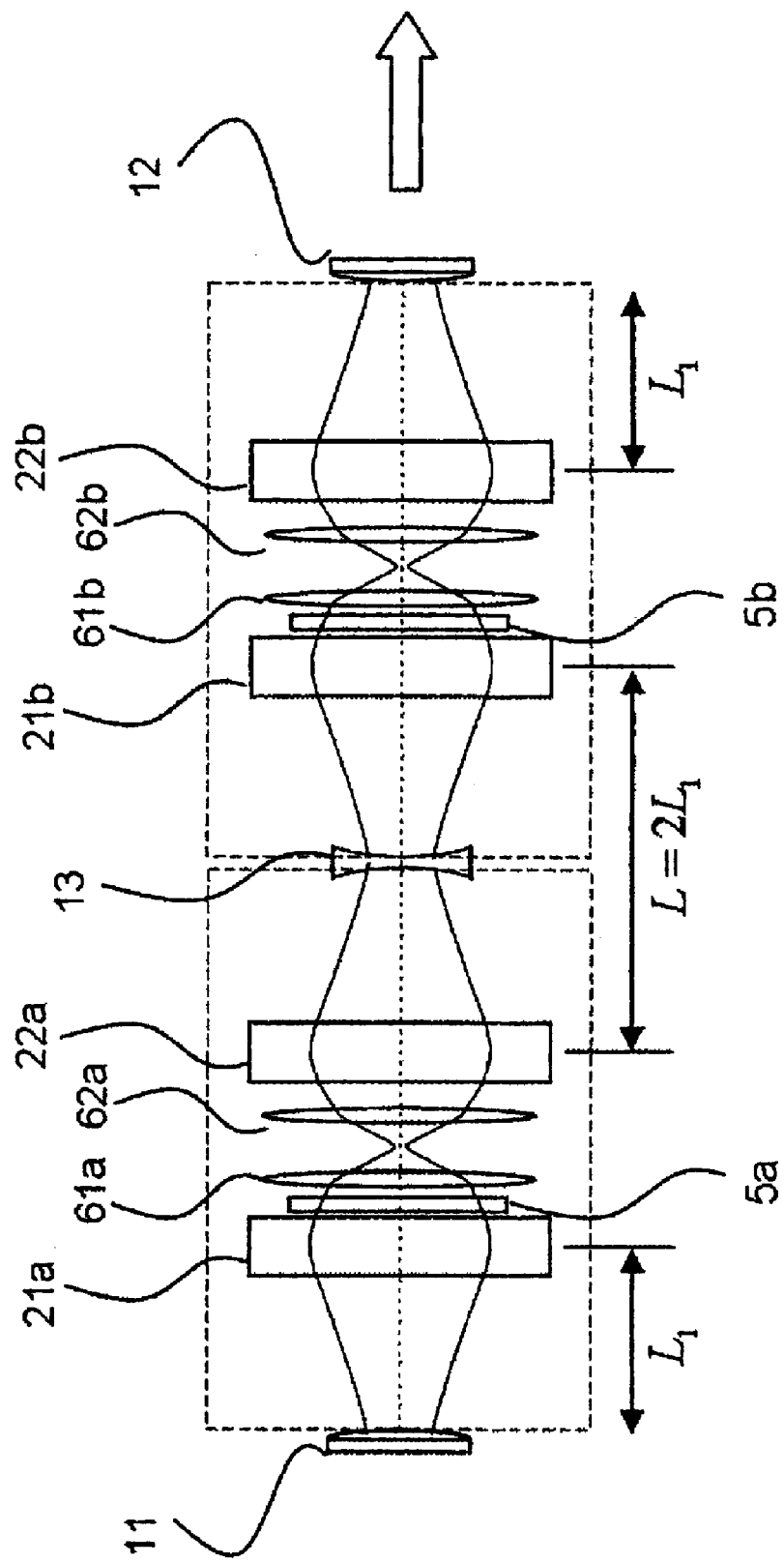

FIG. 21 A schematic diagram of a solid-state laser showing a seventh embodiment of the present invention.

Figure 22:
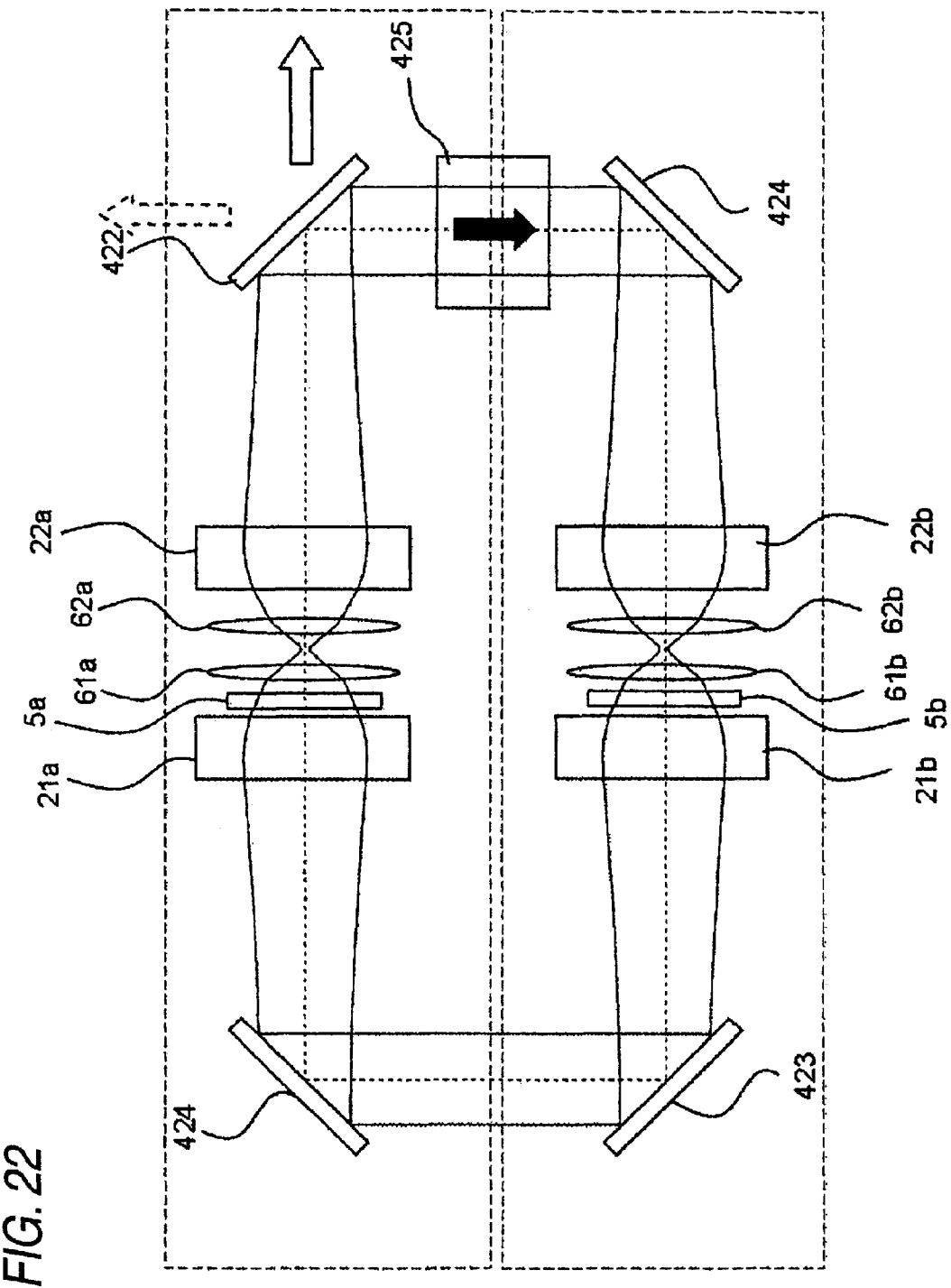

FIG. 22 A schematic diagram of a solid-state laser showing an eighth embodiment of the present invention.

Figure 23:
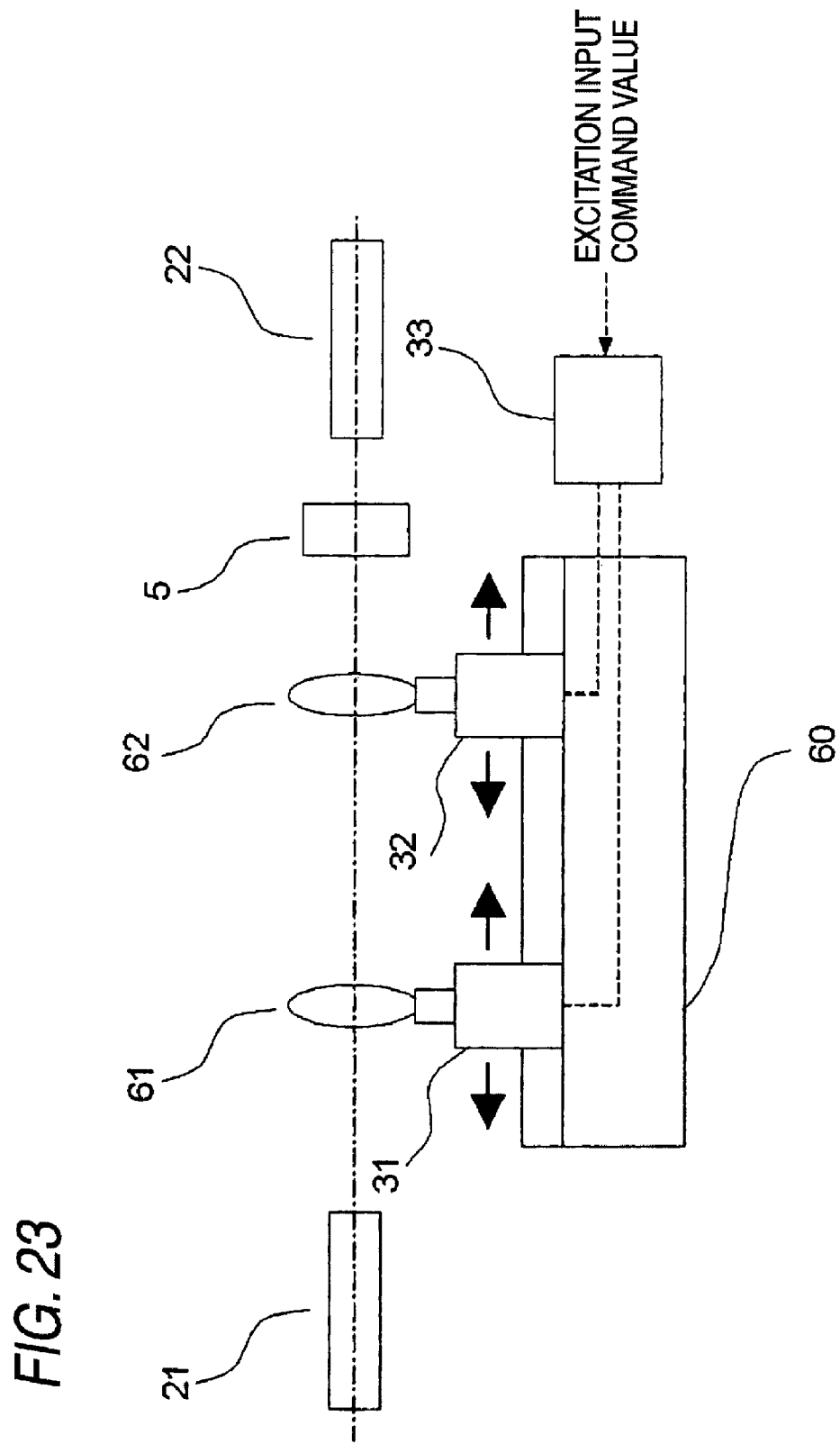

FIG. 23 A schematic diagram of a telescope of a solid-state laser showing a ninth embodiment of the present invention.

FIG. 24 A schematic diagram of a solid-state laser showing a tenth embodiment of the present invention.

Figure 25:
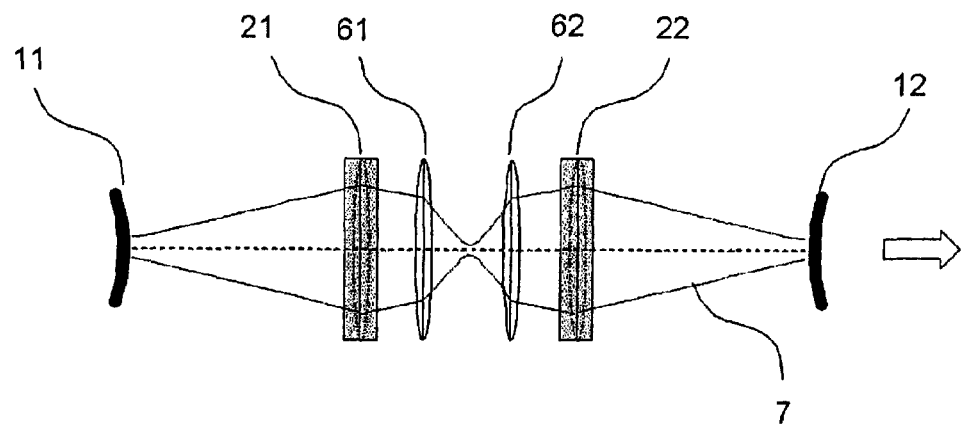
Figure 25:
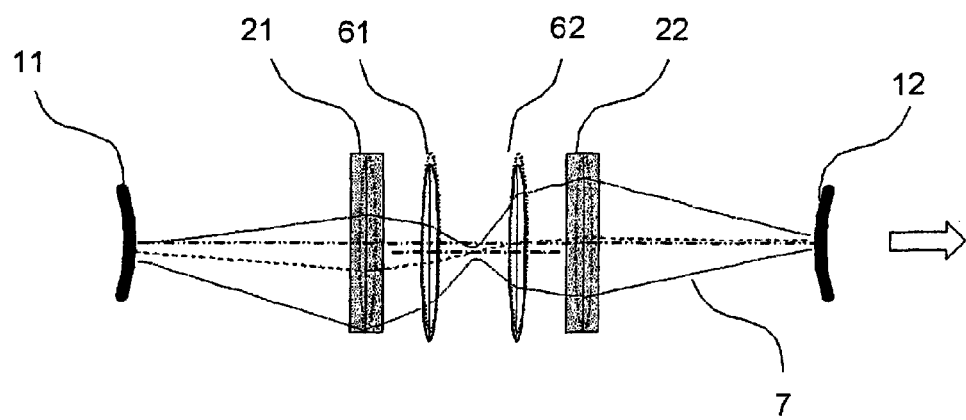
Figure 25:
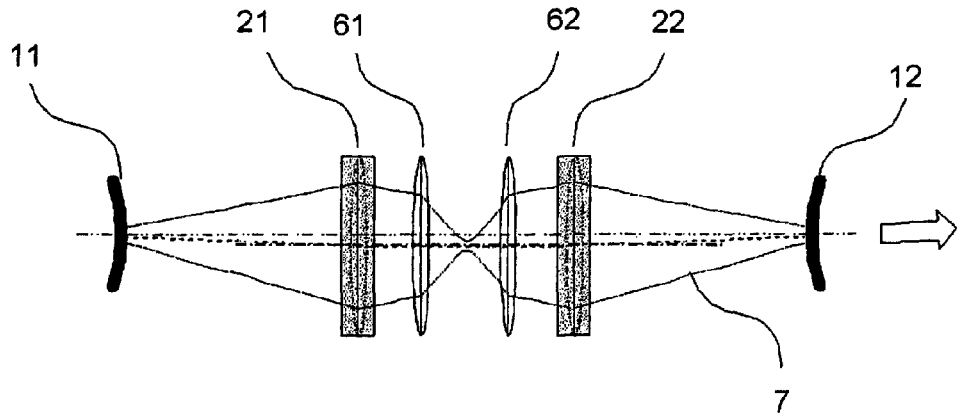

FIG. 25 A diagram showing a positional displacement of an optical element and an offset of an optical axis of a laser beam of the present invention.

Figure 26:
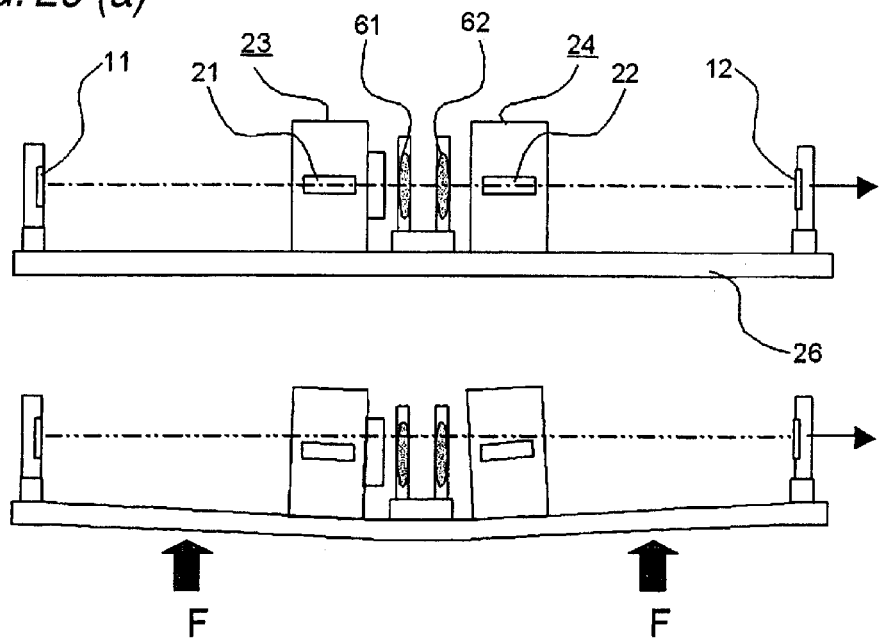
Figure 26:
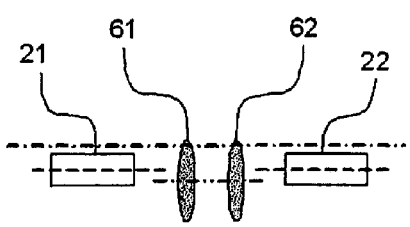
Figure 26:
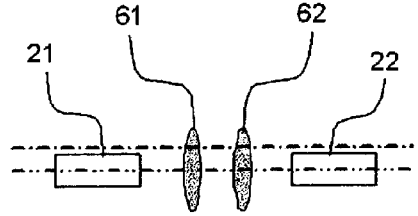
Figure 26:
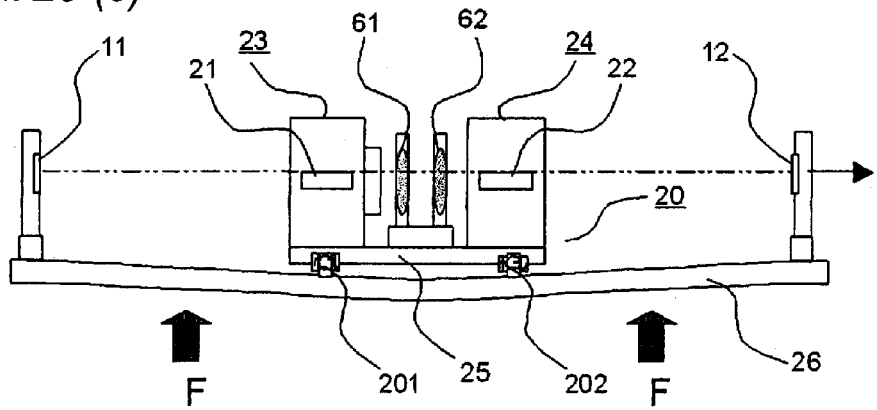

FIG. 26 A view showing an advantage yielded by the tenth embodiment of the present invention.

Figure 27:
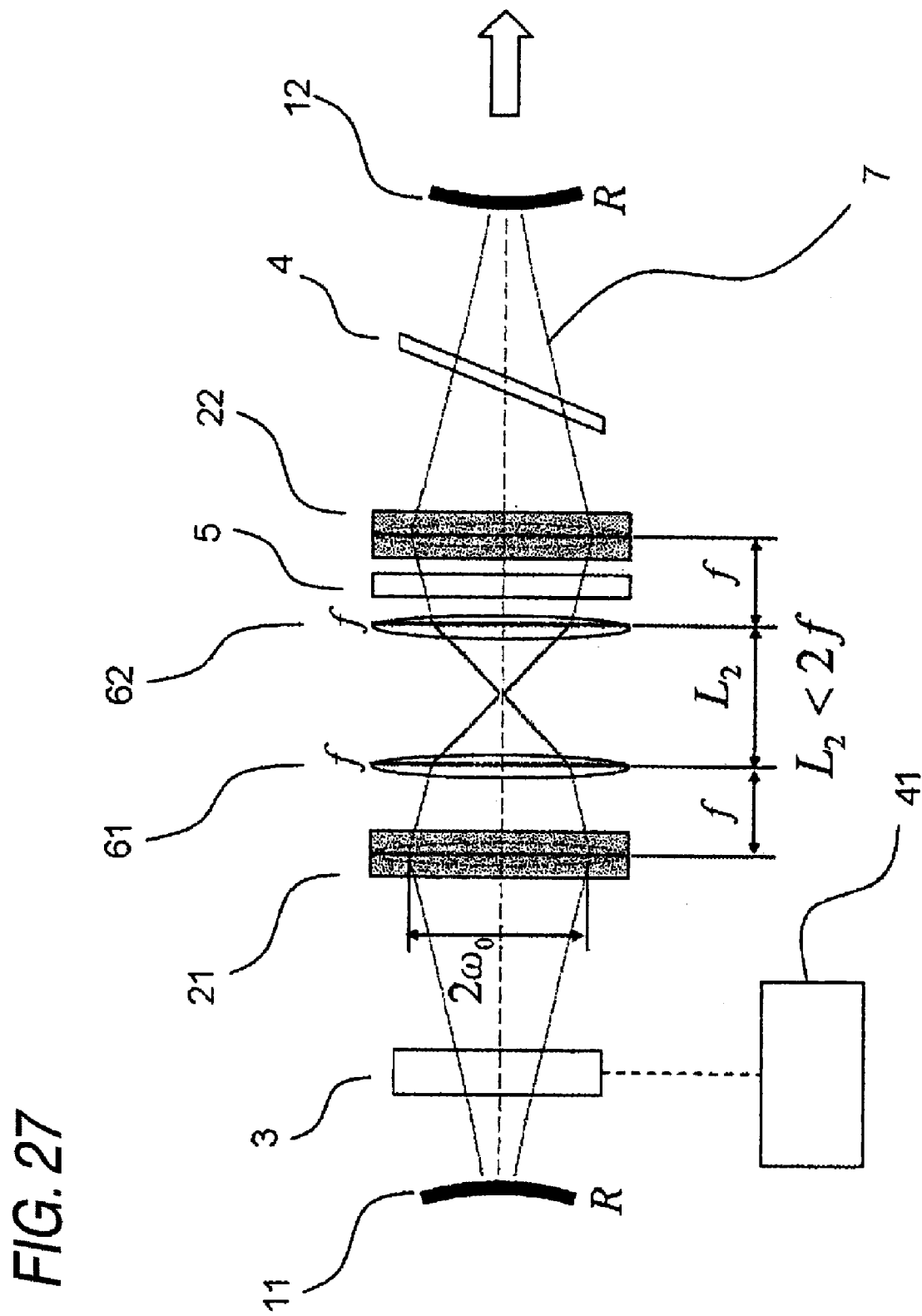

FIG. 27 A schematic diagram of a solid-state laser showing an eleventh embodiment of the present invention.

Figure 28:
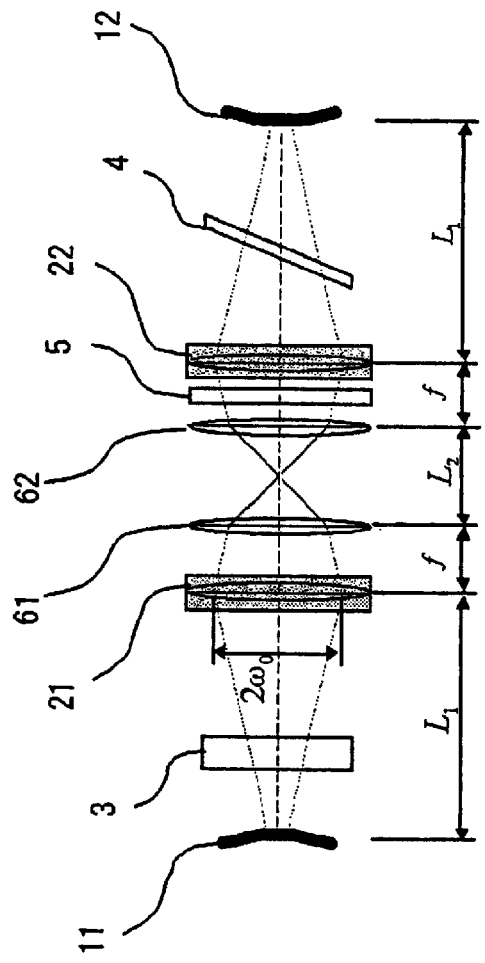
Figure 28:
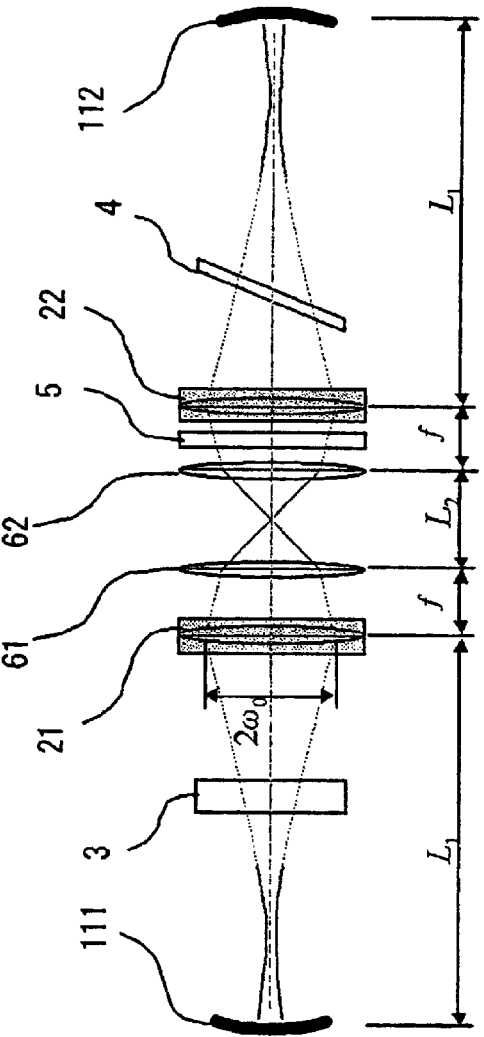

FIG. 28 A view showing the influence of irregularities of a resonator mirror of the eleventh embodiment of the present invention.

Figure 29:
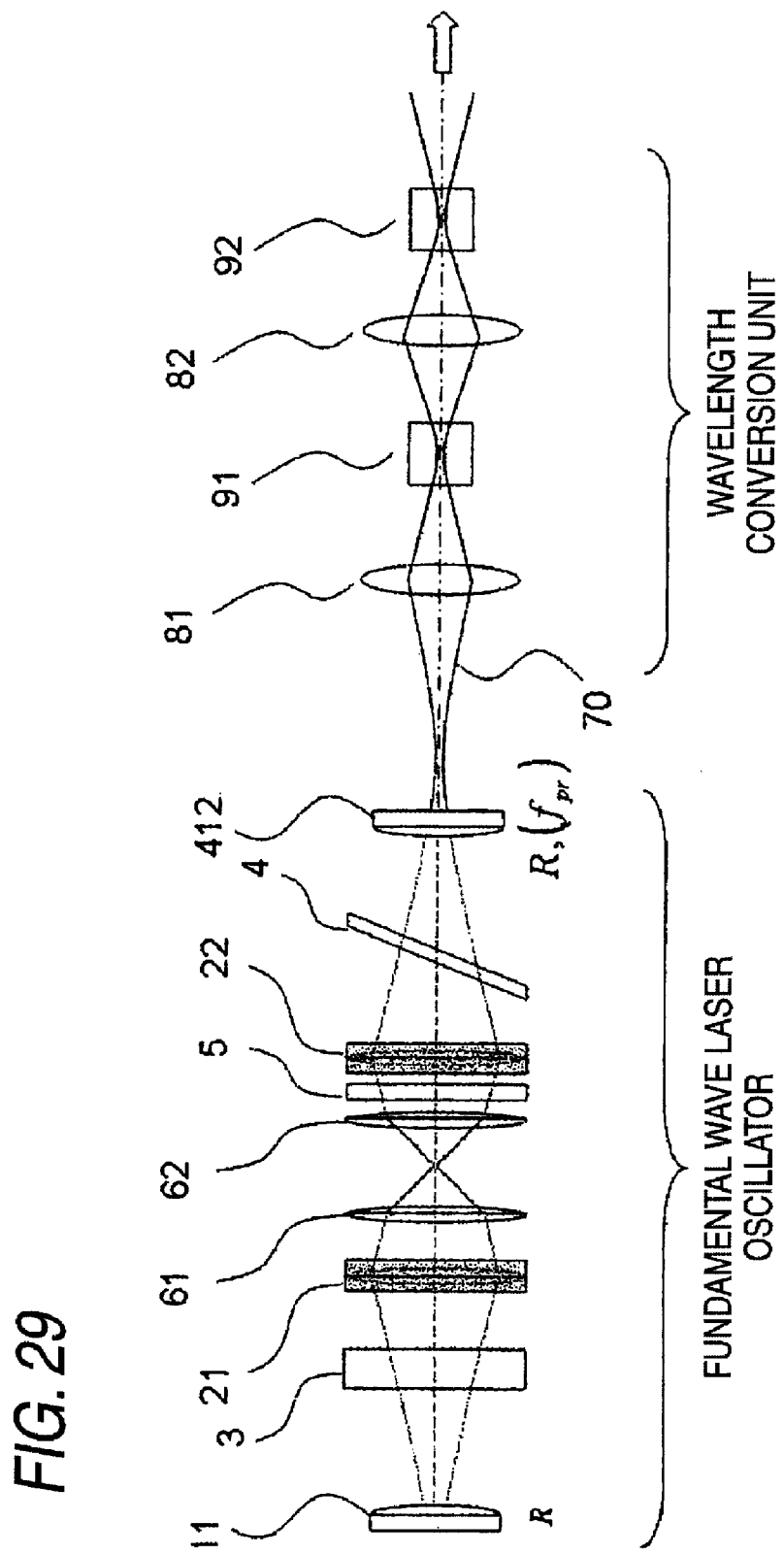

FIG. 29 A schematic diagram of a solid-state laser showing a twelfth embodiment of the present invention.

FIG. 30 A schematic diagram of a solid-state laser showing a thirteenth embodiment of the present invention.

FIG. 31 A schematic diagram of a solid-state laser showing a fourteenth embodiment of the present invention.

FIG. 32 A view showing the influence of variations in pointing in the fourteenth embodiment of the present invention.

Figure 33:
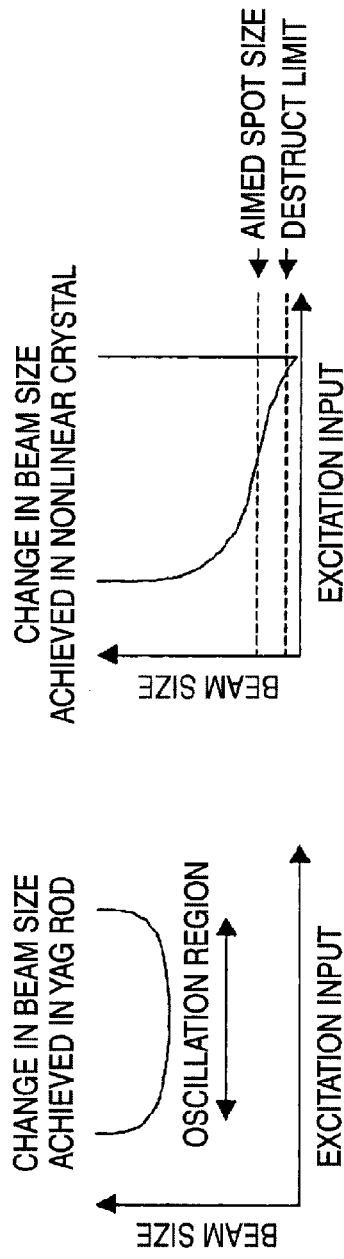
Figure 33:
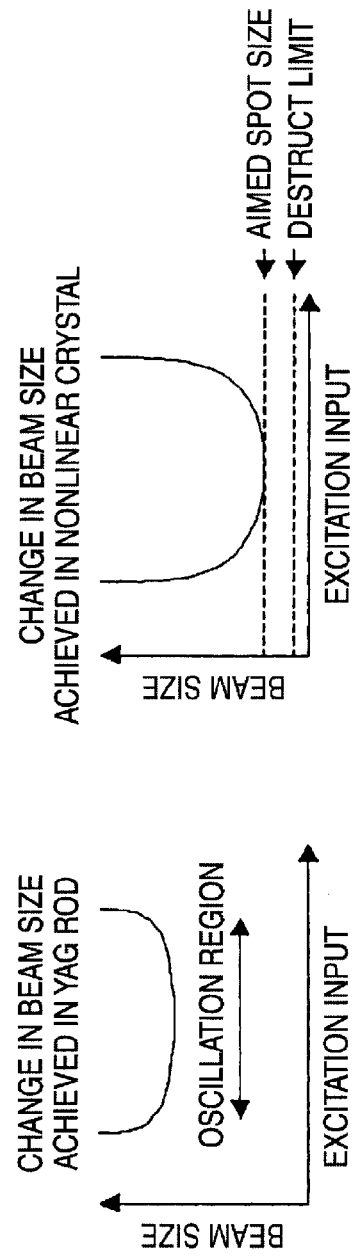

FIG. 33 A view showing the influence of variations in beam size in the fourteenth embodiment of the present invention.

FIG. 34 A schematic diagram of a solid-state laser showing a fifteenth embodiment of the present invention.

BEST MODES FOR IMPLEMENTING THE INVENTION

Embodiments of a solid-state laser and a wavelength conversion laser of the present invention will be described in detail hereunder by reference to the drawings. The invention is not limited by the embodiments. A word "distance" used herein is assumed to represent an optical distance unless otherwise specified.

First Embodiment

FIG. 1 is a view showing the configuration of an embodiment of a solid-state laser of the present invention. In the solid-state laser, a resonator is built from a total reflection mirror 11 and a partial reflection mirror 12. Two solid-state laser elements 21, 22, a 90 degree polarization rotator 5, and two lenses 61, 62 are arranged along a single axis within the resonator. A solid-state laser element positioned on the same side as the total reflection mirror 11 is hereinafter called a first solid-state laser element 21 or a left solid-state laser element 21, and a solid-state laser element positioned on the same side as that of the partial reflection mirror 12 is called a second solid-state laser element 22 or a right solid-state laser element 22. A lens positioned on the same side as the total reflection mirror 11 is called a first lens 61, and a lens positioned on the same side as the partial reflection mirror 12 is called a second lens 62. The first solid-state laser element 21 and the second solid-state laser element 22 are, by way of example, YAG rods of the same size. The laser elements are excited by equivalent excitation inputs, and equivalent thermal lenses arise in the laser elements (the solid-state laser elements are hereinafter also called "YAG rods"). The total reflection mirror 11 and the partial reflection mirror 12 are mirrors, each of which has a curvature radius R, and positioned in an optically-symmetrical pattern with the two solid-state laser elements 21 and 22 interposed between the mirrors, thereby constituting a symmetrical resonator (the total reflection mirror 11 and the partial reflection mirror 12 are hereinafter called "resonator mirrors").

A resonator of birefringence compensation type is built from the symmetrical resonator, the first solid-state laser element 21, the second solid-state laser element 22, and the 90 degree polarization rotator 5 interposed between the laser elements. Both the first lens 61 and the second lens 62 are convex lenses, each of which has a focal length "f," and constitute a telescope interposed between the first solid-state laser element 21 and the second solid-state laser element 22. An optical distance between the first lens 61 and the center of the adjacent first solid-state laser element 21 is set so as to become substantially equal to the focal length "f" of each of the lenses 61 and 62, and an optical distance between the second lens 62 and the center of the adjacent second solid-state laser element 22 is likewise set substantially to "f." An optical distance between the first lens 61 and the second lens 62 is set to an arbitrary length $L_2$ that is less than 2 f to be described later. A location where the 90 degree polarization rotator 5 is to be positioned may also be anywhere, so long as the position is between the laser elements. However, from the viewpoint of durability, the 90 degree polarization rotator is usually positioned between the first solid-state laser element 21 having a large beam size and the first lens 61 or between the second solid-state laser element 22 and the second lens 62.

In the solid-state laser oscillator, each of the YAG rods 21 and 22 has an intensive thermal lens; hence, there is oscillated a laser beam in a state of propagation such that the maximum beam size is achieved in the respective YAG rods 21 and 22 and that a narrow beam size is achieved on the respective resonator mirrors 11 and 12, as indicated by a trace of the oscillated laser beam 7 in FIG. 1. Provided that the maximum transverse single mode beam size achieved in each of the solid-state laser elements 21 and 22 is $2\omega_0$, a highly-efficient transverse single mode laser beam is oscillated when the resonator is designed in such a way that $2\omega_0$ assumes a sufficiently-large value with respect to an outer diameter D of each of the YAG rods 21 and 22. The sufficiently-large value is usually a value which is about 70% of the outer diameter of the YAG rod. However, depending on a configuration, there is a case where transverse single mode oscillation arises at a value of 60% or more, and hence the value is not unconditionally specified by a numeral.

The telescope interposed between the right and left solid-state laser elements 21 and 22 performs image transfer such that two images achieved at the center of the first solid-state laser element 21 and the center of the second solid-state laser element 22 overlap each other. In the resonator of birefringence compensation type, the respective right and left YAG rods cause the oscillated laser beam to sense different thermal lenses, and hence asymmetry of the resonator arises. However, when the telescope subjects the centers of the right and left YAG rods to image transfer, the oscillated laser beam to sense the thermal lenses as if thermal lenses of different intensities occurred at the same position; hence, there arises a state where the two different thermal lenses arise in the center of the resonator in an overlapping manner, and asymmetry of the resonator is canceled.

According to the related-art technique described in Non-patent Document 1, the configuration of the telescope is such a limited layout that a distance $L_2$ between the first lens and the second lens becomes equal to a value (2 f) that is twice the focal length "f" of each lens. When an image transfer optical system is built from two lenses, setting a distance between two lenses to 2 f is a commonly-adopted configuration. A telescope compliant with a perfect image transfer condition under which wave front information about a laser as well as a beam size are transferred is thereby built between the centers of the respective solid-state laser elements. However, such a configuration encounters a problem of the ability to design only a resonator that performs oscillation at a low excitation input (under a condition of a less intensive thermal lens). In contrast, there was found a fact that an effect of image transfer is yielded in the resonator of birefringence compensation type even when $L_2$ is set to a distance other than 2 f. By adoption of a condition of $L_2 < 2f$, a high power transverse single mode oscillator that cannot hitherto been obtained and that performs oscillation under a condition of a high excitation input (an intensive thermal lens) can be implemented in the present invention.

FIG. 2 shows the configuration of a related-art telescope-free resonator of birefringence compensation type described in connection with Patent Document 1. The configuration includes a symmetrical resonator built from a planer partial reflection mirror 312, a planar total reflection mirror 311, and the two solid-state laser elements 21 and 22; a 90 degree polarization rotator interposed between the solid-state laser elements 21 and 22; and concave lenses 361 and 362 interposed between the solid-state laser elements 21 and 22 and the resonator mirrors 311 and 312. The configuration similar to that shown in FIG. 1 is assigned the same reference numerals. FIG. 3 shows a result of computational simulation of a relationship between a thermal lens of a YAG rod (a focal length of the thermal lens is represented as $f_0$, and the intensity of the thermal lens is hereinbelow represented as $1/f_0$) and the diameter of a transverse single mode beam achieved in the YAG rod. FIG. 3($a$) shows results acquired by the related-art techniques described in connection with Patent Document 1 and Non-patent Document 1, and FIG. 3($b$) shows results acquired by the present invention. FIG. 4 shows test results pertaining to a laser input-output characteristic complying with the configuration shown in FIG. 3. FIG. 4($a$) shows a result yielded by the related-art resonator of birefringence compensation type and its drawbacks. FIG. 4($b$) shows a comparison between a result yielded as a result of a combination of the birefringent resonator with a newly-configured telescope and a result yielded as a result of a combination of the birefringent resonator with a telescope of related-art configuration.

In FIG. 3, a design condition A is based on a design value for a resonator of birefringence compensation type for low excitation input purpose of the related art described in connection with Patent Document 1 shown in FIG. 2; and a design condition B is based on a design value for a resonator of birefringence compensation type for high excitation input purpose of the related art described in connection with Patent Document 1 shown in FIG. 2. Adoption of the design value for low excitation or the design value for high excitation can be determined by changing the focal length of each of the concave lenses shown in FIG. 2. A design condition C is a combination of the telescope of the related art described in connection with Non-patent Document 1 with the resonator of birefringence compensation type. Design conditions D and E are achieved by configurations of the present invention; namely, the design conditions are based on a design value determined when efficiency is optimized as will be described later and a design value for a high excitation input.

First, attention is paid to the design conditions A and B. Simulation graphs shown in FIG. 3 each include a range of a thermal lens where a beam size achieved in a rod assumes a finite value, and the range is called an oscillation region showing a conditional range where stable oscillation is possible. An area where the beam size does not assume a finite value exists in the center of the oscillation region, and the area is a singularity region attributable to asymmetry of oscillation. The singularity region has a tendency of becoming narrow for the case of a design value for a low excitation input (a condition of a less intensive thermal lens) and broad for the case of a design value for a high excitation input (a condition of an intensive thermal lens).

When compared with a corresponding test result pertaining to a laser input-output characteristic shown in FIG. 4($a$), a singularity point arises under a design condition A for a low excitation input (the condition of the less intensive thermal lens) but does not affect the laser input-output characteristic. However, under a design condition B for a high excitation input (the condition of the intensive thermal lens), the laser input-output characteristic is split into two peaks in accordance with an increase in the width of the singularity region, whereupon oscillation efficiency is deteriorated. A valley between the two peaks of the split characteristic pattern is hereinafter called a "dip." Namely, the result shows that, when the width of the singularity region is narrow, the laser input-output characteristic is not affected and that, when the singularity region becomes sufficiently broad in excess of a certain critical point, a dip arises in the laser input-output characteristic, so that high power laser oscillation cannot be performed. FIG. 4(a) shows that a plurality of characteristics achieved by minutely changing conditions are provided between the characteristics achieved by the design conditions A and B. According to the characteristics, a dip arises in a resonator designed under a condition of a thermal lens that is more intensive than $(1/f_0)=0.010$ mm$^{-1}$, showing that a critical point is $(1/f_0)=0.010$ mm$^{-1}$. Under the condition of a more-intensive thermal lens, a dip arises in the related-art resonator of birefringence compensation type, and high power transverse single mode oscillation cannot be performed stably. Because of the restrictions, our test results show that 120 W or thereabout is the limit of a laser output.

A computation result of a beam size of a resonator of birefringence compensation type accommodating a related-art telescope ($L_2=2f$) is provided for a design condition C shown in FIG. 3(a). According to calculations, the singularity region is completely canceled, and idealistic transverse single mode oscillation is possible. However, there is a limit to the intensity of a designable thermal lens, and only low power oscillation can be performed. An imaginable laser input-output characteristic is represented by a broken line in FIG. 4(b). The limit of the maximum output is about 100 W.

In contrast, simulation results (achieved under the design conditions D and E shown in FIG. 3(b)) of a beam size characteristic achieved by the configuration ($L_2<2f$) of the present invention show that oscillation is possible under a condition of a thermal lens, which is twice or more the condition achieved by the related-art condition ($L_2=2f$), without occurrence of the singularity region. It is seen that test results of a corresponding laser input-output characteristic are the design conditions D and E shown in FIG. 4(b); that the test results respectively show characteristics of dip-free single, smooth peaks; and that high power laser oscillation can be realized in proportion to an increase in excitation input. Consequently, in our tests, high power transverse single mode oscillation having a maximum output of 200 W or more could be realized by combination with optimization of transmittance of the partial reflection mirror.

In this regard, a theoretical background will be described hereunder in more detail. FIG. 5(a) shows a schematic diagram of a telescope built from the two lenses 61 and 62 having the configuration described in connection with Non-patent Document 1, as well as showing a ray matrix of the telescope. FIG. 5(b) shows a schematic diagram of a telescope built from the two lenses 61 and 62 having the configuration of the present invention, as well as showing a ray matrix of the telescope. For the sake of simplification of computation, the thermal lens lies in the centers of the respective YAG rods 21 and 22. When attention is paid to the ray matrix of the related-art telescope shown in FIG. 5(a), values of B and C in a determinant (ABCD) are zero, which shows a complete image transfer configuration in which both beam size information and wave front information are transferred between the centers of the right and left YAG rods 21 and 22. FIG. 6(a) shows a schematic diagram achieved when the telescope is built into a resonator. In the drawing, reference symbols $f_\phi$ and $f_r$ designate focal lengths of two types of thermal lenses compliant with double thermal lenses of YAG rods, wherein reference symbol $f_\phi$ designates a focal length of a thermal lens for $\phi$-polarized light having a plane of polarization in a circumferential direction of a cross section of a YAG rod, and reference symbol $f_r$ designates a focal length of a thermal lens for r-polarized light having a plane of polarization in a radial direction of the cross section of the YAG rod.

The resonator of birefringence compensation type oscillates, to thus generate two types of laser beams; namely, a laser beam which turns into $\phi$-polarized light in the left YAG rod 21 and to r-polarized light in the right YAG rod 22, and a laser beam which turns into r-polarized light in the left YAG rod 21 and to $\phi$-polarized light in the right YAG rod 22. Since the laser beams correspond to a mere interchange of the right and left laser beams and exhibit the same characteristics, only the former laser beams are extracted in the form of a schematic diagram for brevity. In this case, the thermal lens having the focal length $f_r$ and the thermal lens having the focal length $f_\phi$, which are positioned on the right and left sides of the telescope, can be deemed to be positioned, with a propagation distance being zero. Specifically, as shown in FIG. 6(b), the arrangement is equivalent of a state where the lens having the focal length $f_\phi$ and the lens having the focal length $f_r$ are placed at the same position in an overlapping manner, and the ray matrix of the resonator shows that two different thermal lenses are positioned at the center of the resonator in an overlapping manner. As a consequence, the resonator is configured so as to be optically symmetrical, so that a characteristic not including a singularity can be acquired.

In the meantime, as shown in FIG. 5(b), the ray matrix of the configuration ($L_2<2f$) of the present invention has a determinant (ABCD) in which only the element B assumes a value of zero. The ray matrix can be said to form a partial image transfer configuration which transfers only beam size information between the right and left YAG rods 21 and 22 and which does not transfer wave front information. When the image transfer configuration is built into the resonator, orientations of the wave fronts achieved on the right and left YAG rods 21 and 22 are not aligned in the same direction. However, there is maintained a characteristic layout in which the thermal lens having a focal length $f_r$ and the thermal lens having a focal length $f_\phi$, are arranged side by side, with a propagation distance being zero; namely, in an overlapping manner. Eventually, even in this case, a symmetrical resonator having two different thermal lenses positioned in an overlapping manner at the center of the resonator is formed. Moreover, when there is adopted a configuration such that wave fronts entering both YAG rods 21 and 22 from the telescope as shown in FIG. 5(b) turn into a diverging wave front, by utilization of the fact that the orientations of the wave fronts of the right and left YAG rods 21 and 22 are not aligned in the same direction, laser oscillation can be performed by thermal lenses that are more intensive than those arising in the related-art configuration. Accordingly, there is yielded an advantage of design conditions compliant with an intensive thermal lens being selectable while effects on the problem of singularity attributable to asymmetry of the resonator of birefringence compensation type are maintained.

Theoretically, according as the distance $L_2$ is made shorter, laser oscillation can be performed by a more-intensive thermal lens (a higher excitation input). In this respect, explanations are provided below. First, FIG. 7 shows a schematic view of the resonator including the telescope of the configuration of the present invention. For the sake of simplification, the thermal lenses of the YAG rods 21 and 22 are assumed to arise at the centers of the respective YAG rods 21 and 22 and with an intensity of $(1/f_{rod})$. The focal length $f_{rod}$ of the thermal lens is an average of the focal length $f_\phi$ of the thermal lens for $\phi$-polarized light and the focal length $f_r$ of the thermal lens for r-polarized light. A ray matrix for a round trip in the resonator is computed as follows.

$$\begin{pmatrix} A & B \\ C & D \end{pmatrix} = \begin{pmatrix} 1 & 0 \\ \frac{-1}{f_{rod}} & 1 \end{pmatrix} \begin{pmatrix} -1 & 0 \\ \frac{-2f + L_2}{f^2} & -1 \end{pmatrix}$$

$$\begin{pmatrix} 1 & 0 \\ \frac{-1}{f_{rod}} & 1 \end{pmatrix} \begin{pmatrix} 1 & L_1 \\ 0 & 1 \end{pmatrix} \begin{pmatrix} 1 & 0 \\ \frac{-2}{R} & 1 \end{pmatrix} \begin{pmatrix} 0 & L_1 \\ 0 & 1 \end{pmatrix} \times \begin{pmatrix} 1 & 0 \\ \frac{-1}{f_{rod}} & 1 \end{pmatrix}$$

$$\begin{pmatrix} -1 & 0 \\ \frac{-2f + L_2}{f^2} & -1 \end{pmatrix} \begin{pmatrix} 1 & 0 \\ \frac{-1}{f_{rod}} & 1 \end{pmatrix} \begin{pmatrix} 1 & L_1 \\ 0 & 1 \end{pmatrix} \begin{pmatrix} 1 & 0 \\ \frac{-2}{R} & 1 \end{pmatrix} \begin{pmatrix} 1 & L_1 \\ 0 & 1 \end{pmatrix} \quad (1)$$

A characteristic solution (a beam size $2\omega$ and a wave front curvature "r") of a laser beam of the resonator can be determined by the following equations through use of the determinant (ABCD).

$$\omega^2 = \frac{\lambda}{\pi} \cdot \frac{B}{\sqrt{1 - \left(\frac{A+D}{2}\right)^2}}, \quad \frac{1}{r} = \frac{1}{2} \cdot \left(AC + \frac{D}{B} \cdot (1 - A^2)\right) \quad (2)$$

A range of $f_{rod}$ where reference symbol $\omega$ assumes a finite numeral (a real number solution) is an oscillation region. Provided that the focal length of a thermal lens located at the center of the oscillation region is taken as $f_0$, a solution of $f_0$ is acquired.

$$f_0 = \frac{2f^2 L_1(L_1 - R)}{2f^2 L_1 + 2f L_1^2 - L_1^2 L_2 - f^2 R - 2f L_1 R + L_1 L_2 R} \quad (3)$$

Provided that a beam size achieved at this time coincides with a beam size $2\omega_0$ achieved in the YAG rods 21 and 22 required for transverse single mode oscillation, reference symbol $\omega_0$ comes into a function only having R and $L_1$. Reference symbol $L_1$ required for acquiring the beam size $2\omega_0$ is expressed by the following equations.

$$L_1 = -\frac{R}{2} + \frac{1}{2} \cdot \sqrt{R^2 + 2RK} \quad (4)$$

(for a case where a resonator mirror is a convex mirror)

$$L_1 = \frac{R}{2} + \frac{1}{2} \cdot \sqrt{R^2 + 2RK} \quad (4)'$$

(for a case where the resonator mirror is a concave mirror)
where
$$K = \frac{\pi \omega_0^2}{\lambda}.$$

Equation (3) can be transformed as follows.

$$\frac{1}{f_0} = \frac{1}{f} - \frac{L_2}{2f^2} + \frac{1}{RK} \sqrt{R^2 + 2RK} \quad (5)$$

This is a relational expression representing a relationship between a distance $L_2$ between the lenses 61 and 62 of the telescope and the intensity of a thermal lens that can perform oscillation. The expression shows that laser oscillation is performed by a more-intensive thermal lens (a higher excitation input) as $L_2$ is made shorter.

When a condition ($L_2=2f$) of the telescope of related-art configuration is applied to Equation (5), the thermal lens ($1/f_0$) of the related-art configuration is expressed by the following equation.

$$\frac{1}{f_0} = \frac{1}{RK} \sqrt{R^2 + 2RK} \quad (6)$$

FIG. 8 shows, as an example result of computation of the thermal lens ($1/f_0$) in the oscillation region performed by means of Equation (6), a case where a YAG rod having a diameter of, for instance, $\phi 2$ mm, is used. According as the curvature of the resonator mirror becomes greater (i.e., the curvature radius R becomes smaller), oscillation can be performed under a condition of a more-intensive thermal lens. However, the upper limit of the condition of the thermal lens is about ($1/f_0$)=0.005 mm$^{-1}$ in consideration of the upper limit (R=50 mm or thereabouts) of the curvature radius of the mirror that can be adopted in reality. A laser resonator that oscillates under a condition of a more-intensive thermal lens cannot be designed.

In contrast, the thermal lens, which has the configuration ($L_2 < 2f$) of the present invention and which is compliant with Equation (5), can perform oscillation under a condition of a thermal lens that is more intensive than that having the related-art configuration (=a higher excitation input) by an amount defined below.

$$\frac{1}{f} \cdot \left(1 - \frac{L_2}{2f}\right)$$

FIG. 9 shows a computation result of the intensity ($1/f_0$) of the thermal lens in the oscillation region for $L_2$ performed when the curvature radius R of the resonator mirror is taken as 50 mm as an example and a plotting result of points corresponding to the design conditions C, D, and E. It is understood from FIG. 9 that oscillation can be performed under a condition of a more-intensive thermal lens according as the distance $L_2$ becomes shorter. For instance, even a thermal lens having about triple intensity becomes possible to perform oscillation under the design condition E that is the configuration of the present invention when compared with the design condition C of the related-art configuration ($L_2=2f$). In principle, there is no limit on a reduction in distance $L_2$. Hence, a laser resonator that performs oscillation by a thermal lens whose intensity is triple or more that achieved under the design condition C is also designable. Since a proportional relationship exists between an excitation input and the intensity of the thermal lens, a laser resonator that performs oscillation at a triple excitation input or more can be said to be designable.

Optimization of the distance $L_2$ will now be described. Consideration is now given to a state of propagation of a laser beam in a YAG rod achieved when laser oscillation is performed by a YAG rod with a thermal lens having a focal length $f_{rod}$. The thermal lens of the YAG rod is ascribable to the distribution of refractive index reflecting the distribution of temperature in a rod, and acts as a convex lens that changes in a converging fashion a wave front of a laser beam which passes through the rod. Therefore, the laser beam entered the YAG rod passes through the rod while converging along a bow-shaped curve within the YAG rod. An area located inside the curve; namely, a region through which the oscillated laser beam passes, is a region where excitation energy in the YAG rod is converted into a laser output. As the volume of the region (hereinafter called a "mode volume") becomes greater with respect to the excitation region, efficiency of laser oscillation is enhanced further. The mode volume greatly changes according to the state of propagation of the laser beam in the YAG rod, and the state of propagation of the laser beam in the YAG rod is determined by the design value of the telescope. In short, the mode volume depends on the design value of the telescope. In this respect, explanations are provided below.

FIG. 10(a) is a schematic diagram showing the state of propagation of a laser beam in the YAG rod 22 achieved when a laser beam having a parallel wave front enters the second YAG rod 22, and FIG. 10(b) is a schematic diagram showing the state of propagation of a laser beam in the YAG rod 22 achieved when a laser beam having a diverging wave front enters the YAG rod. FIG. 10 shows only the second YAG rod 22, but the first YAG rod 21 also exhibits a similar state of propagation of a laser beam that shows bilateral symmetry in relation to that achieved in the second YAG rod 22. FIG. 10(a) shows a state of propagation reproduced within the resonator exactly in the case of layout ($L_2=2f$) of the telescope of the related-art configuration. The maximum beam size is achieved at the left end face of the YAG rod 22 (an entrance end face), and the beam size becomes smaller as it travels rightwards and is minimized at a right end face. FIG. 10(b) shows a state of propagation reproduced within the resonator in the case of the configuration ($L_2<2f$) of the present invention; namely, a state of propagation in which the beam size is most inflated at a position (x) to which the beam has traveled inside from the left end face of the YAG rod 22 (the entrance end face). The position (x) tends to shift further to the right side of the YAG rod 22 according as the curvature of the incident wave front becomes greater. In the resonator configuration of the present invention, the incident wave front of the laser beam entered the YAG rod 22 depends on the distance $L_2$ between the lenses 61 and 62 of the telescope. As the distance $L_2$ become shorter, the curvature of the wave front becomes greater; hence, the position (x) in the YAG rod 22 where the beam size is most inflated shifts rightwards.

The mode volume shown in FIG. 10(a) and the mode volume shown in FIG. 10(b) are compared to each other. Although the maximum beam sizes achieved in the drawings are equal to each other, the latter mode volume is greater, which means that laser oscillation can be performed with greater efficiency. Further, the mode volume changes according to the position (x) where the beam size becomes maximum, which means that there is an optimum position where the mode volume is maximized.

FIG. 10(c) shows a relationship between the state of propagation of a laser beam in the second YAG rod 22 and the mode volume. The horizontal axis of a graph represents a distance (x) from the end face of the rod to the location in the rod where the beam is most inflated, and the entire length of the YAG rod is standardized by one. The vertical axis of the graph represents a mode volume. First, a propagation state (A) at (x=0) is achieved by the related-art configuration in which the beam size becomes maximum at the entrance end face of the YAG rod. In contrast, the mode volume increases according as the value of (x) increases, and the mode volume becomes maximum in a state of propagation (B) at (x=0.5). On the other hand, the mode volume decreases in a state of propagation (C) at a greater value (x=0.75). In the example, the mode volume is greater than the state of propagation (A) by about 30% in the state of propagation (B) in which the mode volume becomes maximum, which means that oscillation can be performed with corresponding higher efficiency.

The design value of the telescope satisfying the state of propagation (B) will now be described. The state of propagation shows that the beam size becomes maximum at the center of the YAG rod 22 and that the state of propagation is symmetrical with respect to the center of the YAG rod 22. Accordingly, the state is on the condition that a balance is achieved between the wave front (1/r) of a laser beam entering the YAG rod and one-half of the thermal lens ($1/f_0$) of the YAG rod. When the condition is added to Equation (2), the following equation is derived.

$$L_2 = 2f - \frac{2f^2}{RK} \cdot \sqrt{R^2 + 2RK} \tag{7}$$

Further, the thermal lens achieved at this time is expressed by the following equation.

$$\frac{1}{f_0} = \frac{2}{RK}\sqrt{R^2 + 2RK} \tag{8}$$

A parameter K defined in Equation (4) can also be transformed by use of resonator parameters R and $L_1$.

$$K = \frac{2L_1(L_1 + R)}{R} \tag{9}$$

(for a case where the resonator mirror is a convex mirror)

$$K = \frac{2L_1(L_1 - R)}{R} \tag{9}'$$

(for a case where the resonator mirror is a concave mirror)

Notations of Equation (7) can also be transformed by use of these equations as follows.

$$L_2 = 2f - f^2 \cdot \frac{2L_1 + R}{L_1(L_1 + R)} \tag{10}$$

(for a case where the resonator mirror is a convex mirror)

$$L_2 = 2f - f^2 \cdot \frac{2L_1 - R}{L_1(L_1 - R)} \tag{10}'$$

(for a case where the resonator mirror is a concave mirror)

Reference symbol $\omega_0$ assumes a value which is 0.6 to 0.7 times as large as the radius "d" of the YAG rod, and lateral signal mode oscillation having a large mode volume can be performed. Even when the value is 0.7 times or greater, there will arise a case where an outer edge of the oscillated laser beam extends off the outer diameter of the YAG rod, thereby deteriorating efficiency; however, the value is effective for transverse single mode oscillation. Moreover, even when the value is less than 0.6 times, the mode volume achieved at the time of transverse single mode oscillation decreases, but the value is still effective for the present invention.

From the above, when a laser resonator that oscillates on an intended thermal lens ($1/f_0$) is designed, the curvature radius R of the resonator mirrors 11 and 12 can be optimized by Equation (8), and the distance $L_2$ between the lenses 61 and 62 of the telescope can be optimized by Equation (7). The design value satisfying Equation (7) is a design solution for the purpose of maximizing the mode volume and performing transverse single mode oscillation with the highest efficiency.

The above descriptions have been provided primarily with regard to effectiveness to transverse single mode oscillation. However, the technique is intrinsically effective for lateral multimode oscillation too. When a resonator loss increases under the condition of the singularity in the oscillation region, transverse single mode oscillation by means of which only a laser beam of a single order component is oscillated is particularly, sensitively susceptible to influence, whereupon the influence appears as a phenomenon of a dip in a laser input-output characteristic. However, in lateral multimode oscillation by means of which laser beams of a plurality of orders are oscillated in a symbiotic manner, even when a beam of a certain order undergoes a loss under the influence of a singularity, a laser beam of another order oscillates in compensation. Therefore, oscillation exhibits a tendency to become relatively insensitive to singularity but is still influenced. In particular, in low-order oscillation called a low-order multimode of the order of $M^2=10$ or less, an effect equivalent to that yielded by transverse single mode oscillation can be expected. However, needless to say, the maximum effect is achieved in only the transverse single mode.

The design value of the layout of the lenses 61 and 62 forming the foregoing telescope is a mere ideal value determined by theoretical computation, and the design value does not always be caused to strictly match an ideal design value. However, if a design value very differing from an ideal value is taken, the original effect of canceling the influence of the singularity in laser oscillation will not be yielded. For instance, if the optical distances between the lenses 61 and 62 of the telescope and the centers of the respective YAG rods 21 and 22 do not match and differ from the focal length "f" of each of the lenses 61 and 62, a singularity area will arise. The width of the singularity area will increase in proportion to the amount of difference. If the amount of difference is sufficiently small, a dip will not arise in the input-output characteristic, and hence no problem occurs.

As mentioned previously, in the related-art resonator of birefringence compensation type, a critical condition for a thermal lens under which a dip appears in an input-output characteristic is already known. The cause of occurrence of a dip is intrinsically attributable to enlargement of the width of the singularity area resultant from an increase in the intensity of thermal lens of the YAG rod. Hence, the critical condition can be replaced with a critical condition for the width of the singularity area. So long as the width of the singularity area achieved at the time of adoption of the design value differing from the ideal value of the present invention is smaller than the critical value, no dip will arise, and no problem will arise.

According to our provisional calculation, no problem arises when the difference between a design value and an ideal value is about 10% or less in terms of the optical distance between the lenses of the telescope and the centers of the YAG rod. However, when the difference exceeds 10%, there is a fear of a dip arising as a result of the critical value being exceeded. Specifically, so long as the design value is adopted such that the difference between the design value and the ideal value falls within a range of about ±10%, the advantage of the present invention will be sufficiently yielded.

Second Embodiment

FIG. 11 is a view showing the configuration of a solid-state laser of a second embodiment of the present invention. Configurational elements which are the same as those shown in FIG. 1 are assigned the same reference numerals. The present configuration is based on the same principle as that underlying the configuration shown in FIG. 1 and yields the same advantage; however, the configuration is different in terms of the configuration (the number of lenses and the layout of lenses) of a lens 63 interposed between the YAG rods. Operation principle of the configuration will be described hereunder.

First, in FIG. 1, two lenses 61 and 62, which have the same focal length "f," are used for establishing an image transfer connection between the centers of the pair of YAG rods 21 and 22, and the distance $L_2$ between the lenses 61 and 62 is set as an arbitrary distance that is shorter than the twice (2 f) of the focal length "f" of the lens. As the distance $L_2$ becomes shorter, a resonator which oscillates at a higher excitation input is configured. However, there is no limitations on a reduction in distance, and the distance may also assume in principle a value of zero. Arranging the two lenses 61 and 62 at a distance of zero means a combination of lenses into a single lens having double intensity (a half focal length). Therefore, the state can be said to be a state where one lens 63 is inserted to an optically-intermediate position between the right and left YAG rods 21 and 22 and where an optical distance between the lens 63 and the center of the left YAG rod 21 and an optical distance between the lens 63 and the center of the right YAG rod 22 can be said to be twice the focal length of the lens 63, respectively. The configuration represented in a schematic form is FIG. 11. One lens 63 having a focal length "f" is interposed between the pair of YAG rods 21 and 22. The optical distance between the lens 63 and the center of the left YAG rod 21 and the optical distance between the lens 63 and the center of the right YAG rod 22 is twice (2 f) of the focal length "f" of the lens, respectively.

By means of such a configuration, excitation efficiency becomes slightly deteriorated when compared with that achieved in the state of propagation (B) shown in FIG. 10(c) (the mode volume assumes a value in proximity to x=0.8 in FIG. 10(c) in the case of the present configuration). However, the configuration becomes very suitable for a high excitation input, and there is yielded an advantage of a laser resonator, which produces an extremely high output laser beam, being able to be realized.

Third Embodiment

FIG. 12 is a view of an apparatus built from the solid-state laser of the first embodiment shown in FIG. 1, in which the excitation area of the YAG rod is formed according to a side pumping method. In FIG. 12, the first YAG rod 21 is irradiated with excitation light from the direction of a side surface by first excitation laser diodes (LD) 501 and 502, and the second YAG rod 22 is irradiated with excitation light from the direction of a side surface by second excitation laser diodes (called excitation LDs or merely "LDs") 503 and 504, whereupon the entire interior of each of the YAG rods is essentially uniformly excited. When pulse laser oscillation is effected at a highly-repetitive frequency, the Q-switch element is built into the resonator. Further, in order to increase excitation density achieved in the YAG rod, a YAG rod having a small outer dimension is adopted for the YAG rods 21 and 22. When performance of pulse oscillation at as high a repetition frequency as possible is desired, a YAG rod having the smallest-possible outer diameter is preferable.

In the meantime, a laser resonator, in which the solid-state laser shown in FIG. 1 is built according to the end pumping method, is shown in FIG. 13 as a configuration to be contrasted with the above laser. In FIG. 13, a laser resonator analogous to that of the first embodiment is built, by way of bend mirrors 511, 512, 513, and 514, from the YAG rods 21 and 22, the resonator mirrors 11 and 12, the first and second lenses 61 and 62 constituting a telescope, and the 90 degree polarization rotator 5. Each of the bend mirrors 511 to 514 is coated with a dichroic coating that reflects oscillated laser light having an infrared wavelength by means of total reflection and that permits full passage of excitation light having a wavelength in proximity to 808 nm. Excitation light originating from the first excitation LDs 521 and 522 is collected to both end faces of the first YAG rod 21 from back surfaces of the bend mirrors 511 and 512 by the respective condenser lenses 531 and 532, whereupon concentrated excitation arise in the centers of both end faces. Further, excitation light originating from the second excitation LDs 523 and 524 is collected to both end faces of the second YAG rod 22 from back surfaces of the bend mirrors 513 and 514 by the respective condenser lenses 533 and 534, whereupon concentrated excitation arise in the centers of both end faces.

When a solid-state laser that performs high power oscillation is designed, one LD for exciting respective end faces is deficient in excitation power, and concentrated radiation must be performed by superimposing excitation beams from a plurality of LDs. Excitation beams originating from individual LDs are usually optically transmitted through optical fibers 541 to 544, and the plurality of excitation beam transmission fibers are tied in a bundle and superimposed at exit ends of the fibers, whereupon the beams are collected to the centers of the ends of the YAG rods 21 and 22 by means of the condenser lenses 531 to 534. A state of collection of the beams is shown in FIG. 14. FIG. 14(a) is a view acquired when excitation is performed by one excitation LD, and FIG. 14(b) shows a view acquired when excitation is performed by means of a plurality of excitation LDs. The drawings show the distribution of intensity of excitation light radiated, in a converged manner, on the ends of the respective YAG rods. In the case of excitation effected by a single LD in FIG. 14(a), the distribution of intensity of excitation light converged on the end face of the YAG rod exhibits a smooth Gaussian distribution. However, in a case where beams from the plurality of LDs are converged for excitation as shown in FIG. 14(b), the distribution of intensity tends to assume a distorted geometry having a plurality of peaks, and the like, for reasons of variations in the accuracy of overlaps, variations in characteristics of individual LDs, and the like. For this reason, the distribution of temperature of the end face of the YAG rod does not necessarily become uniform, and a homogeneous distortion-free thermal lens is not always formed.

The amount of excitation light absorbed by the YAG rod is maximum in the vicinity of the end face of the YAG rod and becomes gradually smaller with an increasing distance toward the inside of the YAG rod. Since the distribution of absorption greatly changes depending on characteristics (e.g., a luminous wavelength, an angle of divergence, and the like) of an individual excitation LD, the manner of formation of a thermal lens is also sensitively affected. FIG. 15(a) is a view from which the bend mirrors and returns of the laser beam in the configuration shown in FIG. 13 are omitted. Consequently, as shown in FIG. 15(a), there are many cases where the respective thermal lenses "a," "b," "c," and "d" formed at end faces of the respective YAG rods 21 and 22 vary in intensity, and there is a tendency for the respective thermal lenses to be likely to have different aberration factors. Therefore, even when the thermal lenses of the two YAG rods can be deemed to be arranged at a propagation distance of zero by means of the telescope, the state becomes equivalent to a state where a lens formed as a result of the thermal lens "a" being superimposed on the thermal lens "c" is disposed at one side and a lens formed as a result of the thermal lens "b" being superimposed on the thermal lens "d" is disposed at the other side as shown in FIG. 15(b). Thus, symmetry of the resonator is lost.

In the meantime, in the case of the lateral pumping method shown in FIG. 12, the entireties of the respective YAG rods 21 and 22 are uniformly irradiated and excited by dispersed excitation light; therefore, the method has a characteristic of the distribution of internal temperature of the YAG rod being made uniform, so that a uniform thermal lens with few aberrations is formed. When consideration is given to such a difference between the pumping methods, the side pumping method can be said to be effective because, even when an image transfer connection is established between two YAG rods as shown in FIG. 13 by a telescope under the end pumping method, symmetry of the resonator is deteriorated by variations or aberrations in the thermal lenses formed at respective end faces; hence, an effect, such as that described in connection with the first embodiment, is not sufficiently yielded. The side pumping method is effective for other embodiments of the present invention in which an image transfer connection is established between two YAG rods.

Although the embodiments have been described by means of taking the laser diode as an example excitation light source, the excitation light source is not limited to the laser diode. It is obvious that a similar effect is yielded by use of; for instance, a lamp and the like.

Fourth Embodiment

In the first embodiment, two convex lenses are interposed between two YAG rods. In the second embodiment, one convex lens is interposed between two YAG rods. The present embodiment is directed toward a solid-state laser that obviates a necessity for a convex lens by imparting action of a convex lens to two YAG rods. FIG. 16 is a schematic diagram of a solid-state laser configured such that the two convex lenses 61 and 62 forming the telescope of the solid-state laser shown in FIG. 1 are integrally combined into YAG rods. The solid-state laser is identical in configuration with the solid-state laser described in connection with the first embodiment except the telescope. Mutually-opposing end faces of the first and second YAG rods 121 and 122 are spherically machined at a curvature radius $R_a$, to thus create convex lenses. Further, the 90 degree polarization rotator 5 is interposed between the YAG rods 121 and 122.

Each of the YAG rods 121 and 122 is assumed to have length $L_0$ and a refractive index $n_0$, and the focal length of a convex lens provided at an end of each YAG rod is taken as "f." In this case, when the focal length "f" becomes equal to an optical distance from the end of the each of the spherically-machined YAG rods 121 and 122 to the center; namely, an optical length $L_0/(2n_0)$ that is one-half the length of each of the YAG rods 121 and 122, the focal length acts such that an image transfer connection is established between the centers of the two YAG rods 121 and 122.

The focal length "f" achieved when the convex lens formed at the end of the YAG rod is spherically machined so as to assume a curvature radius $R_a$ is expressed by the following equation.

$$f = \frac{R_a}{n_0 - 1} \quad (11)$$

Provided that the focal length "f" is equal to the optical length that is one-half the length of each of the YAG rods 121 and 122, the following conditions are required.

$$f = \frac{L_0}{2n_0} \quad (12)$$

A conditional expression for the following curvature radius $R_a$ is derived from Equations (11) and (12).

$$R_a = \frac{n_0 - 1}{2n_0} \cdot L_0 \quad (13)$$

In contrast with the first embodiment (FIG. 1), the resonator does not have any independent convex lenses. Therefore, a distance between the spherically-machined portions that are formed at the respective ends of the YAG rods and that act as convex lenses; namely, a distance $L_3$ between the principal points of lenses that is determined on the assumption that the lenses are created by cutting only the spherically-machined portions of the respective YAG rods, is equivalent to the distance $L_2$ between the lenses in the solid-state laser of FIG. 1. Consequently, a laser resonator that performs oscillation at a higher excitation input condition with a reduction in the distance $L_3$ can be designed. The distance $L_3$ equivalent to complete image transfer conditions are determined by the following equation as in the case of the related-art telescope shown in FIG. 5.

$$L_3 = 2f = \frac{L_0}{n_0} \quad (14)$$

In contrast, when the conditions for $L_3$ are fulfilled, the resonator yields an effect similar to that yielded by the solid-state laser of the first embodiment, so that high-power transverse single mode oscillation becomes possible.

$$L_3 < \frac{L_0}{n_0} \quad (15)$$

In the present embodiment, an image transfer connection can be established between two YAG rods by means of a simple configuration without use of an additional convex lens as mentioned above. Hence, configurational elements are simplified when compared with those described in connection with the first embodiment (FIG. 1) and the second embodiment (FIG. 11). A compact, high-power transverse single mode solid-state laser with few failures is implemented.

Fifth Embodiment

In the first and second embodiments, a resonator is built from mirrors having the same curvature. However, the present embodiment is directed toward a solid-state laser whose resonator is built from plane mirrors. FIG. 17 is a schematic diagram showing a configuration achieved when the resonator mirrors of the solid-state laser shown in FIG. 1 are embodied by plane mirrors. In FIG. 17, the YAG rods 21 and 22, the first and second lenses 61 and 62 forming the telescope, and the 90 degree polarization rotator 5 are identical in layout with their counterparts described in connection with the first embodiment; however, resonator mirrors 311 and 312 are embodied by plane mirrors. The plane mirrors 311 and 312, the YAG rods 21 and 22, and the two lenses 61 and 62 are arranged in a symmetrical pattern as in the first embodiment.

In the related-art resonator of birefringence compensation type and the resonator having a built-in image transfer optical system whose inter-telescope distance is limited to 2 f, a resonator is built from plane mirrors, the resonators cannot perform laser oscillation under a condition of an intensive thermal lens, and a high power laser oscillator cannot be designed. However, in the configuration of the resonator having a built-in image transfer optical system in which the distance between the first and second lenses 61 and 62 forming a telescope is narrow as shown in FIG. 1, a resonator compliant with an unlimitedly-intensive thermal lens can be designed without regard to the curvature of the resonator mirror by adjusting the distance between the first and second lenses 61 and 62. Hence, a high power laser oscillator can be designed even by means of the configuration of a resonator built from plane mirrors.

Specifically, in the first embodiment, Equation (5) shows that laser oscillation is performed by a more-intensive thermal lens (or a higher excitation input) according as the distance $L_2$ between the two lenses 61 and 62 of the telescope is made shorter. However, in the present embodiment, the resonator mirrors are plane, and hence the essential requirement is to imagine a case where the curvature radius R of the resonator mirrors 11 and 12 in Equation (5) is infinite ($\infty$). When R in Equation (5) is equal to $\infty$, Equation (5) is expressed as follows:

$$\frac{1}{f_0} = \frac{1}{f} - \frac{L_2}{2f^2} + \frac{1}{K} \quad (5)'$$

As is obvious from Equation (5)', it is understood that laser oscillation can be performed even in the present embodiment by means of a more-intensive thermal lens (a higher excitation input) according as the distance $L_2$ between the lenses 61 and 62 of the telescope is made shorter.

An advantage yielded when the resonator mirrors are built from plane mirrors will be described hereunder.

FIG. 18 is a view showing the manner of changes in an oscillation optical axis in response to positional fluctuations in optical components in the resonator, such as the YAG rods 21 and 22 and the first and second lenses 61 and 62. In FIG. 18, the 90 degree polarization rotator 5 is omitted. Optical components in the resonator can inevitably cause minute positional fluctuations for reasons of changes in environmental temperature around the resonator, vibrations, external force exerted to a housing of the laser resonator, and the like, and at that time the positional fluctuations appear as a phenomenon of a change in an optical axis of a laser. Conceivable optical components that are greatly affected by occurrence of positional fluctuations include YAG rods and lenses forming a telescope. Even when any of them causes positional fluctuations, analogous influence arises. Hence, an explanation is hereunder given to a case where the first lens 61 forming the telescope has caused positional fluctuations. FIG. 18(*a*) shows a change in an optical axis 9 of an outgoing laser beam caused by a positional fluctuation of the first lens 61 when the resonator is built from the plane mirrors 311 and 312, and FIG. 18(*b*) shows a change in an optical axis 9 of an outgoing laser beam caused by a positional fluctuation of the first lens 61 when the resonator is built from the spherical mirrors 11 and 12, each of which has a curvature. As shown in FIG. 18(*b*), when the resonator is built from the spherical mirrors 11 and 12, the optical axis 9 of the outgoing laser beam is changed with respect to an ideal optical axis (a dashed line) in terms of a position and an angle. In the meantime, as shown in FIG. 18(*a*), when the resonator is built from the plane mirrors 311 and 312, the optical axis 9 is subjected solely to an offset variation induced by the positional change in the first lens 61 and not to an angular change.

Pointing stability of the laser beam is critical in performing precision laser machining. If the position of radiation of a laser beam converged to a workpiece varies with time, precision machining cannot be performed. A change in pointing can be considered to be broken down into a positional change component and an angular change component of the optical axis of the laser achieved at an exit of the laser oscillator. Depending on the design of an optical system from the laser oscillator to the workpiece, an angular change component in the optical axis of the laser is usually greatly affected by a change in pointing of a laser. In the case of the resonator built from the plane mirrors shown in FIG. 18(*a*), angular changes do not arise in the optical axis, and only offset variations arise. Hence, influence on laser machining is limited, and stable precision machining can be realized.

The configuration described in connection with the present embodiment is disadvantageous over the configuration described in connection with the first embodiment in that excitation efficiency is deteriorated when compared with excitation efficiency achieved in the state of propagation (B) in FIG. 10(*c*) (the mode volume in FIG. 10(*c*) assumes a value in proximity to x=1.0 in the case of the present configuration). However, the configuration of the present embodiment can address a high excitation input as does the configuration described in connection with the first embodiment. Further, as mentioned previously, the configuration has a characteristic of pointing stability of a laser beam being further enhanced than does the configuration described in connection with the first embodiment. Moreover, it is also possible to apply plane mirrors to a solid-state laser configured such that the solid-state laser element and the lenses of the telescope described in connection with the fourth element are combined into one.

Sixth Embodiment

FIG. 19 is a view showing the configuration of a solid-state laser of the present embodiment having a resonator configuration embodied by arranging two internal configurational elements (the configurational elements interposed between the resonator mirrors 311 and 312) of the resonator built from the plane mirrors of the fifth embodiment shown in FIG. 17 in series and placing the resonator mirrors 311 and 312 built from plane mirrors at both ends of the resonator. In FIG. 19, YAG rods 21*a* and 22*a*, two lenses 61*a* and 62*a*, and a 90 degree polarization rotator 5*a*, all of which are positioned on the left side, and YAG rods 21*b* and 22*b*, two lenses 61*b* and 62*b*, and a 90 degree polarization rotator 5*b*, all of which are positioned on the right side, are arranged in a symmetrical pattern. Provided that a distance between the total reflection mirror 311 and the center of the YAG rod 21*a* adjacent thereto and a distance between the partial reflection mirror 312 and the center of the YAG rod 22*b* adjacent thereto are each taken as $L_l$, a distance L between the centers of the mutually-adjacent YAG rods 22*a* and 21*b* is set to a value that is twice L.

In the resonator shown in FIG. 19, a state of propagation of the laser beam oscillated in the resonator becomes equivalent to a state achieved when the resonator shown in FIG. 17 is serially arranged in number of two without modifications. Each of the two configurational elements acts as a resonator unit having the same characteristic as that of the resonator shown in FIG. 17. Thus, there is implemented a high power laser that has an approximately-double laser output while maintaining, in an unchanged manner, the characteristics, such as the width of the oscillation region, the values of the thermal lenses, and the like.

FIG. 20 shows comparisons among oscillation regions achieved by the basic configuration including two YAG rods shown in FIG. 17, the configuration whose YAG rods are merely doubled in number, and the configuration of the present embodiment realized by coupling the basic configuration shown in FIG. 19 in number of two. FIG. 20(*a*-1) shows the basic configuration, and FIG. 20(*a*-2) shows a characteristic of the oscillation region achieved by the basic configuration. FIG. 20(*b*-1) shows the configuration of a resonator whose YAG rods are merely doubled in number, and FIG. 20(*b*-2) shows a characteristic achieved by the configuration. Further, FIG. 20(*c*-1) shows the configuration of the present embodiment, and FIG. 20(*c*-2) shows a characteristic of the configuration. In the case of the configuration shown in FIG. 20(*b*-1), the total number of thermal lenses sensed by the laser beam within the resonator is simply doubled with an increase in the number of YAG rods placed in the resonator; hence, changes in the thermal lenses responsive to a change in an excitation input P are doubled. For this reason, as shown in FIG. 20(*b*-2), the width Wb of the oscillation region is reduced to one-half the width Wa of the oscillation region achieved by the basic configuration shown in FIG. 20(*a*-1) (Wb=Wa/2). In contrast, in the configuration shown in FIG. 20(*c*), a left half and a right half of the resonator each constitute a periodic configurational element of a resonator equal to the basic configuration shown in FIG. 20(*a*) (hereinafter called a "resonator unit"). Loads responsive to the changes in the thermal lenses of the respective YAG rods are shared between the respective resonator units. Therefore, as shown in FIG. 20(*c*-1), a width Wc of the oscillation region becomes completely identical with a width Wa of the basic configuration shown in FIG. 20(*a*-1) (Wc=Wa).

Consequently, according to the configuration of the present embodiment, a laser gain achieved within the resonator is doubled without involvement of a reduction in the width of the oscillation region, and the laser output can also be improved by a factor of about two. As a result of an increase in the laser gain achieved within the resonator, Q-switched pulse laser oscillation can be performed at a higher repetition frequency.

Although the case where the basic configuration shown in FIG. 17 is coupled in number of two has been described above, the same advantage can be expected even when the basic configuration is coupled in numbers; namely, in number of three or more. An increase in laser output and an increase in repetition frequency achieved at the time of Q-switched pulse oscillation, which are responsive to the number of configurations to be coupled, can be expected. Moreover, a MOPA configuration that includes configurations arranged in the same layout outside a resonator and that uses the thus-arranged configurations as an amplifying stage may also be adopted rather than coupling of all configurations to be connected within the resonator. A configuration in which the solid-state laser element and the lenses of the telescope described in connection with the fourth embodiment are combined into a single unit can also be applied.

Seventh Embodiment

FIG. 21 is a view showing the configuration of a solid-state laser of the present embodiment; namely, a configuration achieved when the resonator built from the spherical mirror configuration, such as that shown in FIG. 1 of the first embodiment, is coupled in number of two as shown in FIG. 19 of the sixth embodiment. The spherical mirrors 11 and 12, each having a curvature radius R, are arranged at both ends, to thus configure a resonator, and a lens 13 having a focal length $f_m$ is positioned at the center of the resonator. The focal length $f_m$ is designed so as to assume a value of $f_m=R/2$ with respect to the curvature radius R of each of the resonator mirrors 11 and 12. When the resonator mirrors 11 and 12 are convex mirrors, the lens 13 is a concave lens. In contrast, when the resonator mirrors 11 and 12 are concave mirrors, the lens 13 is a convex lens. FIG. 21 shows a case where the resonator mirrors 11 and 12 are convex mirrors and where the lens 13 is a concave lens. The resonator mirrors 11 and 12, the YAG rods 21a, 22a, 21b, and 22b, the lenses 61a, 62a, 61b, and 62b, and the 90 degree polarization rotators 5a and 5b are arranged in the same manner as in the six embodiment (FIG. 19).

As a result of adoption of such a configuration, a high power laser having an oscillation region characteristic identical with that of the basic configuration of each of the right and left resonator units and an approximately-double laser output can be materialized as in the sixth embodiment.

The lens 13 having a center focal length $f_m$ is adopted solely as an optical component that acts so as to invert the angle of divergence of the wave front of the laser beam that enters a lens and that has a curvature radius R. For instance, so long as the optical component is a component that performs identical wave front inversion; for instance, a telescope built from a set consisting of two lenses, and the like, the lens does not always need to be a single lens. The laser may also be embodied by coupling a plurality of configurations; namely, three configurations or more, or embodied as a MOPA configuration that uses configurations arranged outside the resonator and that uses the thus-arranged configurations as an amplifying stage as in the sixth embodiment. The configuration of the second embodiment (FIG. 11) whose resonator mirrors are built from spherical mirrors or the configuration of the fourth embodiment (FIG. 16) is applied to the present embodiment and coupled in numbers, whereby the laser output can be improved.

Eighth Embodiment

FIG. 22 is a schematic view of a solid-state laser having a resonator configuration in which the basic configuration of the fifth embodiment shown in FIG. 17 is arranged in two stages and in which the basic configurations are coupled in a ring shape by four bend mirrors 421 to 424. In FIG. 22, one bend mirror 422 of the four bend mirrors is taken as a partial reflection mirror, and the other bend mirrors 421, 423, and 424 are taken as total reflection mirrors. The YAG rods 21a and 22a, the two lenses 61a and 62a, and the 90 degree polarization rotator 5a, all of which are positioned on an upper side, the YAG rods 21b and 22b, the two lenses 61b and 62b, the 90 degree polarization rotator 5b, all of which are positioned on a lower side, and the four bend mirrors, are arranged in a symmetrical pattern. An isolator 425 for defining the traveling direction of the laser beam is interposed between the bend mirror 422 and the bend mirror 425. In FIG. 22, the traveling direction of the laser beam is limited to the direction of a black arrow. In this case, a laser beam exits in the direction of a white arrow from the bend mirror 422 that is a partial reflection mirror.

The laser of the present embodiment is embodied by the above configuration as a ring resonator that has the same oscillation characteristic as that of the sixth embodiment. The ring resonator itself is a technique often used in a case where performance of single longitudinal mode oscillation is desired. However, extremely-high power single longitudinal mode, single lateral mode oscillation becomes possible by combination of the ring resonator with the configuration of the sixth embodiment that enables laser oscillation at a high excitation input.

The number of basic configurations coupled within the ring resonator is not necessarily two, and there may also be embodied a configuration that enables performance of higher power oscillation by coupling of three basic configurations or more. In this case, the essential requirement is to arrange the resonator units in such a way that distances among the respective resonator units all become equal to each other. Any of the four bend mirrors may also be taken as a partial reflection mirror, and the location where the isolator is to be inserted may also be anywhere in the path for a laser beam. Further, a configuration that does not involve insertion of the isolation is also possible. In this case, the laser beam is output from the bend mirror 422 in two directions in FIG. 19; namely, a direction designated by a white arrow and a direction designated by an arrow of a broken line. The configuration including in combination the YAG rod and the lenses of the telescope described in connection with the fourth embodiment may also be applied.

Ninth Embodiment

FIG. 23 is a view showing the configuration of an apparatus pertaining to control of the two lenses 61 and 62 configuring the telescope in the solid-state lasers of the first embodiment and the third through eighth embodiments in which the telescope is built from two lenses. The first lens 61 and the second lens 62 configuring a telescope are held by a holder that can move along a common guide 60. The first lens 61 and the second lens 62 can be moved in the direction of an optical axis (designated by a dashed line) along the guide 60 by first movement means 31 and second movement means 32, such as ball screws. Operations of the movement means 31 and 32 are controlled by control means 33. In accordance with a separately-input excitation input command value, the control means 33 selects an optimum $L_2$ from a storage section storing a table pertaining to combinations of excitation inputs and values of corresponding optimum $L_2$ and controls the movement means 31 and 32 such that the distance between the first lens 61 and the second lens 62 becomes optimum $L_2$. In order to move both the two lenses 61 and 62, the respective lenses are provided with movement means. However, any one of the two lenses may also be made movable.

For instance, when a 100 W laser output is generated by a resonator designed so as to generate a 200 W laser output, an excitation input is usually controlled so as to adjust the laser output to a target value. In that case, beam quality, such as an angle of divergence of a laser beam and pulse stability, is also changed. Accordingly, as mentioned above, the form of the resonator can be changed from a resonator that oscillates at a low excitation input to a resonator that oscillates at a high excitation input by changing the distance $L_2$ between the first lens 61 and the second lens 62. By utilization of the fact, the distance $L_2$ between the lenses of the telescope is controlled in accordance with an increase or decrease in excitation input. As a consequence, even when low power laser oscillation is performed by changing an excitation input, beam quality, such as an angle of divergence of a laser beam and pulse stability, can be constantly maintained.

The first lens 61 and the second lens 62 are herein made movable along the common guide 60. So long as the respective lenses can move along the optical axis of the laser beam, the common guide may also be omitted. However, moving the respective lenses along the common guide enables minimization of the risk of loss of alignment of the resonator, which would otherwise be caused as a result of displacement of the lens from the optical axis, so that highly-reliable control becomes possible. Moving only the lenses of the telescope leads to occurrence of a change in the optical distance between the center of the YAG rod and the lens, which deteriorates ideal image transfer conditions. However, moving the lenses within a range where the amount of deviation from the ideal value comes to ±10% as mentioned above does not result in occurrence of a problem.

Tenth Embodiment

By reference to FIG. 18 of the fifth embodiment, it has been described that the resonator mirrors formed from mirrors having a curvature are susceptible to influence of a positional change in an optical component. The present embodiment is directed toward a solid-state laser that solves the problem. FIG. 24 is a view showing the configuration of the tenth embodiment of the solid-state laser of the present invention. The basic configuration of the resonator is identical with that of the first embodiment (FIG. 1) and is characterized by a structure for holding respective optical elements. FIG. 24(a) is a partial schematic view pertaining to a cavity module including a solid-state laser element and a telescope, and FIG. 24(b) is a constituent view of an entire resonator including resonator mirrors.

In FIG. 24(a), the first solid-state laser element 21 and the second solid-state laser element 22 are fixedly held in a first excitation unit 23 and a second excitation unit 24, respectively. For instance, the excitation unit has a structure in which a YAG rod is sandwiched between two plate-shaped elements as shown in FIG. 24(a), and an unillustrated excitation light source, an unillustrated collector, and the like, are provided around the YAG rod. The respective excitation units 23 and 24 and the first lens 61 and the second lens 62 are fixed in one piece on a first optical base 25, thereby configuring a cavity module 20. Moreover, the 90 degree polarization rotator 5 is also fixed to a side of the first excitation unit 23 or a side of the second excitation unit 24, which faces the lenses 61 and 62, and held within the cavity module 20. The cavity module 20 is configured so as to be separated and independent from a second optical base 26 that fixes the resonator mirror.

FIG. 24(b) shows the configuration of the cavity module 20 and the second optical base 26. The cavity module 20 is indirectly fixed onto the second optical base 26, which holds the total reflection mirror 11 and the partial reflection mirror 12, with a space by way of three support members 201, 202, and 203. The three support members each have a built-in spherical bearing and are connected and support the cavity module 20 such that the second optical base 26 and the cavity module are slidable in an angular direction. The cavity module 20 is removable from the surface of the second optical base 26 and is fastened while being pressed against contact faces of positioning pins 211, 212, and 213, whereby the cavity module can be attached with superior positional repeatability. In order to position the cavity module 20 in a direction orthogonal to the optical axis of the laser beam, the positioning pins 211 and 212 are placed on a viewer-side of the cavity module 20 in FIG. 24(b). Further, in order to position the cavity module 20 in the direction of the optical axis of the laser beam, the positioning pin 213 is placed on the partial reflection mirror 12 side of the cavity module 20 in FIG. 24(b).

Incidentally, one concept for enhancing the ease of use of the laser oscillator is a hand-free concept that the laser oscillator starts up, without involvement of adjustment, in the same state as that achieved before movement even when after being relocated to or carried in any location. In the case of a high power laser oscillator, readjustment is usually required every time the oscillator is moved. However, in a case where the laser oscillator is applied to a production facility requiring frequent layout changes, a laser oscillator capable of starting up without adjustment and immediately operating even when relocated yields a great advantage. In order to achieve a hand-free concept even in the case of the resonator of the present invention, intensive enhancement of positional stability of, particularly, optical components having high sensitivity to positional displacements in the resonator is effective.

The resonator of the present invention has a comparatively large margin for positional displacements of the resonator mirrors 11 and 12 but exhibits sensitive characteristics with respect to the positional displacements of the lenses 61 and 62 of the telescope. In particular, the resonator is very sensitive to a deviation between the center axis of the right and left YAG rods 21 and 22 and the center axis of the lenses 61 and 62 of the telescope. Maintaining a state where the two axes coincide with each other at all times is critical in enhancing stability and achieving the hand-free concept.

FIG. 25 shows a result of simulation of an oscillated state of the laser beam responsive to the positional displacement of the optical element in the resonator. FIG. 25(a) shows an original state not including positional displacements, and FIG. 25(b) shows a case where the center axis (designated by a dashed line) of the two lenses 61 and 62 is deviated below from the center axes (designated by a two-dot chain line) of the YAG rods 21 and 22 and the resonator mirrors 11 and 12. FIG. 25(c) shows a case where the center axis (designated by the two-dot chain line) of the two resonator mirrors 11 and 12 is positionally displaced upward with respect to the center axes (designated by the dashed line) of the YAG rods 21 and 22 and the first and second lenses 61 and 62 configuring the telescope. In particular, attention is paid to a change in the optical axis (designated by a broken line) of the laser beam achieved at the positions of the YAG rods 21 and 22. It means that, as the displacement between the optical axis of the laser beam and the center axis of the YAG rods 21 and 22 becomes greater, a laser beam component, which fails to pass through the YAG rods 21 and 22, to thus be cut, becomes greater, which in turn decreases a laser output. A comparison between the cases shows that, in the case where the resonator mirrors are positionally displaced as shown in FIG. 25(c), the optical axis of the laser beam does not substantially deviate from the center axis of the YAG rods and that the laser output is not deteriorated. In contrast, in a case where the lenses are positionally displaced as shown in FIG. 25(b), the optical axis of the laser beam greatly deviates from the center axis of the YAG rod, and the laser output is significantly decreased accordingly.

FIG. 26 is a schematic view showing the nature of external force exerted on a laser oscillator during transport of the laser oscillator and deformation of the resonator induced by the force. FIG. 26(a) shows a configuration achieved when an excitation unit is fastened directly onto the optical base, and FIG. 26(c) shows the configuration of the present invention. In the case of a laser resonator that performs oscillation in a transverse single mode, the resonator usually requires a large length; hence, the second optical base 26 where the resonator mirrors 61 and 62 are fastened assumes a long-strip shape extended in the direction of the optical axis. When such a rectangular apparatus is transported, the apparatus is usually lifted by applying force F to right and left fulcrums such that a weight balance is achieved. At that time, as shown in FIG. 26, the center of the optical base 26 tends to become curved, depressed, and deformed under its own weight. However, in the case of the configuration shown in FIG. 26(*a*), the axis of the YAG rods 21 and 22 deviates from the center axis of the lenses 61 and 62 of the telescope by the deformation, whereupon the laser oscillator is susceptible to influence of the displacement, such as a decrease in laser output. FIG. 26(*b*) shows a deviation of the center axis of the YAG rods 21 and 22 and the center axis of the lenses 61 and 62. In FIG. 26(*b*) the center axis (designated by the broken line) of the YAG rods 21 and 22 is positioned below with respect to the center axis (designated by the dashed line) of the resonator mirrors 11 and 12 by the curve of the second optical base 26. Further the center axis (designated by the two-dot chain line) of the lenses 61 and 62 is positioned below with respect to the center axis (designated by the broken line) of the YAG rods 21 and 22.

In the meantime, the configuration of the present invention assumes a structure in which the second optical base 26 subjected to external force is independent from the cavity module 20, as shown in FIG. 26(*c*). Hence, even when the second optical base 26 is deformed by the external force F, external force is not exerted on the cavity module 20 fastened by way of the support members built from the spherical bearings 201, 202, and 203 that are slidable in an angular direction, so that the cavity module 20 is not deformed. Although the position of the cavity module 20 is minutely changed in accordance with deformation of the second optical base 26, a positional relationship between the center axis of the YAG rods 21 and 22 that are particularly sensitive elements and the center axis of the lenses 61 and 62 is maintained at all times. Hence, the laser resonator is less susceptible to influence on laser output and resistant to external force during transport and can be imparted with superior stability. FIG. 26(*d*) shows a relationship between the center axis of the YAG rods 21 and 22 and the center axis of the lenses 61 and 62. In FIG. 26(*d*), the center axis (designated by the two-dot chain line) of the YAG rods 21 and 22 and the center axis (designated by the two-dot chain line) of the lenses 61 and 62 are positioned below with respect to the center axis (designated by the dashed line) of the resonator mirrors 11 and 12 by means of the curvature of the second optical base 26. However, the first optical base 25 of the cavity module 20 is not curved, and hence a substantial displacement does not arise in the positional relationship between the center axis (designated by the two-dot chain line) of the YAG rods 21 and 22 and the center axis (designated by the two-dot chain line) of the lenses 61 and 62.

In the present embodiment, the support members consisting of the spherical bearings 201, 202, and 203 that connect the cavity module 20 onto the second optical base 26 are provided in number of three. However, so long as there is a structure in which the optical base 26 is separated from the cavity module 20, four or more support members may also be employed. Moreover, slidable members other than the spherical bearings may also be adopted.

In the present invention, the cavity module 20 is configured so as to be removable from the optical base 26 with reference to the positioning pins 211, 212, and 213 as positioning references. In the solid-state laser oscillator, a laser diode of the excitation light source is a consumable component and must be replaced according to its life. In particular, in a solid-state laser oscillator of side pumping type that radiates excitation light from side surfaces of a YAG rod, to thus induce excitation, a laser diode is built in the excitation unit in many cases. Replacement of the laser diode requires replacement of the entire excitation unit. In the related-art technique, the respective excitation units are individually replaced. However, the position of the center axis of the YAG rod subtly differs from one excitation unit to another because of a problem of the accuracy of a component. Hence, positional repeatability of the center axis of the lenses and the center axis of the YAG rod are low, and readjustment is required after replacement operation.

In contrast, the excitation unit and the telescope are arranged in an integrated fashion within the cavity module as in the present invention. The cavity module for which the center axis of the YAG rods and the center axis of the lenses requiring particularly-precise adjustment have been adjusted in advance by another device or the like is intactly exchanged, thereby obviating a necessity for readjustment of the telescope after replacement. The resonator of the present invention has a comparatively-wide margin for a positional displacement between the center axis of the YAG rods and the center axis of the resonator mirrors. Specifically, even when a relative positional displacement of 0.2 mm is present between the center axes, the amount of change in the optical axis of the YAG rods is of the order of several micrometers, and a laser output is not substantially susceptible to influence. Positional repeatability of the cavity module achieved by use of the contact faces of the positioning pins, and the like, is 0.2 mm or less. Non-adjusting replacement that does not require substantial readjustment of the resonator mirrors, and the like, eventually becomes possible as a result of replacement of the entire cavity module in accordance with the positioning pins.

In the present embodiment, an explanation has been provided by means of the configuration of the resonator described in connection with the first embodiment (shown in FIG. 1). However, even when only one lens is positioned between such solid-state laser elements, such as that described in connection with the second embodiment (shown in FIG. 11), occurrence of a displacement between the center axis of the lenses and the center axis of the YAG rods can be effectively prevented.

Eleventh Embodiment

FIG. 27 is a view showing the configuration of an eleventh embodiment of a wavelength conversion laser of the present invention. The present configuration takes the solid-state laser shown in FIG. 1 as a basic configuration and is arranged so as to enable performance of Q-switched pulse oscillation of linearly-polarized light by inserting the Q switch 3 and the polarization element 4 into the resonator and turning on or off the Q switch 3 by the Q switch control means 41 at a desired frequency. Both the total reflection mirror 11 and the partial reflection mirror 12 configuring the resonator are convex mirrors having the same curvature radius R. In FIG. 27, the Q switch 3 is inserted between the total reflection mirror 11 and the first YAG rod 21. However, the position is not limited particularly to FIG. 27, and the Q switch may also be positioned at any place, so long as the switch is in the resonator. The polarization element 4 is not specified particularly to FIG. 27, as well. However, in general, it is desirable to place the polarization element 4 on a partial-reflection-mirror side with respect to the solid-state laser element, as shown in FIG. 27. From the viewpoint of prevention of occurrence of a damage, which would otherwise be caused by a laser beam, it is desirable to place both the Q switch 3 and the polarization element 4 in as close as possible to the YAG rod that imparts a greater beam size.

There is a use that requires a high power pulse laser oscillator, which operates at a high frequency and which produces a smallest-possible pulse width, in order to increase machining productivity at the time of performance of laser machining. In order to meet such a request by an Nd:YAG laser advantageous for use in a high power pulse laser oscillation, the following measures are effective.
(1) Increase excitation density by reducing the size of a YAG rod and intensifying an excitation input to realize high frequency oscillation.
(2) Increase excitation density and shorten the length of a resonator to realize short pulse oscillation.

In particular, an increase in excitation density strongly affects stability of a laser pulse achieved during high frequency oscillation, as well as affecting a pulse width. Hence, although excitation density is an important parameter, an increase in the excitation density of the YAG rods can be said to be inevitable in order to achieve both an increase in laser oscillation frequency and a shorter pulse. An increase in excitation density is equivalent to an increase in the intensity of the thermal lens of the YAG rod, and a resonator that oscillates under a condition of an intensive thermal lens is required. However, as previously described in connection with the first embodiment, it has hitherto been impossible to perform high power transverse single mode oscillation under the condition of the intensive thermal lens according to the related-art resonator technique. Specifically, the related-art resonator cannot stably perform high power oscillation even when the excitation density of the YAG rods is increased. In the resonator configuration of the present invention, high power oscillation can be performed without problems even under the condition of the intensive thermal lens. Accordingly, the configuration can also address an increase in the excitation density of the YAG rods; as a consequence, a high power pulse laser resonator capable of performing stable pulse oscillation even at a high frequency of 100 kHz or more can be realized for the first time by adoption of the configuration of the present invention.

In the meantime, shortening of a pulse stemming from a reduction in the length of the resonator will be described hereunder. FIG. 27 illustrates a case using a convex mirror for the resonator mirrors 11 and 12. However, either a positive curvature (a convex mirror) or a negative curvature (a concave mirror) can be adopted. So long as the concave mirror and the convex mirror has the same curvature radius R, a laser resonator that performs the same transverse single mode oscillation at the same excitation input and that exhibits the same oscillation characteristic can be designed by adjusting the optical distance $L_1$ between the center of the YAG rod and the resonator mirror even when either the concave mirror or the convex mirror is adopted. FIG. 28 shows a comparison between a case where the resonator is designed by means of convex mirrors and a case where the resonator is designed by means of concave mirrors. FIG. 28(*a*) shows the case of the convex mirrors 11 and 12, and FIG. 28(*b*) shows the case of the concave mirrors 111 and 112. When design values of both resonators are compared with each other, the length of the resonator built from the convex mirrors is short. In each of the resonators, the optical distances $L_l$ between the centers of the YAG rods 21 and 22 and the resonator mirrors for performing transverse single mode oscillation are determined by Equations (4) and (4)', respectively. When both optical distances are compared with each other, the optical distance $L_l$ achieved by the convex mirror configuration is understood to be shorter than the optical distance $L_l$ achieved by the concave mirror configuration by an amount corresponding to the curvature radius R (2R for the entire length of the resonator). Since the pulse width is approximately proportional to the length of the resonator, there can be performed pulse oscillation that is shorter by an amount corresponding to an increase in the length of the resonator. The concave mirror configuration is likely to pick up parasitic oscillation light arose in the resonator, which in turn corrupts oscillation and tends to decrease an output of a transverse single mode laser beam that is the principal oscillation component. The convex mirror configuration is advantageous even in high power oscillation.

By way of example, in the present configuration, a transverse single mode pulse laser of 180 W or more can be stably oscillated at a frequency of 100 kHz and with a pulse width of 100 ns or less when the outer diameter of the YAG rod is set to φ2 mm or less and when the YAG rod is irradiated with, as an excitation input, light (having a wavelength of 808 nm) output from the laser diode having a power of 500 W or more per YAG rod.

In the present embodiment, an explanation has been given by reference to the configuration of the solid-state laser described in connection with the first embodiment (FIG. 1). However, high power pulse laser can be output even when a single lens is interposed between solid-state laser elements as described in connection with the second embodiment (FIG. 11); when the solid-state laser element and the lenses of the telescope are assembled into a single piece as described in connection with the fourth embodiment (FIG. 16); and when the resonator mirrors are built from plane mirrors as described in connection with the fifth embodiment (FIG. 17). The configuration can also be applied to a solid-state laser built by coupling a plurality of resonator units, such as those described in connection with the sixth, seventh, and eighth embodiments.

When a Q switch is built in the resonator described in connection with the present embodiment and when pulse laser oscillation is performed at a highly-repetitive frequency, an end pumping method under which excitation density is readily increased by concentrated excitation of a local area around an optical axis is originally advantageous. However, when a plurality of excitation LDs are required to achieve high power, an advantage, such as that described in connection with the first embodiment, is not sufficiently yielded. If anything, the configuration shown in FIG. 12 in which the YAG rods having a smaller outer diameter are excited by the side pumping method can cope with a highly-repetitive frequency.

Twelfth Embodiment

FIG. 29 is a view showing the configuration of a wavelength conversion laser of a twelfth embodiment of the present invention. The wavelength conversion laser is made up of a fundamental wave laser oscillator and a wavelength conversion unit, and the fundamental wave laser oscillator unit is identical in configuration with the solid-state laser shown in FIG. 27. As a matter of course, the fundamental wave laser oscillator may also be configured so as to have only one lens interposed between solid-state laser elements, such as that shown in FIG. 11, or a configuration in which the solid-state laser element and lenses of a telescope are assembled into a single piece, such as that shown in FIG. 16. Although the configuration of the wavelength conversion unit changes according to the type of a harmonic wave to be generated, a configuration of a wavelength conversion laser that generates a triple harmonic is herein shown as an example.

In FIG. 29, the fundamental wave laser oscillator oscillates a high frequency pulse laser beam by means of pulsing operation of the Q switch 3, and the thus-oscillated laser beam is output from the partial reflection mirror 412. In general, the partial reflection mirror 412 is often built from a convex mirror having a flat back surface for reasons of ease of manufacture, and the like. The partial reflection mirror is illustrated in FIG. 29 as a convex mirror having a flat back surface. In the case of such a convex mirror having a flat back surface or a meniscus mirror whose both surfaces are spherical, such as that shown in FIG. 1, the partial reflection mirror acts as a lens having a focal length $f_{PR}$ for a laser beam passing through the mirror. Therefore, an optical path must be designed in consideration of the action of the lens.

As mentioned above, the partial reflection mirror acts as a lens having a focal length $f_{PR}$, and hence a fundamental wave laser beam 70 is temporarily converged immediately after having passed through the partial reflection mirror 412, and is subsequently switched to a divergent wave front. The laser beam is converged on a first nonlinear crystal 91 after passing through a first collective lens 81, to thus generate a duplicate harmonic. Further, the fundamental wave laser beam and the duplicate harmonic are simultaneously converged on a second nonlinear crystal 92 by means of a second collective lens 82, to thus generate third harmonic light. An LBO crystal is used for the first nonlinear crystal 91 and the second nonlinear crystal 92.

The present embodiment is characterized in that the solid-state laser shown in FIG. 27 is used as the fundamental wave laser oscillator. A high-frequency, high-power pulse laser beam can be used as the fundamental wave laser for a wavelength conversion laser by adoption of the configuration shown in FIG. 27, so that a high-frequency, high-power UV laser can be implemented.

The above descriptions are provided for an example configuration achieved in the case of a triple harmonic laser. However, in the case of a duplicate harmonic, conversion can be performed by one nonlinear crystal (an SHG crystal). In the case of a triple harmonic, two nonlinear crystals (an SHG crystal and a THG crystal) are required. Even in the case of a quadrature harmonic, two crystals (an SHG crystal and an FHG crystal) are required. An LBO crystal and a KTP crystal are common as the SHG crystal; an LBO crystal is common as the THG crystal; and a CLBO crystal is common as the FHG crystal.

In order to implement a wavelength conversion laser that exhibits a high power characteristic at a high frequency of 100 $kH_z$ or more in response to a request from an application of machining, a high power fundamental wave laser that stably performs short pulse oscillation at a high frequency of 100 kHz is indispensable. In the present configuration, as a result of the solid-state laser shown in FIG. 27 being used as the fundamental laser, an average triple output of 30 W or more having a high frequency of 100 kHz or more can first be realized at a product-level nonlinear crystal life. The configuration can also be applied to a solid-state laser built by coupling a plurality of resonator units, such as that described in connection with the sixth, seventh, and eighth embodiments.

Thirteenth Embodiment

FIG. 30 is a view showing the configuration of a thirteenth embodiment of a wavelength conversion laser of the present invention. In addition to the configuration of the twelfth embodiment shown in FIG. 29, a spatial filter 71 is disposed immediately after the partial reflection mirror 412. There is a case where, in addition to oscillating a main beam of transverse single mode, the solid-state laser oscillator oscillates parasitic light, whereupon concentric coherent light 72 arises around the main beam. The coherent light 72 is converged on the neighborhood of the crystal by the first collective lens 81, to thus be radiated on a holder member for holding a nonlinear crystal 91 and an edge of the nonlinear crystal and absorbed as heat. As a consequence, there is a case where a temperature state of the nonlinear crystal requiring precise temperature control changes, so that stable wavelength conversion is not performed.

The spatial filter 71 blocks the coherent light 72 responsible for such corruption before the light is radiated on the nonlinear crystal 91, thereby preventing corruption in wavelength conversion. Further, the coherent light 72 is totally different form the fundamental wave laser 70 in terms of an angle of divergence achieved when the light exits from the oscillator. Hence, the coherent light 72 coincides with the fundamental wave laser beam 70 at a location where the beam size of the fundamental wave laser beam 70 becomes great, so that the coherent light and the fundamental wave laser beam cannot be separated from each other. A neighborhood of a waist where the fundamental wave laser beam 70 is converged and that is located immediately after the partial reflection mirror 412 is a location where the fundamental wave laser beam 70 and the coherent light 72 can be separated from each other most efficiently. The waist of the fundamental wave laser beam 70 is formed between the back surface of the partial reflection mirror 412 and a position spaced from the back surface by the focal length $f_{PR}$ for the laser beam passed through the partial reflection mirror 412. Hence, placing the spatial filter 71 whose opening is larger than the beam size of the fundamental wave laser beam 70 at the position is desirable.

In the present embodiment, an explanation has been given by reference to the configuration of the wavelength conversion laser having two lenses interposed between solid-state laser elements as shown in FIG. 30. Needless to say, a similar advantage can be yielded even by a configuration built from one lens interposed between solid-state laser elements as described in connection with the second embodiment, a configuration including a YAG rod and lenses of a telescope, which are assembled into a single piece, as described in connection with the fourth embodiment, and a configuration including a resonator mirror formed from a plane mirror as described in connection with the fifth embodiment. Moreover, the present embodiment can also be applied to a solid-state laser formed from a configuration made by coupling a plurality of resonator units, such as those described in connection with the sixth, seventh, and eighth embodiments.

Fourteenth Embodiment

FIG. 31 is a view showing a configuration of a fourteenth embodiment of a wavelength conversion laser of the present invention. The laser differs from the laser of the twelfth embodiment shown in FIG. 29 in terms of designing of an optical path subsequent to a fundamental wave oscillator. In FIG. 31, two lenses; namely, first collective lens 83 and a second collective lens 84, are interposed between the partial reflection mirror 421 and the first nonlinear crystal 91. Moreover, a third collective lens 85 and a fourth collective lens 86 are interposed between the first nonlinear crystal 91 and the second nonlinear crystal 92. Optical systems of respective sections are designed such that an image transfer connection is established among the second solid-state laser element 22, the first nonlinear crystal 91, and the second nonlinear crystal 92.

There are two reasons for establishing an image transfer connection between the nonlinear crystal and the solid-state laser elements. One reason is enhancement of stability of the fundamental wave laser beam with respect to pointing variations. Another reason is assurance of reliability with respect to changes in beam size arising when an excitation input is changed. First, the former reason is described.

The solid-state laser oscillator used as the fundamental wave laser oscillator does not always output a laser beam of a constant state, and the position and angle of an output laser beam vary at a certain ratio during a short period of time. Variations are called pointing variations. When pointing variations are great, a variation arises in a location on a nonlinear crystal exposed to the laser beam; hence, the state of internal temperature of the nonlinear crystal does not become stable. Pointing variations are primarily attributable to vibrations in a solid-state laser element, such as a YAG rod, which is the source of a laser beam. Natural vibrations in a member holding a solid-state laser element and stream vibrations in a solid-state laser element induced by cooling water are mentioned as factors for the vibrations in the solid-state laser element. Accordingly, variations in an output angle of the laser beam originate from microvibrations in solid-sate laser element, and the variations appear as pointing variations.

In the meantime, wavelength conversion efficiency (a ratio at which the fundamental wave laser beam is converted into a harmonic laser beam) is changed by the temperature of a nonlinear crystal; hence, the nonlinear crystal exhibits a characteristic of extreme sensitivity to a temperature. Therefore, although the temperature of the nonlinear crystal is controlled at all times by a precision temperature controller, a temperature distribution centering around a point of exposure to a laser beam also arises within the crystal. In order to maintain a state of temperature optimum for wavelength conversion, a stable state of a laser beam to be radiated is also indispensable. Accordingly, when the position of the laser beam radiated to the nonlinear crystal varies, the distribution of internal temperature of the nonlinear crystal does not become stable, which in turn renders wavelength conversion efficiency unstable. Specifically, an output of a harmonic laser beam does not become stable. In order to achieve a stable wavelength conversion laser, it is desirable to expose a given position on a nonlinear crystal to a laser beam at all times. In contrast, since pointing variations are present in the fundamental wave laser beam, radiation of a laser beam in a completely stable state is impossible. However, there are an optical path system greatly susceptible to the influence of pointing variations and an optical path system less susceptible to the influence by the design of an optical path.

FIG. 32 is a view showing a comparison between the influence of an optical path system having the configuration described in connection with the twelfth embodiment to pointing variations and the influence of an optical path system having the present configuration to pointing variations. FIG. 32(a) is a schematic diagram showing variations in the optical axis of the laser achieved in the configuration described in connection with the twelfth embodiment, and FIG. 32(b) is a schematic diagram showing variations in the optical axis of the laser achieved in the present configuration. Depending on the design of an optical path, nominal pointing variations in the fundamental wave laser beam might appear in the nonlinear crystal in an amplified form. In FIG. 32(a), when the second solid-state laser element 22 deviates upwardly, pointing variations in the laser beam turn into such a deviation as indicated by an arrow of a solid line, which induces particularly large deviations in the nonlinear crystals 91 and 92. Thus, wavelength conversion efficiency becomes unstable. When the second solid-state laser element deviates downwardly, the pointing variations appear as indicated by an arrow of a broken line and turn into extremely large deviations in the nonlinear crystals 91 and 92. In the meantime, in the case of an optical path system for which an image transfer connection is established, such as that shown in FIG. 32(b), pointing variations achieved in two points connected by image transfer come to the same amount. Hence, amounts of pointing variations in the nonlinear crystals 91 and 92 are suppressed so as to become equal to amounts of pointing variations induced by vertical fluctuations in the second solid-state laser element 22. Thus, the pointing variations in the nonlinear crystals 91 and 92 become smaller than those shown in FIG. 32(a).

As shown in FIG. 32(b), an optical path system in which an image transfer connection is established between the center of the solid-state laser element 22 serving as the source of pointing variations and the nonlinear crystal 91 can be said to be an optical path system effective for diminishing the influence of pointing variations. In the present configuration, an image transfer connection is established among all of the solid-state laser elements 21 and 22 in the fundamental wave laser oscillator and the respective nonlinear crystals 91 and 92. As a consequence, even when pointing variations originate from any of the YAG rods 21 and 22, the influence of the nonlinear crystal is minimized, and wavelength conversion laser exhibiting superior stability can be implemented.

A reliability problem arising when a change occurs in excitation input will now be described. FIG. 33 shows a change in beam size achieved in the YAG rods 21 and 22 when a change arises in excitation input and a change in beam size achieved in the nonlinear crystals 91 and 92 when a change arise in excitation input. FIG. 33(a) shows the configuration of the optical path described in connection with the twelfth embodiment, and FIG. 33(b) shows the configuration of an optical path achieved by an image transfer connection of the present invention. In response to a change in excitation input, the beam size exhibits a characteristic pattern that exactly plots the shape of the letter U within the YAG rod. As in FIG. 3, a range where the beam size assumes a finite value is called an oscillation region. The beam size becomes great in the neighborhoods of the upper and lower limits of the oscillation region, and the beam size becomes minimum at the center of the oscillation region.

In contrast, the beam size achieved in the nonlinear crystal exhibits a different characteristic depending on the design of an optical path system. An optical path system realized by an image transfer connection shown in FIG. 33(b) generates a pattern geometrically similar to a beam size change characteristic exhibited in the YAG rod. The beam size becomes great in the neighborhoods of the upper and lower limits of the oscillation region and becomes minimum at the center of in the oscillation region. The optical path system is designed such that the beam size achieved at the center of the oscillation region turns into an aimed spot size. In the meantime, the optical path system of the twelfth embodiment shown in FIG. 33(a) may exhibit a characteristic such that the beam size becomes smaller with an increase in excitation input and that the beam size becomes minimum in the vicinity of the upper limit of the oscillation region. The optical system is usually designed such that a beam size achieved at the center of the oscillation region comes to an aimed spot size as mentioned above; hence, a beam size in crystal becomes further smaller when the excitation input is made more intensive than that achieved under a condition for the center of the oscillation region. For this reason, when an excitation input is introduced too much, the laser beam is excessively converged within the crystal to exceed a destruct limit on a crystal, which may destroy the crystal. Accordingly, in the optical path system configured as described in connection with the twelfth embodiment, a change in excitation input arouses a fear of destruction of a nonlinear crystal. However, in the case of the optical path system achieved by an image transfer connection, the beam size is increased even when the excitation input is increased, and hence such a fear does not arise. Accordingly, the optical path system realized by an image transfer connection of the present invention can be said to exhibit a superior characteristic in terms of reliability, such as prevention of breakage of a component.

A condition for the design of an optical path for image transfer connection will now be described. In order to establish an image transfer connection between the solid-state laser element and the nonlinear crystal, a measure of condition for the design of an optical path must be satisfied. In the present configuration, the two collective lenses 83 and 84 are interposed between the partial reflection mirror 412 and the first nonlinear crystal 91 as shown in FIG. 31. Originally, the collective lens may be one. However, according to our calculations, a realistic design value satisfying an image transfer connection is not present for the configuration involving one collective lens, and two or more collective lenses are required. The configuration may also be realized by three collective lenses or more. However, a configuration that is the simplest configuration consisting of two collective lenses is illustrated.

First, in FIG. 31, the focal length of the first collective lens 83 is taken as $f_a$; the focal length of the second collective lens 84 is taken as $f_b$; an optical distance from the partial reflection mirror 412 to the first collective lens 83 is taken as $L_a$; an optical distance between the collective lenses 83 and 84 is taken as $L_b$; and an optical distance from the second collective lens 84 to the center of the first nonlinear crystal 91 is taken as $L_c$. The partial reflection mirror 412 is a convex mirror having a curvature radius R (an absolute value), and a focal length achieved when the reflection mirror acts on a transmitting laser beam as a lens is taken as $f_{PR}$. An optical distance between the center of the second solid-state laser element 22 and the partial reflection mirror 412 is $L_1$. In this optical system, a ray matrix existing between the second solid-state laser element 22 and the first nonlinear crystal 91 is as follows.

$$\begin{pmatrix} A & B \\ C & D \end{pmatrix} = \begin{pmatrix} 1 & Lc \\ 0 & 1 \end{pmatrix}\begin{pmatrix} 1 & 0 \\ -\frac{1}{f_b} & 1 \end{pmatrix}\begin{pmatrix} 1 & Lb \\ 0 & 1 \end{pmatrix}\begin{pmatrix} 1 & 0 \\ -\frac{1}{f_a} & 1 \end{pmatrix}\begin{pmatrix} 1 & La \\ 0 & 1 \end{pmatrix}\begin{pmatrix} 1 & 0 \\ -\frac{1}{f_{PR}} & 1 \end{pmatrix}\begin{pmatrix} 1 & L_3 \\ 0 & 1 \end{pmatrix} \quad (16)$$

In the meantime, the second nonlinear crystal 92 is disposed in the optical path system so as to come exactly to the position of a waist of the laser beam under the condition of a thermal lens achieved at the center of the oscillation region. When there is an additional condition that a beam size achieved at the waist at that time is $M_s$ times as large as a beam size $\omega_0$ achieved in the second solid-state laser element 22, the ray matrix must satisfy the following equation.

$$\begin{pmatrix} A & B \\ C & D \end{pmatrix} = \begin{pmatrix} M_s & 0 \\ \frac{-1}{r_0 M_s} & \frac{1}{M_s} \end{pmatrix} \quad (17)$$

Parameter $r_0$ designates a curvature radius of a wave front of a laser beam achieved at the center of the second solid-state laser element 22 under the condition for the center of the oscillation region and can be computed by the following equations derived from Equations (1) through (3).

$$\frac{1}{r_0} = \frac{2L_1 - R}{-2L_1(L_1 - R)} \quad (18)$$

Given that parameters $L_b$ and $L_c$ are taken as arbitrary distances, conditions satisfying Equations (16) and (17) are as follows:

$$\frac{1}{f_a} = \frac{1}{L_b}\left(1 - M_s + \frac{L_1 M_s + \alpha L_c}{f_{PR}} - \frac{L_c}{r_0 M_s}\right) \quad (19)$$

$$\frac{1}{f_b} = \frac{f_a}{L_b - f_a} \cdot \left(\frac{1}{f_a} + \frac{\alpha}{f_{PR}} - \frac{1}{r_0 M_s}\right) \quad (20)$$

$$L_a = \frac{f_a}{L_b - f_a} \cdot (L_b + L_1 M_s + \alpha L_c) \quad (21)$$

where $$\alpha = \frac{L_1 + r_0}{r_0 M_s}.$$

An optical path from the second YAG rod 22 to the first nonlinear crystal 91 can be realized through an image transfer connection by means of respective parameters $L_a$, $L_b$, $L_c$, $f_a$, and $f_b$ satisfying Equations (19) to (21).

Next, an image transfer optical path established between the first nonlinear crystal 91 and the second nonlinear crystal 92 is determined. In FIG. 31, the focal length of the third collective lens 85 is taken as $f_c$; the focal length of the fourth collective lens 86 is taken as $f_d$; an optical distance from the center of the first nonlinear crystal 91 to the third collective lens 85 is taken as $L_d$; an optical distance from the third collective lens 85 to the fourth collective lens 86 is taken as $L_e$; and an optical distance from the fourth collective lens 86 to the center of the second nonlinear crystal 92 is taken as $L_f$. A ray matrix existing in the optical path is as follows.

$$\begin{pmatrix} A & B \\ C & D \end{pmatrix} = \begin{pmatrix} 1 & L_f \\ 0 & 1 \end{pmatrix}\begin{pmatrix} 1 & 0 \\ -\frac{1}{f_d} & 1 \end{pmatrix}\begin{pmatrix} 1 & L_e \\ 0 & 1 \end{pmatrix}\begin{pmatrix} 1 & 0 \\ -\frac{1}{f_c} & 1 \end{pmatrix}\begin{pmatrix} 1 & L_d \\ 0 & 1 \end{pmatrix} \quad (22)$$

The second nonlinear crystal 92 is disposed in the optical system so as to come exactly to the position of a waist of the laser beam under the condition of a thermal lens achieved at the center of the oscillation region. When there is an additional condition that a beam size achieved at the waist at that time is $M_t$ times as large as a beam size $\omega_0$ achieved in the second solid-state laser element 22, the ray matrix must satisfy the following equation.

$$\begin{pmatrix} A & B \\ C & D \end{pmatrix} = \begin{pmatrix} \frac{M_t}{M_s} & 0 \\ 0 & \frac{M_s}{M_t} \end{pmatrix} \quad (23)$$

A solution satisfying Equations (22) and (23) must satisfy conditions of the following equations with regard to an arbitrary distance $L_d$ and an arbitrary focal length $f_c$.

$$L_e = f_c + f_d \quad (24)$$

-continued $$\left(1 + \frac{M_t}{M_s}\right) \cdot L_d + \left(1 + \frac{M_s}{M_t}\right) \cdot L_f = f_c + f_d \quad (25)$$

When design values of the respective parameters $f_c$, $f_d$, $L_d$, $L_e$ and $L_f$ satisfy the above conditions, an optical system existing between the first nonlinear crystal 91 and the second nonlinear crystal 92 becomes an optical path consisting of an image transfer connection.

By adoption of a design value satisfying the above conditions, all of the first solid-state laser element 21, the second solid-state laser element 22, the first nonlinear crystal 91, and the second nonlinear crystal 92 can be designed in the form of an image transfer connection, so that a very stable wavelength conversion laser can be materialized.

In the present embodiment, an explanation is given by reference to the configuration of the wavelength conversion laser having two lenses interposed between solid-state laser elements, as shown in FIG. 31. However, needless to say, a similar advantage is yielded even by the configuration involving only one lens interposed between the solid-state laser elements as described in connection with the second embodiment, the configuration consisting of an integration of the YAG rod and the lenses of the telescope described in connection with the fourth embodiment; and the configuration including the resonator mirrors formed from the plane mirrors as described in connection with the fifth embodiment. Moreover, the present configuration can also be applied to a solid-state laser configured by a connection of a plurality of resonator units as described in connection with the sixth, seventh, and eighth embodiments.

Fifteenth Embodiment

Incidentally, the fourteenth embodiment provides the configuration in which an image transfer connection is established among respective sections between the two YAG rods 21 and 22 and the first and second nonlinear crystals 91 and 92. However, to this end, two or more collective lenses must be interposed between the partial reflection mirror 412 and the first nonlinear crystal 91, and two or more collective lenses must be interposed between the first nonlinear crystal 91 and the second nonlinear crystal 92, as well, which in turn raises a disadvantage of complication of the configuration and a necessity for a long transmission distance. In such a case, for instance, there may also be adopted a configuration for establishing an image transfer connection only between the second YAG rod 22 and the second nonlinear crystal 92. Specifically, as shown in FIG. 34, two collective lenses 87 and 88 are interposed between the partial reflection mirror 412 and the first nonlinear crystal 91, and one collective lens 89 is interposed between the first nonlinear crystal 91 and the second nonlinear crystal 92. The collective lenses 87 and 88 are arranged so as to transfer the center of the second YAG rod 22 to the center of the second nonlinear crystal 91, and the lens 89 is disposed so as to converge the laser beam on the second nonlinear crystal.

In the case of a triple-wave laser or a quadrature-wave laser, the first nonlinear crystal 91 exhibits a comparatively-gentle temperature characteristic than does the second nonlinear crystal 92 and is correspondingly less susceptible to the influence of a change in the internal temperature of a crystal or the influence of pointing variations. Accordingly, so long as pointing variations in the second nonlinear crystal 92 exhibiting a characteristic particularly sensitive to a temperature change are predominantly suppressed, high stability analogous to that achieved in the previously-described embodiments can be attained by means of a simple configuration including only one collective lens interposed between the first nonlinear crystal 91 and the second nonlinear crystal 92.

In the present embodiment, an explanation has been provided by reference to the configuration of the wavelength conversion laser including two lenses interposed between the solid-state laser elements as shown in FIG. 34. However, needless to say, a similar advantage is yielded even by the configuration involving only one lens interposed between the solid-state laser elements as described in connection with the second embodiment, the configuration consisting of an integration of the YAG rod and the lenses of the telescope described in connection with the fourth embodiment; and the configuration including the resonator mirrors formed from the plane mirrors as described in connection with the fifth embodiment. Moreover, the present configuration can also be applied to a solid-state laser configured by a connection of a plurality of resonator units as described in connection with the sixth, seventh, and eighth embodiments.

INDUSTRIAL APPLICABILITY

A solid-state laser of the present invention is suitable for use in a field requiring high power and especially suitable for use as fundamental wave light generation means of a wavelength conversion laser.

The invention claimed is:
1. A solid-state laser comprising:
a partial reflection mirror and a total reflection mirror that constitute a resonator;
two rod-shaped solid-state laser elements arranged in a symmetrical pattern along an optical axis of a laser beam between the partial reflection mirror and the total reflection mirror; and
two convex lenses and a 90 degree polarization rotator that are arranged along the optical axis of the laser beam between the two solid-state laser elements, each of the convex lenses having a focal length "f", wherein
a distance between the two lenses is smaller than 2 f, and a distance between a center of each of the solid-state laser elements adjacent to the respective lenses and each of the adjacent lenses is substantially "f".
2. The solid-state laser according to claim 1, wherein
the 90 degree polarization rotator is disposed between one of the two lenses and the solid-state laser element adjacent to the one lens.
3. The solid-state laser according to claim 1 or 2, wherein
both the partial reflection mirror and the total reflection mirror are mirrors having an identical curvature.
4. The solid-state laser according to claim 1 or 2, wherein
both the partial reflection mirror and the total reflection mirror are plane mirrors.
5. The laser according to claim 3, wherein
provided that a curvature radius of each of the partial reflection mirror and the total reflection mirror is taken as R and that a radius of a laser beam of a transverse single mode component achieved at a center of the solid-state laser element is taken as $\omega_0$, a distance between the two lenses is expressed substantially as

$$2f - \frac{2f^2}{RK} \cdot \sqrt{R^2 + 2RK}$$

(where $$K = \frac{\pi}{\lambda} \cdot \omega_0^2,$$

and parameter R represents an absolute value).

6. The solid-state laser according to claim 5, wherein
the beam radius $\omega_0$ is 0.6 to 0.7 times as large as a radius of the solid-state laser element.

7. The laser according to claim 3, wherein
provided that a curvature radius of each of the partial reflection mirror and the total reflection mirror is taken as R and that a distance between the partial reflection mirror and a center of the solid-state laser element adjacent to the partial reflection mirror or a distance between the total reflection mirror and a center of the solid-state laser element adjacent to the total reflection mirror is taken as $L_1$, a distance between the lenses is expressed substantially as below for the case where the partial reflection mirror and the total reflection mirror are convex mirrors $$2f - f^2 \cdot \frac{2L_1 + R}{L_1(L_1 + R)}$$

and substantially as below for a case where the partial reflection mirror and the total reflection mirror are concave mirrors $$2f - f^2 \cdot \frac{2L_1 - R}{L_1(L_1 - R)}.$$

8. A solid-state laser comprising:
a partial reflection mirror and a total reflection mirror that have the same curvature radius and that constitute a resonator;
two rod-shaped solid-state laser elements arranged in a symmetrical pattern along an optical axis of a laser beam between the partial reflection mirror and the total reflection mirror; and
a convex lens having a focal length "f" and a 90 degree polarization rotator that are arranged along the optical axis of the laser beam between the two solid-state laser elements,
wherein
a distance between the lens and each of centers of the respective solid-state laser elements is substantially 2 f.

9. A solid-state laser comprising:
a partial reflection mirror and a total reflection mirror that constitute a resonator;
two rod-shaped solid-state laser elements which are arranged in a symmetrical pattern along an optical axis of a laser beam between the partial reflection mirror and the total reflection mirror, which each have a length $L_0$ and a refractive index $n_0$, and which have mutually-opposing end faces machined at a curvature radius $R_a$ so as to act as convex lenses; and
a 90 degree polarization rotator that are arranged along the optical axis of the laser beam between the two solid-state laser elements, wherein
the curvature radius is expressed as $$R_a = \frac{n_0 - 1}{2n_0} \cdot L_0,$$

and a distance $L_3$ between the two solid-state laser elements is expressed as $$L_3 < \frac{L_0}{n_0}.$$

10. The solid-state laser according to claim 9, wherein
the partial reflection mirror and the total reflection mirror are mirrors having an identical curvature.

11. The solid-state laser according to claim 9, wherein
both the partial reflection mirror and the total reflection mirror are plane mirrors.

12. A solid-state laser comprising:
a plurality of periodic constituent elements of resonators, each of which has two rod-shaped solid-state laser elements arranged along an optical axis of a laser beam between a partial reflection mirror and a total reflection mirror that constitute a resonator and that are plane mirrors; two convex lenses, each having a focal length "f," and a 90 degree polarization rotator that are arranged along the optical axis of the laser beam between the two solid-state laser elements, a distance between the two lenses being smaller than 2 f, and a distance between a center of each of the solid-state laser elements adjacent to the respective lenses and each of the adjacent lenses being substantially "f",
wherein
a distance between the center of the solid-state laser element adjacent to the partial reflection mirror and the partial reflection mirror is equal to a distance between the center of the solid-state laser element adjacent to the total reflection mirror and the total reflection mirror; and
a distance between the centers of the solid-state laser elements adjacent to each other between the periodic constituent elements of the respective resonators is equal to a value that is twice as large as the distance between the partial reflection mirror and the center of the adjacent solid-state laser element.

13. A solid-state laser comprising:
a plurality of periodic constituent elements of resonators, each of which has two rod-shaped solid-state laser elements arranged along an optical axis of a laser beam between a partial reflection mirror and a total reflection mirror that have an identical curvature and that constitute a resonator; two convex lenses, each having a focal length "f", and a 90 degree polarization rotator that are arranged along the optical axis of the laser beam between the two solid-state laser elements, a distance between the two lenses being smaller than 2 f, and a distance between a center of each of the solid-state laser elements adjacent to the respective lenses and each of the adjacent lenses being substantially "f",
wherein a distance between the center of the solid-state laser element adjacent to the partial reflection mirror and the partial reflection mirror is equal to a distance between the center of the solid-state laser element adjacent to the total reflection mirror and the total reflection mirror;

a distance between the centers of the solid-state laser elements adjacent to each other between the periodic constituent elements of the respective resonators is equal to a value that is twice as large as the distance between the partial reflection mirror and the center of the adjacent solid-state laser element; and a lens having a focal length R/2 is positioned at an intermediate location between the periodic constituent elements of the mutually-adjacent resonators when the curvature radius of the partial reflection mirror is taken as R.

14. A solid-state laser comprising:

a plurality of periodic constituent elements of resonators, wherein a ring resonator is built from a partial reflection mirror and a plurality of total reflection mirrors that are plane mirrors;

wherein each of the resonators has two rod-shaped solid-state laser elements arranged along an optical axis of a laser beam within the resonator and two convex lenses, each having a focal length "f", and a 90 degree polarization rotator that are arranged along the optical axis of the laser beam between the two solid-state laser elements;

wherein a distance between the two lenses is smaller than 2 f;

wherein a distance between a center of each of the solid-state laser elements adjacent to the respective lenses and each of the adjacent lenses is substantially "f"; and wherein the periodic constituent elements of the resonator are arranged such that an equal distance exists among all of the periodic constituent elements of the respective mutually-adjacent resonators.

15. The solid-state laser according to claim 1, further comprising a movement unit for moving one or both of the two lenses in a direction of an optical axis of the resonator.

16. The solid-state laser according to claim 15, further comprising a control unit for controlling the movement unit in accordance with an excitation input command value.

17. The solid-state laser according to claim 3, further comprising:

a first optical base in which the two solid-state laser elements, the lenses, and the 90 degree polarization rotator are arranged; and a second optical base in which the partial reflection mirror and the total reflection mirror are arranged, wherein the first optical base is placed on the second optical base by way of a support member that is slidable in an angular direction.

18. The solid-state laser according to claim 17, wherein the first optical base is positioned on the second optical base by way of three support members.

19. The solid-state laser according to claim 17, further comprising a positioning unit that is disposed on the second optical base and that has a contact surface with respect to a side surface of the first optical base, wherein a position of the first optical base on the second optical base is determined with reference to the contact surface of the positioning unit.

20. The solid-state laser according to claim 3, wherein both the partial reflection mirror and the total reflection mirror are convex mirrors.

21. The solid-state laser according to claim 1, further comprising:

a Q switch interposed between the partial reflection mirror and the total reflection mirror;

a Q switch control unit for controlling activation and deactivation of the Q switch; and a polarization element interposed between the partial reflection mirror and the solid-state laser element adjacent to the partial reflection mirror, wherein a linearly-polarized pulse laser beam is output.

22. The solid-state laser according to claim 1, wherein the solid-state laser complies with a side pumping method for radiating excitation light from a side surface of each of the solid-state laser elements.

23. The solid-state laser according to claim 1, wherein a laser beam to be oscillated is a transverse single mode.

24. A wavelength conversion laser comprising:

the solid-state laser defined in claim 1, and a nonlinear crystal that is placed in an optical axis of a laser beam output from the solid-state laser and that converts the laser beam into harmonic light.

25. The wavelength conversion laser according to claim 24, wherein the partial reflection mirror acts as a lens having a focal length $f_{PR}$ with respect to a transmitting laser beam; and the wavelength conversion laser further has a spatial filter that is interposed between a surface of the partial reflection mirror through which the laser beam passes and a position spaced from the surface by a distance $f_{PR}$ and that has an aperture which is larger than a beam size of the laser beam passed through the surface.

26. The wavelength conversion laser according to claim 24 or 25, further comprising a plurality of lenses that are interposed between the partial reflection mirror and the nonlinear crystal and that establish an image transfer connection between the solid-state laser element on the partial reflection mirror side and the nonlinear crystal.

27. The wavelength conversion laser according to claim 26, further comprising:

the nonlinear crystal in numbers; and a plurality of lenses that are positioned among the nonlinear crystals and that establish an image transfer connection between the two adjacent nonlinear crystals.

* * * * *